(12) United States Patent
Iwasa et al.

(10) Patent No.: US 8,292,061 B2
(45) Date of Patent: Oct. 23, 2012

(54) PACKAGE APPARATUS

(75) Inventors: Seisaku Iwasa, Shiga (JP); Motoki Takayama, Shiga (JP); Tatsuya Arimatsu, Shiga (JP); Yuji Yokota, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 318 days.

(21) Appl. No.: 12/651,868

(22) Filed: Jan. 4, 2010

(65) Prior Publication Data
US 2010/0170196 A1 Jul. 8, 2010

Related U.S. Application Data

(60) Provisional application No. 61/231,514, filed on Aug. 5, 2009.

(30) Foreign Application Priority Data

Jan. 5, 2009 (JP) ................................. 2009-000032
Nov. 30, 2009 (JP) ................................. 2009-271405

(51) Int. Cl.
*B65G 47/24* (2006.01)
(52) U.S. Cl. ........ 198/407; 198/431; 198/578; 198/560; 198/603
(58) Field of Classification Search ................ 198/375, 198/407, 431, 578, 603, 560
See application file for complete search history.

(56) References Cited

U.S. PATENT DOCUMENTS

| 2,600,281 | A | * | 6/1952 | Sticelber ................... 198/577 |
| 4,214,743 | A |   | 7/1980 | Meier |
| 4,249,847 | A | * | 2/1981 | Tokuno .................. 414/798.9 |
| 4,604,851 | A | * | 8/1986 | Reist ........................ 53/430 |
| 4,835,947 | A | * | 6/1989 | Langen et al. ............ 53/542 |
| 5,012,628 | A |   | 5/1991 | Van Oord |
| 5,421,446 | A |   | 6/1995 | Koch et al. |
| 6,622,848 | B1 |  | 9/2003 | Lattimer et al. |
| 6,840,369 | B2 | * | 1/2005 | Derenthal et al. ......... 198/426 |
| 7,434,677 | B2 | * | 10/2008 | Ritchie et al. ............ 198/407 |
| 7,921,982 | B2 | * | 4/2011 | Moske et al. ............. 198/418.9 |

FOREIGN PATENT DOCUMENTS

| JP | 07-247021 A | 9/1995 |
| JP | 08-85513 A | 4/1996 |

* cited by examiner

*Primary Examiner* — Joseph A Dillon, Jr.
(74) *Attorney, Agent, or Firm* — Global IP Counselors, LLP

(57) ABSTRACT

A package apparatus includes a first conveyance unit and a second conveyance unit. The first conveyance unit is configured and arranged to convey a plurality of packaged objects in a first conveying direction. The second conveyance unit is provided below the first conveyance unit and configured and arranged to convey the packaged objects in a second conveying direction generally opposite from the first conveying direction. The second conveyance unit is configured and arrange to overlay each of the packaged objects received from the first conveyance unit on an adjacent one of the packaged objects such that the packaged objects are generally oriented in the second conveying direction to form a group of the packaged objects that is conveyed in the second conveying direction on the second conveyance unit.

12 Claims, 46 Drawing Sheets (e)

PACKAGE APPARATUS

CROSS-REFERENCE TO RELATED APPLICATIONS

This application claims priority to Japanese Patent Application No. 2009-000032 filed on Jan. 5, 2009, Japanese Patent Application No. 2009-271405 filed on Nov. 30, 2009 and U.S. Provisional Application No. 61/231,514 filed on Aug. 5, 2009. The entire disclosures of Japanese Patent Application Nos. 2009-000032 and 2009-271405 and U.S. Provisional Application No. 61/231,514 are hereby incorporated herein by reference.

BACKGROUND OF THE INVENTION

1. Field of the Invention

The present invention relates to a package apparatus used for packing packaged objects in boxes, and more particularly to a package apparatus for packing packaged objects in boxes.

2. Description of the Background Art

Conventionally, various package apparatuses for packing packaged objects in boxes are used. For example, an apparatus is known which suctions packaged objects by using a vacuum suction device, and moves the packaged objects, and packs the packaged objects in boxes. However, when the vacuum suction device is used, a portion to be suctioned needs to be flat. Therefore, in order to continuously overlay the packaged objects on adjacent packaged objects, the packaged objects are manually handled, which reduces a working efficiency. In order to solve such a problem, a partial overlay packing apparatus used for packaged noodles or the like is disclosed as below.

Japanese Laid-Open Patent Publication No. 07-247021 (hereinafter, referred to as Patent Document 1) discloses a partial overlay packing apparatus, for packaged noodles or the like, which is capable of continuously packing packaged noodles or the like in an existing container box or the like mechanically such that the packaged noodles or the like are aligned in a planar positioning state so as to partially overlay one packaged noodle on another.

The partial overlay packing apparatus for packaged noodles or the like as disclosed in Patent Document 1 includes an upper endless conveyance plane which is provided, at a position which is appropriately high, inside a rectangular frame having a front and a rear wall and a right and a left wall, such that the upper endless conveyance plane can be moved from a position of the rear wall to the vicinity of the front wall. In the partial overlay packing apparatus for packaged noodles or the like, the bottom of the rectangular frame is formed of a lower endless conveyance plane which is moved from a position of the front wall toward the rear wall. The lower endless conveyance plane is separated, at the center between the right side portion and the left side portion, into two portions, that is, a left side endless conveyance plane portion and a right side endless conveyance plane portion, and these conveyance plane portions can be moved in directions, respectively, in which these conveyance plane portions are distanced from each other. Further, a front side sensor for detecting for a conveyed object is provided, at a position which is appropriately high, near the inner side of the front wall, and a rear side sensor is provided, at a position which is almost as high as the lower endless conveyance plane, on the inner side of the rear wall. The two sensors and the lower endless conveyance plane are operated in association with each other.

Further, Japanese Laid-Open Patent Publication No. 08-85513 (hereinafter, referred to as Patent Document 2) discloses an object-packaged-in-bag raising aligning apparatus which is low-cost, and is capable of continuously collecting, at a high speed, a plurality of objects packaged in bags, which are conveyed by a belt conveyor such that the thickness direction thereof corresponds to the horizontal direction.

The object-packaged-in-bag raising aligning apparatus disclosed in Patent Document 2 is provided with: a belt conveyor which constantly operates and can convey objects packaged in bags which are fed onto a conveyor belt; a stopper for stopping a foremost first object packaged in a bag which is conveyed by the belt conveyor; and at least two object-packaged-in-bag raising plates, that is, a first object-packaged-in-bag raising plate and a second object-packaged-in-bag raising plate. The first object-packaged-in-bag raising plate is operable to shake and raise the foremost first object packaged in the bag from its upstream side, by using an air cylinder that is provided below the foremost first object packaged in the bag, which is stopped on the belt conveyor by the stopper, and that operates based on a detection signal from a first object-packaged-in-bag detector for detecting for the foremost first object packaged in the bag, which has been stopped by the stopper, such that the thickness direction thereof almost corresponds to the horizontal direction, and operable to sandwich the foremost first object packaged in the bag between the stopper and the first object-packaged-in-bag raising plate. The second object-packaged-in-bag raising plate is operable to shake and raise a second object packaged in a bag from its upstream side, by using an air cylinder that is provided below the second object packaged in the bag, which immediately follows the foremost first object packaged in the bag and is stopped on the belt conveyor by the first object-packaged-in-bag raising plate, and that operates based on a detection signal from a second object-packaged-in-bag detector for detecting for the second object packaged in the bag, which has been stopped by the first object-packaged-in-bag raising plate, such that the thickness direction thereof almost corresponds to the horizontal direction, and operable to sandwich the second object packaged in the bag between the first object-packaged-in-bag raising plate and the second object-packaged-in-bag raising plate.

SUMMARY OF THE INVENTION

The partial overlay packing apparatus for packaged noodles or the like as disclosed in Patent Document 1 is designed for articles, such as packaged noodles, each including contents in which the center of mass is not easily changed. However, almost half the contents of an object which is packaged by using a thin flexible material is air. In such a packaged object, the center of mass thereof is changed, in many cases, in accordance with the contents thereof being moved.

When the partial overlay packing apparatus for packaged noodles or the like as disclosed in Patent Document 1 is used for such packaged objects, the face of the packaged object may be oriented upward, or the bottom thereof may be oriented upward when the packaged objects partially overlay adjacent packaged objects. Consequently, the packaged objects need to be manually aligned so as to have the same orientation.

On the other hand, the object-packaged-in-bag raising aligning apparatus as disclosed in Patent Document 2 cannot increase a processing speed when the number of packaged objects is increased.

An object of the present invention is to provide a package apparatus capable of assuredly overlaying packaged objects on adjacent packaged objects so as to have the same orientation, and packing the packaged objects in boxes by using a simplified configuration.

Another object of the present invention is to provide a package apparatus capable of continuously overlaying, at a high speed, packaged objects on adjacent package objects so as to have the same orientation, and aligning the packaged objects in such positions as to be efficiently packed, and assuredly packing the packaged objects in boxes by using a simplified configuration.

(1) A first aspect of the present invention is directed to a package apparatus including a first conveyance unit and a second conveyance unit provided below the first conveyance unit. The first conveyance unit is configured and arranged to convey a plurality of packaged objects in a first conveying direction. The second conveyance unit is configured and arranged to convey the packaged objects in a second conveying direction generally opposite from the first conveying direction. The second conveyance unit is configured and arranged to overlay each of the packaged objects received from the first conveyance unit on an adjacent one of the packaged objects such that the packaged objects are generally oriented in the second conveying direction to form a group of the packaged objects that is conveyed in the second conveying direction on the second conveyance unit.

In the package apparatus, the packaged objects are caused to fall from a tilt unit of the first conveyance unit, and the plurality of the packaged objects partially overlay adjacent packaged objects at the collection portion of the second conveyance unit, and conveyed by the second conveyance unit.

In this case, the second conveyance unit conveys the packaged objects in a direction opposite to a direction in which the first conveyance unit conveys the packaged objects. Therefore, the packaged objects can be packed in boxes in a reduced space. Further, on the second conveyance unit, the packaged objects can overlay adjacent packaged objects so as to have the same orientation, and can be conveyed at a high speed. Consequently, the packaged objects can be assuredly aligned so as to have the same orientation and packed in boxes at a high speed.

(2) A downstream-side end portion of the first conveyance unit may include a tilt unit which is tilted downward.

In this case, the tilt unit of the first conveyance unit is provided so as to be tilted downward. Therefore, the packaged objects can be caused to fall in stable positions, and the positions of the packaged objects can be stably aligned, thereby allowing the packaged objects overlaying adjacent packaged objects to be conveyed.

(3) The second conveyance unit may include a collection portion in which the packaged objects are collected, and an object reception portion provided at an upstream-side end portion of the collection portion. A tilt angle at which a downstream-side end portion of the first conveyance unit is tilted may be almost equal to or less than an overlay angle based on a position of each of the packaged objects which overlay the adjacent packaged objects at the object reception portion.

In this case, a tilt angle at which the tilt unit of the first conveyance unit is tilted is almost equal to or less than an overlay angle based on the position of each of the packaged objects. Therefore, when the packaged objects conveyed on the tilt unit are moved to the object reception portion, the amount of rotation of each of the packaged objects can be minimized. Consequently, the packaged objects can be aligned so as to have the same orientation in a short time period, and a great shock is prevented from being delivered to the packaged objects, thereby preventing the packaged objects from being damaged or impaired, and protecting articles included in the packaged objects.

(4) The first conveyance unit may include a horizontal unit and a tilt unit which are formed of a common belt, and a pair of coupling rollers for coupling the horizontal unit to the tilt unit. The pair of coupling rollers may adjust at least one of a tilt angle of the tilt unit and a length of a tilting side of the tilt unit.

In this case, at least one of the tilt angle of the tilt unit and the length of the tilting side of the tilt unit can be adjusted by moving the pair of coupling rollers. Therefore, at least one of the tilt angle of the tilt unit and the length of the tilting side of the tilt unit can be adjusted depending on kinds of the packaged objects. Consequently, it is unnecessary to change the first conveyance unit depending on the kinds of the packaged objects, thereby enhancing a working efficiency.

(5) A driving unit for driving the first conveyance unit, and a first control unit for controlling the driving unit may be further provided. The first control unit may control a speed of the driving unit depending on a kind of the packaged objects.

In this case, the first control unit controls a speed of the driving unit depending on kinds of the packaged objects. Therefore, the packaged objects can be assuredly aligned so as to have the same orientation without adjusting the speed depending on the kinds of the packaged objects.

(6) The first conveyance unit may include a horizontal unit and a tilt unit which are formed of independent belts, respectively. A driving unit for driving the first conveyance unit may include a horizontal driving unit for driving the horizontal unit, and a tilt driving unit for driving the tilt unit. The first control unit may independently control the horizontal driving unit and the tilt driving unit.

In this case, the horizontal driving unit and the tilt driving unit can be independently controlled, so that the packaged objects can be conveyed from the first conveyance unit to the second conveyance unit at regular intervals.

For example, a speed of the horizontal driving unit can be increased or reduced depending on the interval between the packaged objects, so that the tilt driving unit allows the packaged objects to be moved at regular intervals. Consequently, the packaged objects can be assuredly aligned so as to have the same orientation.

(7) The second conveyance unit may include: a tilt unit and a horizontal unit, the tilt unit and the horizontal unit being formed of a common belt; and a pair of coupling rollers for coupling the tilt unit to the horizontal unit. The pair of coupling rollers may adjust at least one of a tilt angle of the tilt unit and a length of a tilting side of the tilt unit.

In this case, the tilt unit of the second conveyance unit enables a speed at which the packaged objects are conveyed on the second conveyance unit to be increased without misaligning the positions of the packaged objects. Further, at least one of the tilt angle of the tilt unit and the length of the tilting side of the tilt unit can be adjusted by the pair of coupling rollers being moved, so that at least one of the tilt angle and the length of the tilting side can be adjusted depending on the kinds of the packaged objects. Consequently, it is unnecessary to change the second conveyance unit depending on the kinds of the packaged objects, thereby enhancing a working efficiency.

(8) A driving unit for driving the second conveyance unit, and a second control unit for controlling the driving unit may be further provided. The second control unit may control a speed of the driving unit depending on a kind of the packaged objects.

In this case, the second control unit controls a speed of the driving unit depending on the kinds of the packaged objects.

Therefore, the packaged objects can be assuredly aligned so as to have the same orientation without adjusting the speed depending on the kinds of the packaged objects.

(9) The second conveyance unit may include a tilt unit and a horizontal unit which are formed of independent belts, respectively. The driving unit for driving the second conveyance unit may include a tilt driving unit for driving the tilt unit, and a horizontal driving unit for driving the horizontal unit. Preferably, the second control unit independently controls the tilt driving unit and the horizontal driving unit.

In this case, a speed of the tilt driving unit can be increased while a speed of the horizontal driving unit and the positions of the packaged objects are maintained unchanged. For example, a speed of the tilt driving unit is increased or reduced depending on the interval between the packaged objects, thereby enabling the horizontal driving unit to move the packaged objects at regular intervals. Consequently, the packaged objects can be assuredly aligned so as to have the same orientation.

(10) The second conveyance unit may include a movable tilt unit, a stationary tilt unit and a horizontal unit. The second control unit may control the driving unit such that a tilt angle at which the movable tilt unit is tilted when a first packaged object among the group of the plurality of the packaged objects falls from the first conveyance unit to the second conveyance unit, is different from a tilt angle at which the movable tilt unit is tilted when packaged objects, other than the first packaged object among the group of the plurality of the packaged objects, fall from the first conveyance unit to the second conveyance unit.

The package apparatus includes the first conveyance unit, the second conveyance unit, and the control unit. Further, the second conveyance unit includes the movable tilt unit, the stationary tilt unit, and the horizontal unit. The second conveyance unit is provided below the first conveyance unit, and conveys the packaged objects in a direction opposite to a conveying direction in which the first conveyance unit conveys the packaged objects. The control unit controls the first conveyance unit and the second conveyance unit. The packaged objects are caused to fall from the first conveyance unit to the second conveyance unit, and a plurality of the packaged objects are caused to overlay the adjacent packaged objects so as to generate a group of the packaged objects.

In this case, the second control unit controls the driving unit such that a tilt angle at which the movable tilt unit is tilted when a first packaged object among the group of the plurality of the packaged objects falls from the first conveyance unit to the second conveyance unit, is different from a tilt angle at which the movable tilt unit is tilted when packaged objects, other than the first packaged object, among the group of the plurality of the packaged objects fall from the first conveyance unit to the second conveyance unit. Therefore, when the group of the packaged objects is generated, the angle of the movable tilt unit can be adjusted such that the position of the first packaged object is stabilized, and the second and the subsequent packaged objects contact the first packaged object, thereby enabling the group of the packaged objects to be formed in the stable positions, and conveyed.

(11) The second control unit may control a tilt angle at which the movable tilt unit is tilted such that the movable tilt unit is in an almost horizontal position when a first packaged object among the group of the plurality of the packaged objects falls from the first conveyance unit to the second conveyance unit.

In this case, the second control unit controls the tilt angle of the movable tilt unit such that the movable tilt unit is in an almost horizontal position, thereby enabling the positions of the packaged objects having fallen from the first conveyance unit to be stabilized. Namely, if the movable tilt unit is tilted when the packaged objects are caused to fall, the positions of the packaged objects are not stabilized. In particular, when the packaged objects each have a circular portion, the packaged objects having fallen are likely to roll, and the positions of the packaged objects may be unbalanced. On the other hand, when the movable tilt unit is in the almost horizontal position, the positions of the packaged objects can be stabilized so as to have the same orientation, thereby preventing the packaged objects from rolling.

(12) The second control unit controls the movable tilt unit such that the movable tilt unit is tilted downward from an upstream side to a downstream side when packaged objects, other than the first packaged object, among the group of the plurality of the packaged objects fall from the first conveyance unit to the second conveyance unit.

In this case, the second control unit controls the movable tilt unit such that the movable tilt unit is tilted downward from the upstream side to the downstream side when the packaged objects, other than the first packaged object, among the group of the plurality of the packaged objects fall from the first conveyance unit to the second conveyance unit. Therefore, the packaged objects following the first packaged object, namely, the second packaged object and the subsequent packaged objects, can be caused to fall onto the movable tilt unit so as to contact the first packaged object. Consequently, the group of the packaged objects can be stably conveyed.

The package apparatus according to the present invention is capable of assuredly overlaying the packaged objects on adjacent package objects so as to have the same orientation and packing the packaged objects in boxes by using a simplified configuration.

DESCRIPTION OF THE PREFERRED EMBODIMENTS

Hereinafter, embodiments of the present invention will be described with reference to the drawings. In the embodiments of the present invention, a package apparatus which conveys deformable packaged objects and packs the deformable packaged objects in boxes will be described by using specific examples. In the embodiments of the present invention, an exemplary case where a plurality of packaged objects $110a$, $110b$, $110c$, $110d$, and $110e$ are conveyed as a group of packaged objects 110 will be described. In the embodiments of the present invention, an exemplary case where packaged objects having deformable shapes, such as objects each of which is packaged by using a thin flexible material, are handled is described. However, the package apparatus of the present invention is applicable to packaged objects having box-like shapes, and any other packaged objects.

First Embodiment

Figure 1:
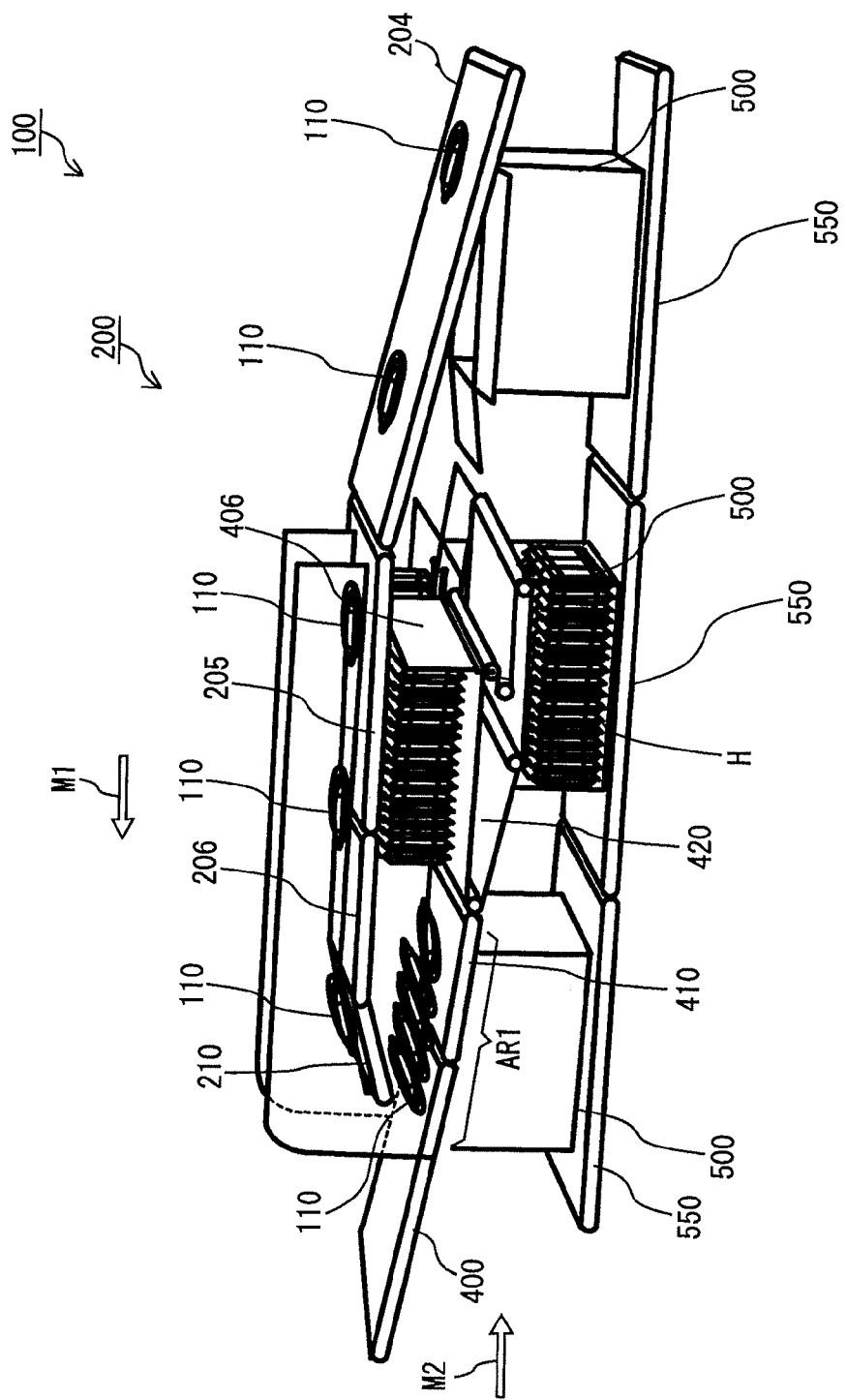
FIG. 1 is a schematic diagram illustrating an exemplary external appearance of a package apparatus for packing packaged objects in boxes, according to a first embodiment of the present invention.

FIG. 1 is a schematic diagram illustrating an exemplary external appearance of a package apparatus 100 according to a first embodiment of the present invention.

The package apparatus 100 shown in FIG. 1 mainly includes: a first conveyance unit 200; a second conveyance unit 400; a third conveyance unit 410; an extendable conveyance unit 420; and a box conveyance unit 550. The first conveyance unit 200, the second conveyance unit 400, the third conveyance unit 410, and the extendable conveyance unit 420 are each formed as a conveyance structure having an endless belt conveyor. Further, except for the extendable conveyance unit 420, a conveyance surface of each belt conveyor is uneven, so that a frictional force is generated so as not to easily unbalance positions of packaged objects. Further, the extendable conveyance unit 420 is configured as a belt conveyor, such as a shuttle conveyor, in which the length of the conveyance surface is extendable.

The first conveyance unit 200 moves a plurality of packaged objects in the direction indicated by an arrow M1 (first conveying direction). The first conveyance unit 200 includes: a first horizontal unit 205; a second horizontal unit 206; and a tilt unit 210. The first horizontal unit 205, the second horizontal unit 206, and the tilt unit 210 are provided in order, respectively, in succession. All of or some of the first horizontal unit 205, the second horizontal unit 206, and the tilt unit 210 may be integrated as a single unit. Alternatively, the first horizontal unit 205, the second horizontal unit 206, and the tilt unit 210 may be provided so as to be separately controlled.

Below the first conveyance unit 200, the second conveyance unit 400, the third conveyance unit 410, and the extendable conveyance unit 420 are provided. The second conveyance unit 400 is provided such that a tilt angle thereof can be changed, which is described below.

As shown in FIG. 1, the plurality of packaged objects are continuously conveyed on the first horizontal unit 205, the second horizontal unit 206, and the tilt unit 210 of the first conveyance unit 200 in order, respectively, and are collected at a collection portion AR1 of the second conveyance unit 400. Hereinafter, the plurality of packaged objects having been collected is collectively referred to as a group of packaged objects 110.

Figure 4:
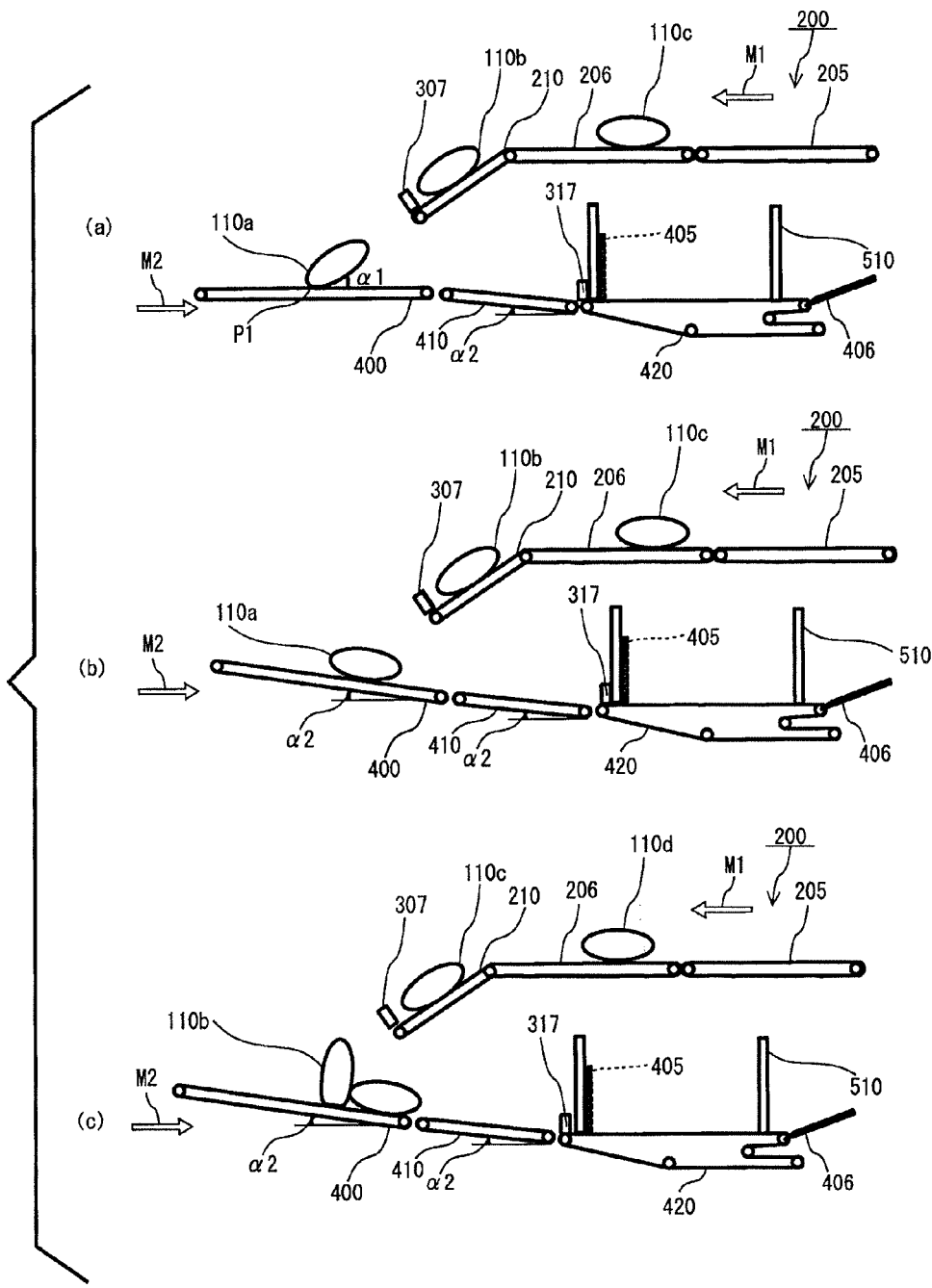
FIG. 4 is a schematic side view showing outlines of operations performed by a first conveyance unit, a second conveyance unit, a third conveyance unit, and an extendable conveyance unit of the package apparatus for packaged objects.
Figure 5:
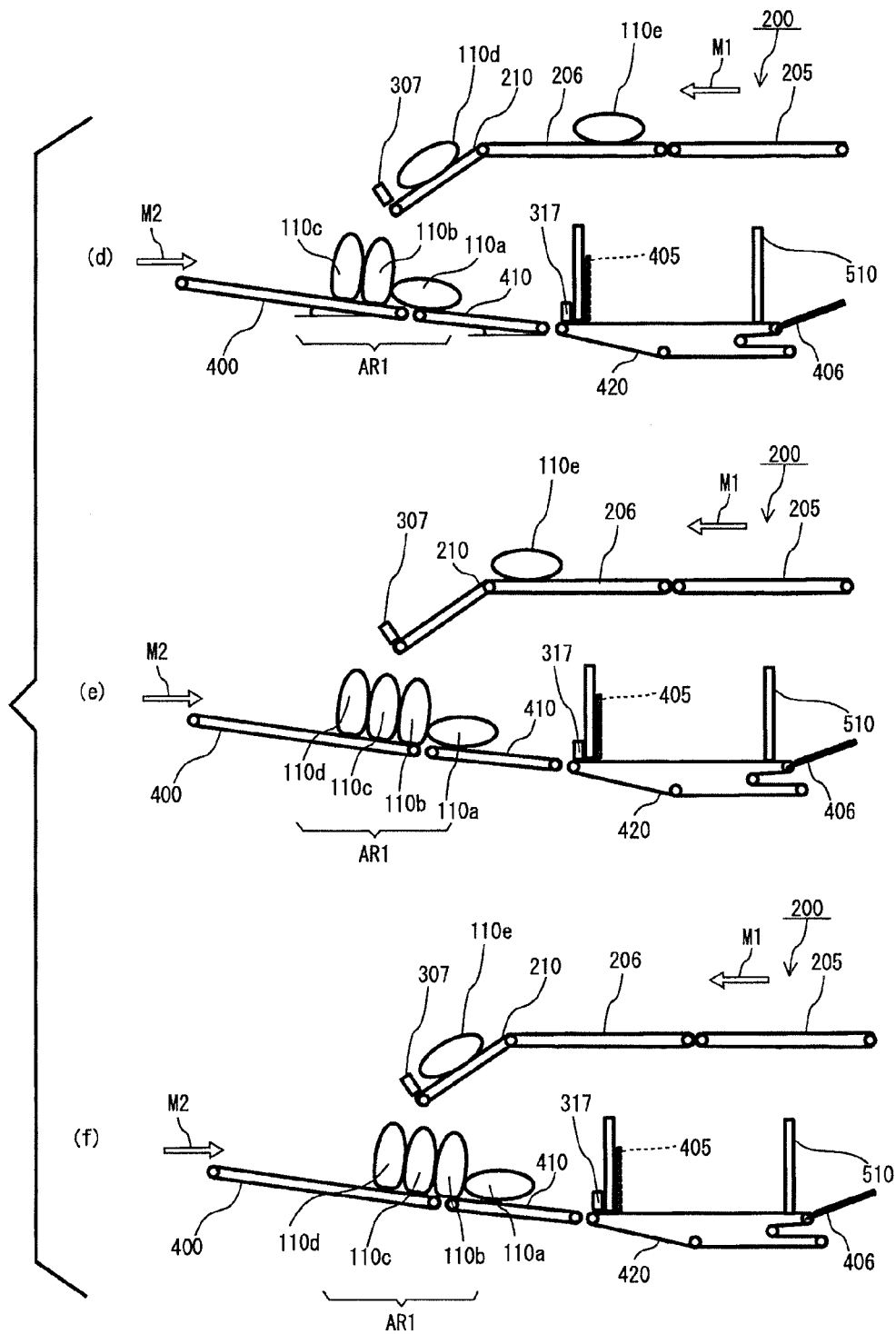
FIG. 5 is a schematic side view showing the outlines of the operations performed by the first conveyance unit, the second conveyance unit, the third conveyance unit, and the extendable conveyance unit of the package apparatus for the packaged objects.
Figure 6:
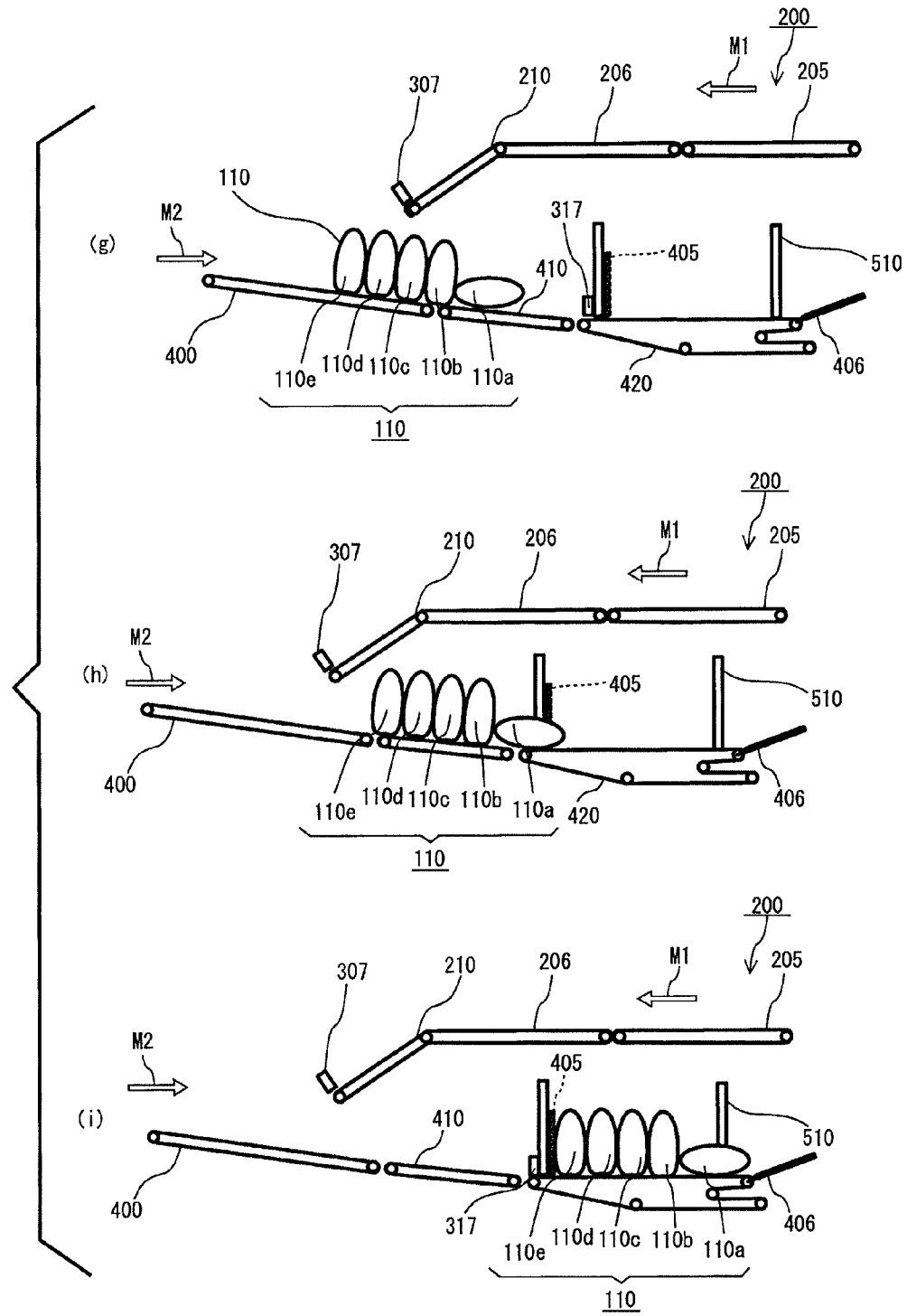
FIG. 6 is a schematic side view showing the outlines of the operations performed by the first conveyance unit, the second conveyance unit, the third conveyance unit, and the extendable conveyance unit of the package apparatus for the packaged objects.

A case in which a first packaged object 110a among the group of packaged objects 110 falls onto the collection portion AR1 of the second conveyance unit 400 will be described. Since the second conveyance unit 400 is provided along the horizontal plane (see FIG. 4(a)), the packaged object 110a falls onto the collection portion AR1 of the second conveyance unit 400 to lie on its side. Further, since the second conveyance unit 400 is provided along the horizontal plane, it is possible to prevent the first packaged object 110a from rolling.

The second conveyance unit 400 rotates so as to form a tilt angle α2 relative to the horizontal plane, and a second packaged object 110b and packaged objects subsequent thereto lean against the first packaged object 110a having fallen on the second conveyance unit 400, and enter standing positions. The group of packaged objects 110 will be described below in detail. The second conveyance unit 400, the third conveyance unit 410, and the extendable conveyance unit 420 move the group of packaged objects 110 in the direction which is indicated by an arrow M2 (second conveying direction) and is generally opposite to the direction indicated by the arrow M1.

The group of packaged objects 110 is aligned in the standing position by means of a first position control plate 405, a second position control plate 406, and a third position control plate 407 which are described below, and the group of packaged objects 110 is pushed in the far direction in FIG. 1 by the third position control plate 407. Thereafter, the group of packaged objects 100 is moved from above a box 500 into the box 500 positioned therebelow. The box 500 is moved in the direction indicated by the arrow M2 by the box conveyance unit 550, and sealed by a sealing device (not shown) or a top-interleaving device (not shown), thereby completing an operation for packing the group of packaged objects 110 in a box.

Preferably, an apparatus for unfolding and sealing a corrugated cardboard to form the box 500, which is not shown in FIG. 1, is separately provided. Further, the box 500 is moved by the box conveyance unit 550 (a conveyor or a conveyance roller) in the present embodiment. However, the present invention is not limited thereto. The box 500 may be moved by another device.

Further, in the present embodiment, the group of packaged objects 110 is caused to fall from above the box 500, and the group of packaged objects 110 is packed in a box. However, the present invention is not limited thereto. An opening may be provided on the side portion of the box 500, and the group of packaged objects 110 may be slid into the box 500 therethrough, and packed.

Figure 2:
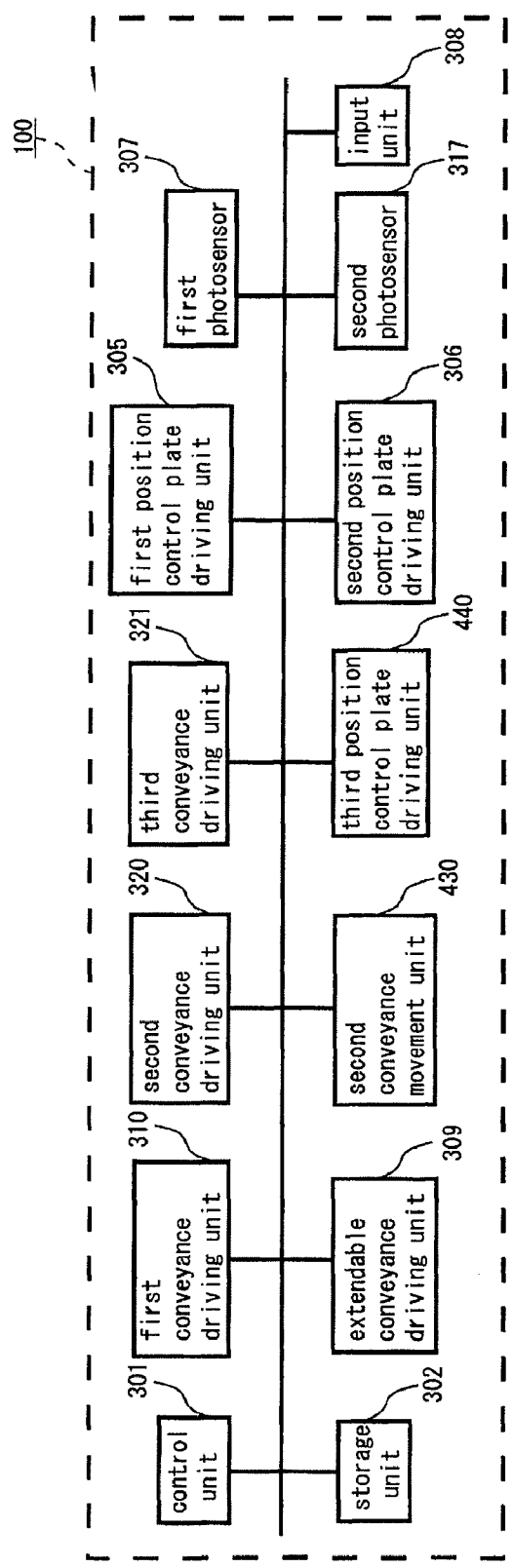
FIG. 2 is a schematic structure diagram illustrating main components of the package apparatus for packaged objects.

Next, FIG. 2 is a schematic structure diagram illustrating main components of the package apparatus 100.

As shown in FIG. 2, the package apparatus 100 includes: a control unit 301; a storage unit 302; a first position control plate driving unit 305; a second position control plate driving unit 306; a first photosensor 307; a second photosensor 317; an input unit 308; an extendable conveyance driving unit 309; a first conveyance driving unit 310; a second conveyance driving unit 320; a third conveyance driving unit 321; a second conveyance movement unit 430; and a third position control plate driving unit 440. The first photosensor 307 and the second photosensor 317 are each a detection device which detects whether or not each packaged object has passed.

Based on article data, of the plurality of packaged objects, which is inputted through the input unit 308, the control unit 301 selects a control program which corresponds to the article data and is stored in the storage unit 302. The control program stored in the storage unit 302 is loaded into the control unit 301, and the control unit 301 controls, based on a signal from each of the first photosensor 307 and the second photosensor 317, an operation of each of the first conveyance driving unit 310, the second conveyance driving unit 320, the second conveyance movement unit 430, the third conveyance driving unit 321, the first position control plate driving unit 305, the second position control plate driving unit 306, the extendable conveyance driving unit 309, and the third position control plate driving unit 440.

As described below, the first conveyance driving unit 310 controls operations of the first horizontal unit 205, the second horizontal unit 206, and the tilt unit 210. The second conveyance driving unit 320 controls an intermittent feeding operation of the second conveyance unit 400. The second conveyance movement unit 430 controls a tilt angle of the second conveyance unit 400. The third conveyance driving unit 321 controls an operation of the third conveyance unit 410. The first position control plate driving unit 305 controls an operation of the first position control plate 405. The second position control plate driving unit 306 controls an operation of the second position control plate 406. The third position control plate driving unit 440 control an operation of the third position control plate 407. The extendable conveyance driving unit 309 controls a conveyance operation and an extending and retracting operation of the extendable conveyance unit 420.

Figure 3:
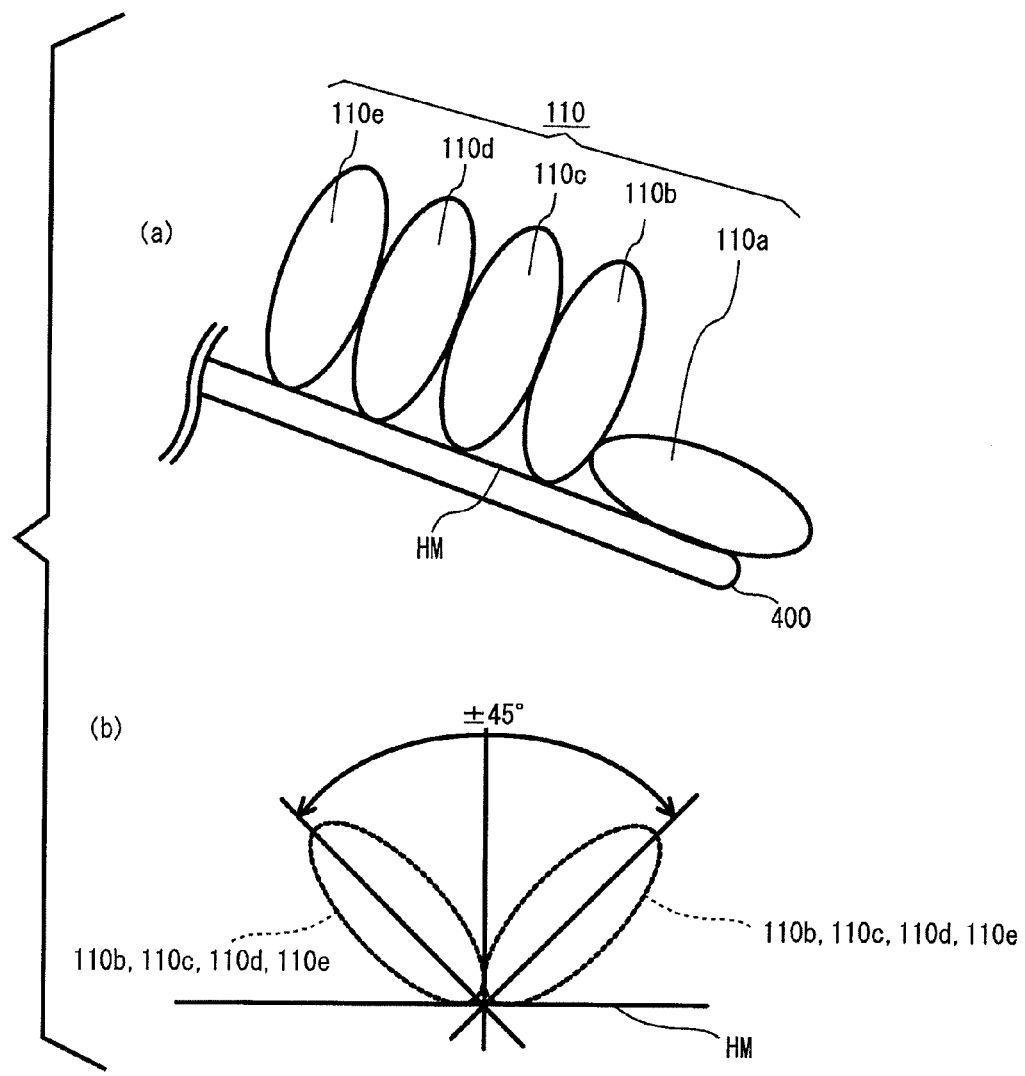
FIG. 3 is a diagram illustrating positions of a group of the packaged objects.

Next, the standing position of each of the packaged objects 110a, 110b, 110c, 110d, and 110e will be described. FIG. 3 illustrates positions of the group of packaged objects 110. FIG. 3(a) shows the group of packaged objects 110, and FIG. 3(b) shows the standing positions of the packaged objects 110b, 110c, 110d, and 110e.

As shown in FIG. 3(a), the packaged objects 110a, 110b, 110c, 110d, and 110e are collected as the collective group of packaged objects 110 on a conveyance surface HM of the second conveyance unit 400. Except for the first packaged object 110a, at least the second packaged object 110b and the subsequent packaged objects 110c, 110d, and 110e, which are included in the group of packaged objects 110, are controlled so as to be in positions (standing positions) perpendicular to the conveyance surface HM of the second conveyance unit 400.

Further, as shown in FIG. 3(b), each of the second packaged object 110b and the subsequent packaged objects 110c, 110d, and 110e, is controlled so as to be in a state (hereinafter, referred to as a standing position) in which each of the packaged objects 110b, 110c, 110d, and 110e stands so as to be titled at an angle ranging from −45 degrees to +45 degrees relative to the axis perpendicular to the conveyance surface HM of the second conveyance unit 400.

FIG. 4 to FIG. 9 are each a schematic side view showing outlines of operations of the first conveyance unit 200, the second conveyance unit 400, the third conveyance unit 410, and the extendable conveyance unit 420 of the package apparatus 100.

Firstly, as shown in FIG. 4(a), the second conveyance unit 400 is provided in a horizontal position. The packaged object 110a is moved from the first conveyance unit 200 onto a reception portion P1 of the second conveyance unit 400. The packaged object 110a is received at the reception portion P1 so as to be tilted at an angle α1.

Next, as shown in FIG. 4(b), the packaged object 110a falls by its own weight, and the second conveyance unit 400 then shifts from the horizontal position to a tilting position having a tilt angle α2.

Next, as shown in FIG. 4(c), the second packaged object 110b is moved from the first conveyance unit 200 to the second conveyance unit 400. In this case, the second conveyance unit 400 is intermittently driven, and the packaged object 110a is conveyed by a distance L1 (see FIG. 13) in the direction indicated by the arrow M2. That is, the packaged object 110a is moved over the distance L1 described below, and then stops. An operation of the second conveyance unit 400 will be described below in detail.

Consequently, the second packaged object 110b contacts the end edge of the first packaged object 110a and enters the standing position. Similarly, as shown in FIG. 5(d), the immediately following packaged object 110c contacts the end portion of the second packaged object 110b at the collection portion AR1 of the second conveyance unit 400, and enters the standing position.

As shown in FIG. 5(e), immediately following the packaged object 110c, the packaged object 110d is moved to the second conveyance unit 400, and similarly contacts the end portion of the immediately preceding packaged object 110c at the collection portion AR1, and enters the standing position.

Next, as shown in FIG. 5(f), immediately following the packaged object 110d, the packaged object 110e is moved to the tilt unit 210.

Next, as shown in FIG. 6(g), the packaged object 110e is in turn moved. The packaged objects 110b, 110c, 110d, and 110e enter the standing positions and are collected and held as the group of packaged objects 110 at the collection portion AR1. The control unit 301 controls the second conveyance unit 400 so as to intermittently move until the group of packaged objects 110 is collected at the collection portion AR1 of the second conveyance unit 400.

Subsequently, when, as shown in FIG. 6(h), the group of packaged objects 110 has been moved to the collection portion AR1 of the second conveyance unit 400, the control unit 301 stops driving the second conveyance unit 400 intermittently, and drives the second conveyance unit 400 at a constant speed. Further, the third conveyance unit 410 is also driven, and the group of packaged objects 110 is conveyed in the direction indicated by the arrow M2. At this time, as shown in FIG. 6(h), the group of packaged objects 110 is all loaded on the third conveyance unit 410, and the immediately following group of packaged objects 110 (not shown) is moved from the first conveyance unit 200 to the second conveyance unit 400. The second conveyance unit 400 is intermittently driven repeatedly.

Subsequently, as shown in FIG. 6(i), the group of packaged objects 110 is moved from the third conveyance unit 410 to the extendable conveyance unit 420. When the group of packaged objects 110 has been moved to the extendable conveyance unit 420, namely, when the packaged object 110e has been moved downstream (in the direction indicated by the arrow M2) from the first position control plate 405, the first position control plate 405 is driven to enter the extendable conveyance unit 420 in accordance with a signal from the second photosensor 317 provided in the vicinity of the first position control plate 405.

Specifically, when it is determined, based on a signal from the second photosensor 317, that the group of packaged objects 110 is on the third conveyance unit 410, the control unit 301 does not issue an instruction for driving the first position control plate 405, and issues an instruction for driving the third conveyance unit 410 and the extendable conveyance unit 420. When it is determined, based on a signal from the second photosensor 317, that the group of packaged objects 110 has been all moved from the third conveyance unit 410 to the extendable conveyance unit 420, the control unit 301 issues an instruction for driving the first position control plate 405.

At this time, the second conveyance unit 400 is being intermittently driven so as to move in small increments. The second conveyance unit 400 and the third conveyance unit 410 are separately provided. Therefore, the third conveyance unit 410 can be independently driven. Thus, the third conveyance unit 410 can be used as a buffer, and the group of packaged objects 110 can be stocked on the third conveyance unit 410 so as to adjust a time for which each of the first position control plate 405, the second position control plate 406, and the third position control plate 407, which are described below, is driven.

Next, as shown in FIG. 7(j), when the first packaged object 110a among the group of packaged objects 110 is loaded on the second position control plate 406, a shaft H of the extendable conveyance unit 420 starts to move along the horizontal direction indicated by an arrow R7.

When the shaft H is moved, the control unit 301 performs a control such that the conveyance surface of the extendable conveyance unit 420 does not move in accordance with the movement of the shaft H. Namely, the shaft H is moved so as to extend the conveyance surface without moving the conveyance surface. Therefore, the group of packaged objects 110 is not moved. Further, a shaft L of the extendable conveyance unit 420 is horizontally moved in the direction indicated by the arrow R7.

Figure 7:
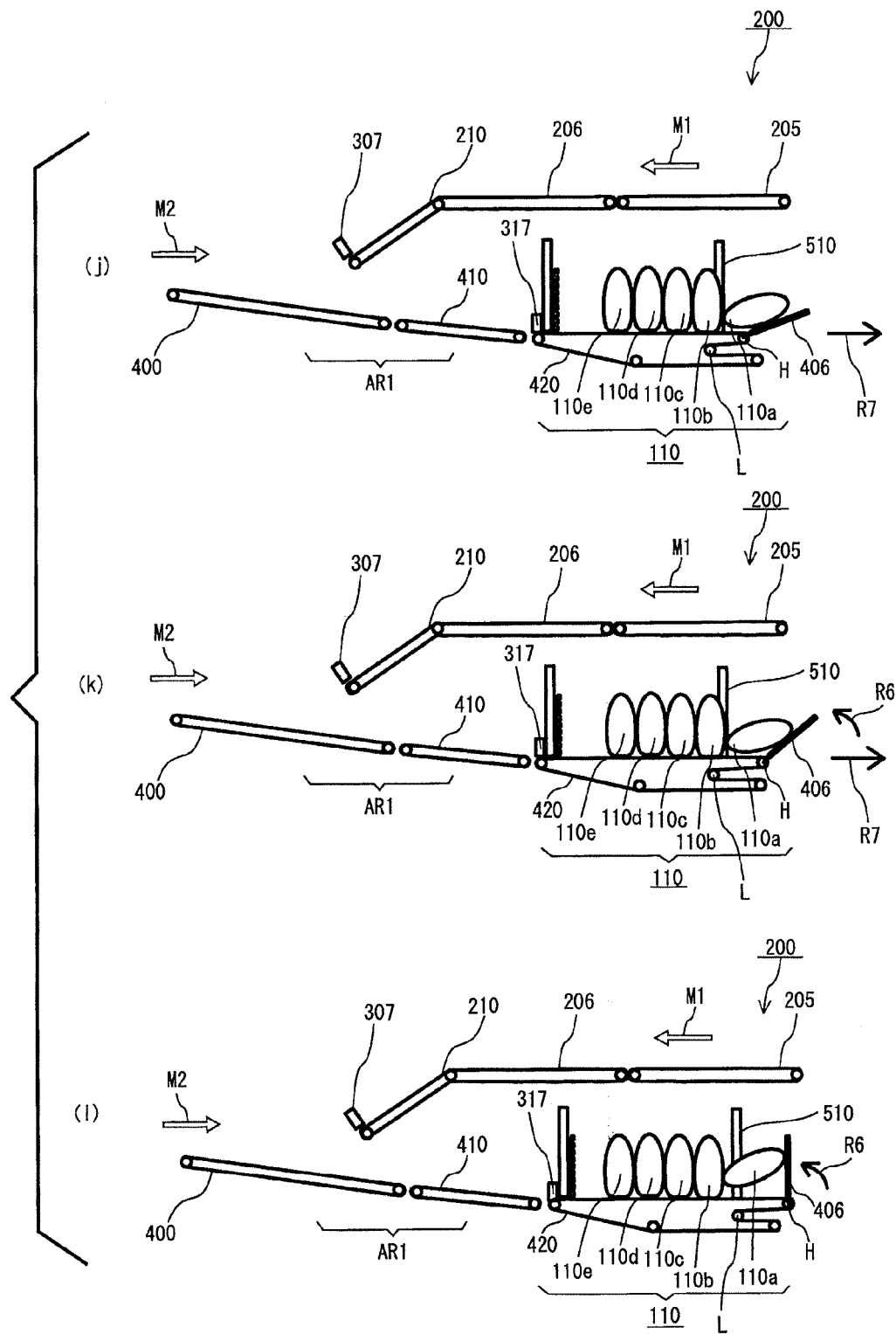
FIG. 7 is a schematic side view showing outlines of operations performed by the first conveyance unit, the second conveyance unit, the third conveyance unit, and the extendable conveyance unit of the package apparatus for the packaged objects.

Subsequently, as shown in FIG. 7(*k*), while the shaft H of the extendable conveyance unit 420 is being moved in the direction indicated by the arrow R7, the second position control plate 406 starts to be rotated in the direction indicated by the arrow R6. In this case, the shaft L of the extendable conveyance unit 420 is further moved in the direction indicated by the arrow R7. The first packaged object 110*a* among the group of packaged objects 110 is supported by the second position control plate 406, and approaches the standing position.

Next, as shown in FIG. 7(*l*), the second position control plate 406 is further rotated in the direction indicated by the arrow R6. Thus, the first packaged object 110*a* enters an almost standing position.

Figure 8:
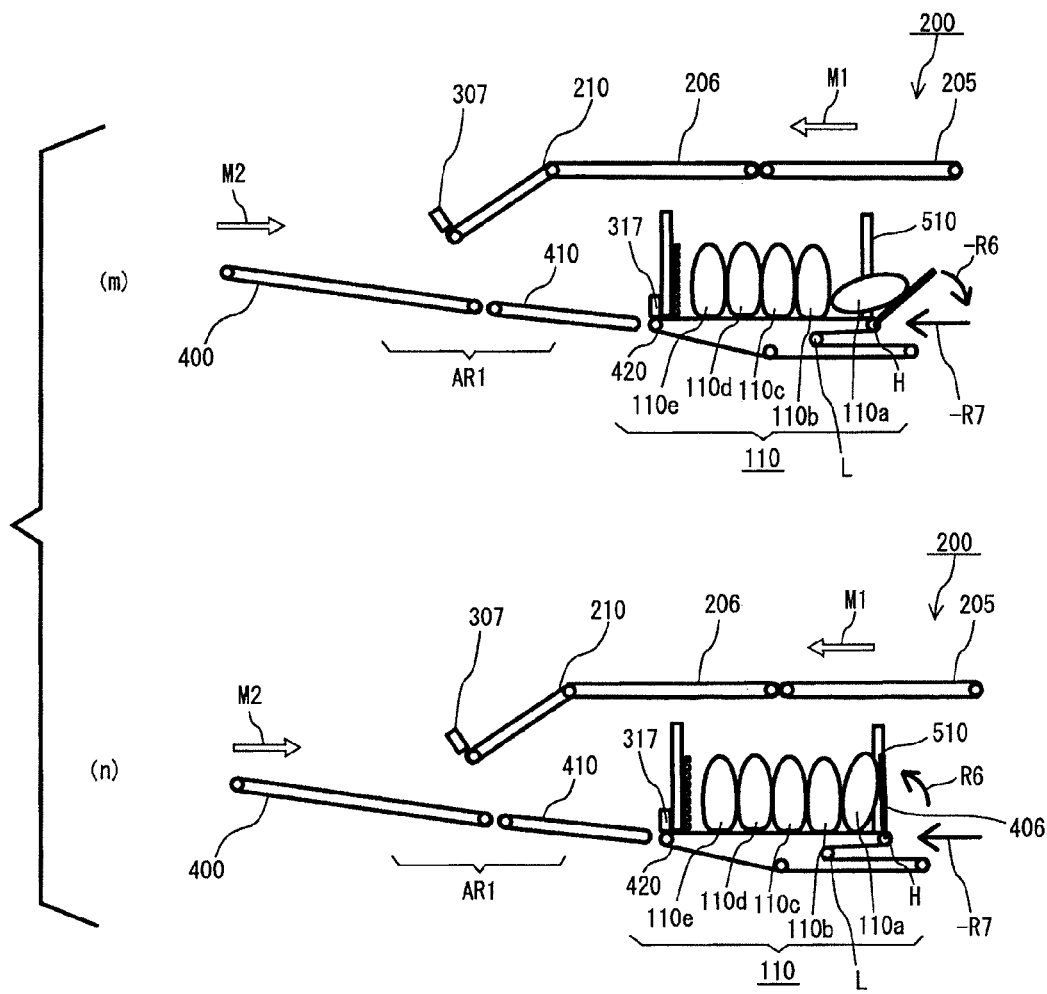
FIG. 8 is a schematic side view showing the outlines of the operations performed by the first conveyance unit, the second conveyance unit, the third conveyance unit, and the extendable conveyance unit of the package apparatus for the packaged objects.

Next, as shown in FIG. 8(*m*), the second position control plate 406 and the shaft H of the extendable conveyance unit 420 are moved in the direction indicated by an arrow –R7 (the direction opposite to the direction indicated by the arrow R7), and the second position control plate 406 is rotated in the direction indicated by an arrow –R6 (a direction opposite to the direction indicated by the arrow R6). Thus, the shaft H is moved to the vicinity of the bottom portion of the first packaged object 110*a*.

Subsequently, as shown in FIG. 8(*n*), while the second position control plate 406 is being rotated in the direction indicated by the arrow R6, the shaft H of the extendable conveyance unit 420 is moved in the direction indicated by the arrow –R7 (the direction opposite to the direction indicated by the arrow R7), thereby compressing the group of packaged objects 110. Thus, the first packaged object 110*a* assuredly enters the standing position.

Figure 9:
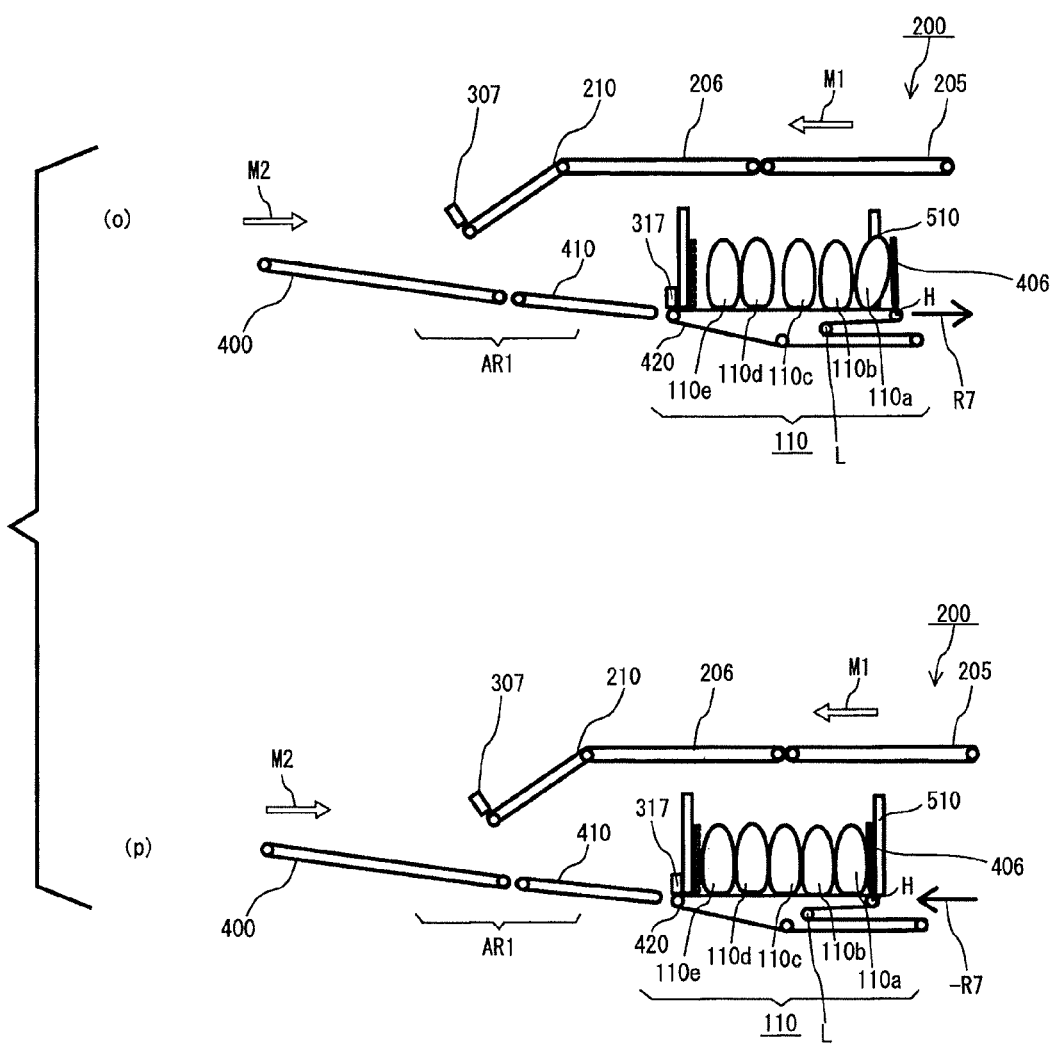
FIG. 9 is a schematic side view showing the outlines of the operations performed by the first conveyance unit, the second conveyance unit, the third conveyance unit, and the extendable conveyance unit of the package apparatus for the packaged objects.

Finally, the shaft H of the extendable conveyance unit 420 is moved in the direction indicated by the arrow R7 as shown in FIG. 9(*o*), and thereafter the shaft H of the extendable conveyance unit 420 is moved in the direction indicated by the arrow –R7 (the direction opposite to the direction indicated by the arrow R7), as shown in FIG. 9(*p*). That is, the group of packaged objects 110 is temporarily in a released position, and then compressed. Thus, the position of the group of packaged objects 110 can be assuredly aligned. Thereafter, the third position control plate 407 allows the group of packaged objects 110 to be moved to a package apparatus (in the far direction of the drawings) used in the immediately following process step.

In FIG. 4 to FIG. 9, the second position control plate 406 waits for the group of packaged objects 110 in a state where the second position control plate 406 is slightly rotated in the direction indicated by the arrow R6 from the horizontal position. However, the present invention is not limited thereto. The second position control plate 406 may wait for the group of packaged objects 110 in a state where the second position control plate 406 is slightly rotated in the direction opposite to the direction indicated by the arrow R6 from the horizontal position.

In the present embodiment, the shaft H shown in FIG. 7(*j*) is operated so as to prevent the conveyance surface from moving. However, the present invention is not limited thereto. The shaft H may be controlled so as to move the conveyance surface in the direction indicated by the arrow M2.

Next, operations for changing a tilt angle of the second conveyance unit 400, and intermittently driving the second conveyance unit 400 will be described with reference to FIG. 10 to FIG. 15. FIG. 10 to FIG. 15 are each a schematic diagram illustrating examples in which the tilt angle of the second conveyance unit 400 is changed and the second conveyance unit 400 is intermittently driven.

Figure 10:
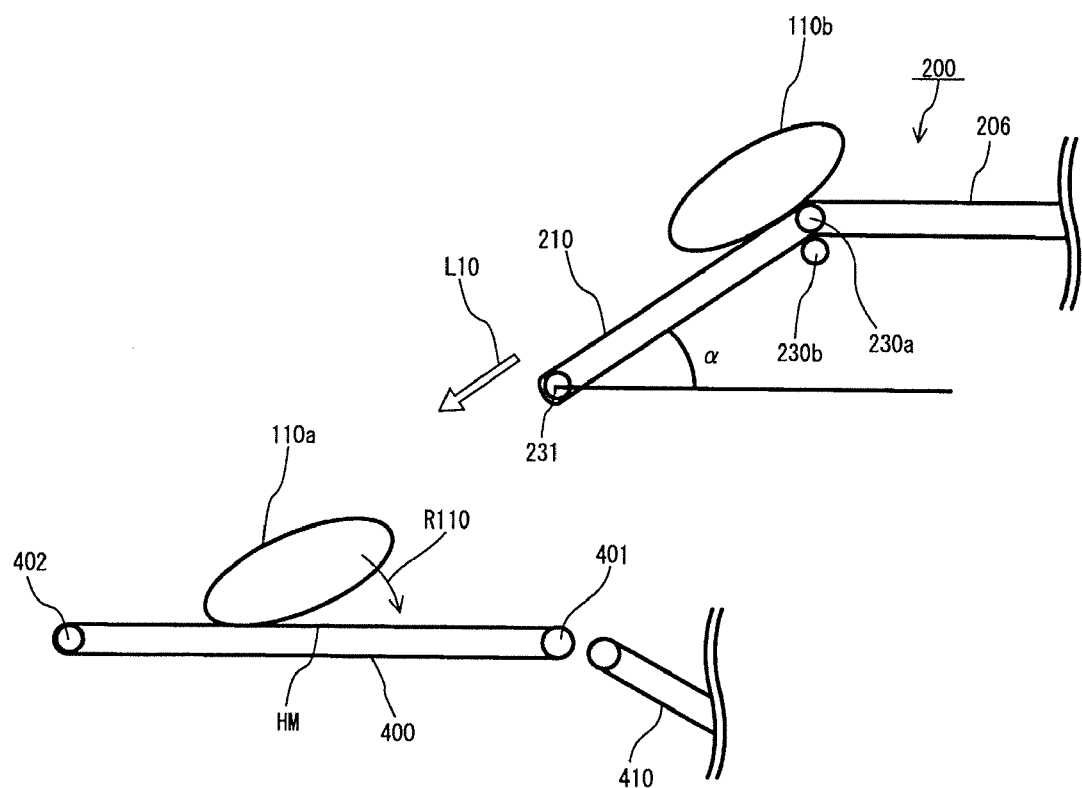
FIG. 10 is a schematic diagram illustrating examples in which a tilt angle of the second conveyance unit is changed and the second conveyance unit is intermittently driven.
Figure 11:
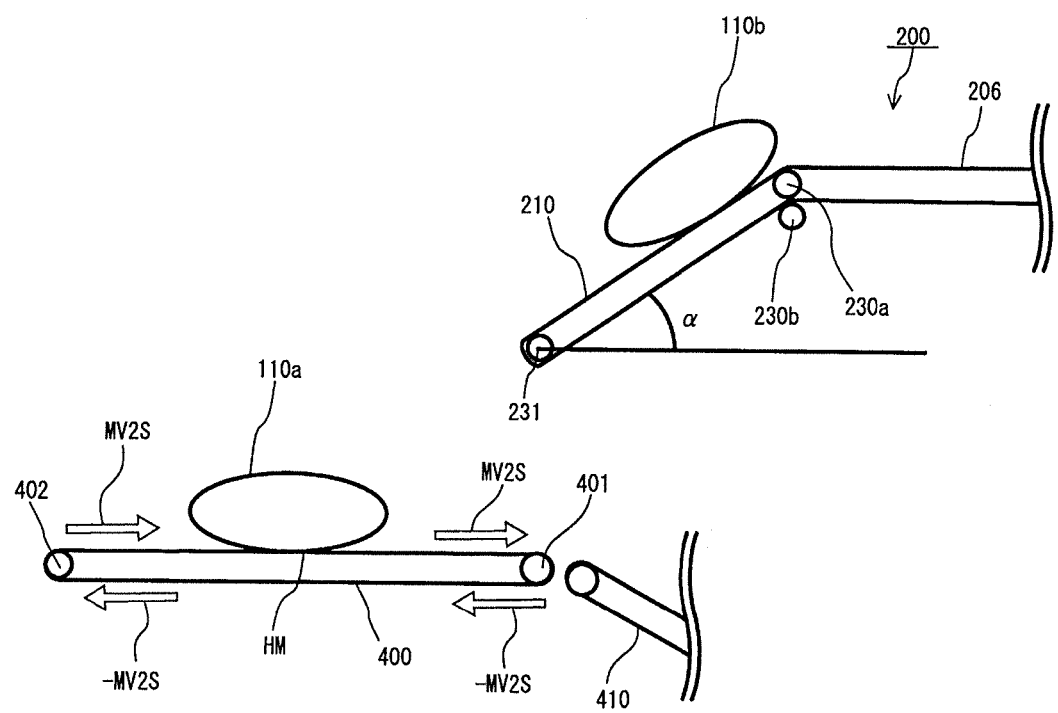
FIG. 11 is a schematic diagram illustrating the examples in which the tilt angle of the second conveyance unit is changed and the second conveyance unit is intermittently driven.

Firstly, as shown in FIG. 10, the second conveyance unit 400 is provided along an almost horizontal plane. The packaged object 110*a* is delivered from the tilt unit 210 of the first conveyance unit 200 toward the conveyance surface HM of the second conveyance unit 400 in the direction indicated by an arrow L10. The packaged object 110*a* contacts the conveyance surface HM of the second conveyance unit 400, and is rotated by its own weight in the direction indicated by an arrow R110. Consequently, as shown in FIG. 11, the packaged object 110*a* falls on the conveyance surface HM of the second conveyance unit 400. In this case, since the second conveyance unit 400 is provided along the almost horizontal plane, even when the packaged object 110*a* has such a shape as to facilitate the rolling of the packaged object 110*a*, the first packaged object 110*a* among the group of packaged objects 110 can be positioned in the stabilized position on the conveyance surface HM.

Figure 12:
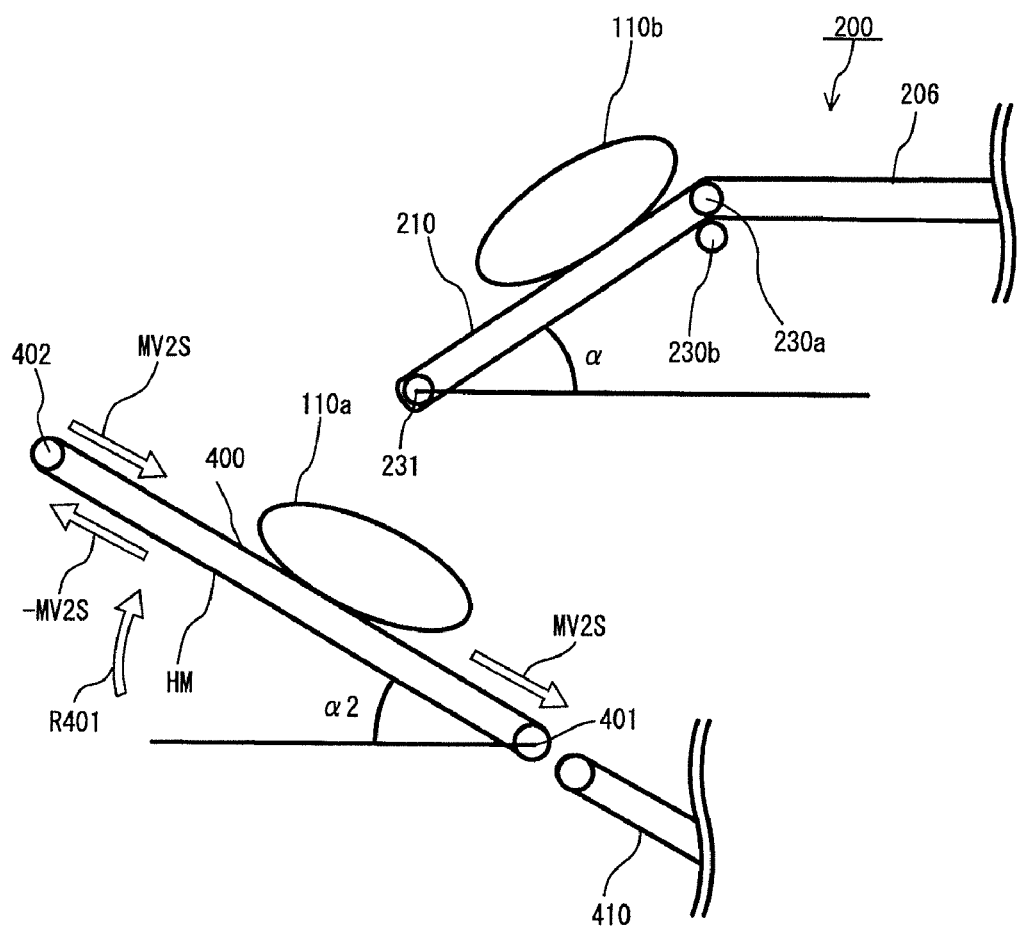
FIG. 12 is a schematic diagram illustrating the examples in which the tilt angle of the second conveyance unit is changed and the second conveyance unit is intermittently driven.

Subsequently, as shown in FIG. 12, the second conveyance unit 400 rotates about an axis 401 in the direction indicated by an arrow R401 so as to be tilted at an angle α2. Thus, the second conveyance unit 400 is tilted at the same angle as the conveyance surface of the third conveyance unit 410.

Figure 13:
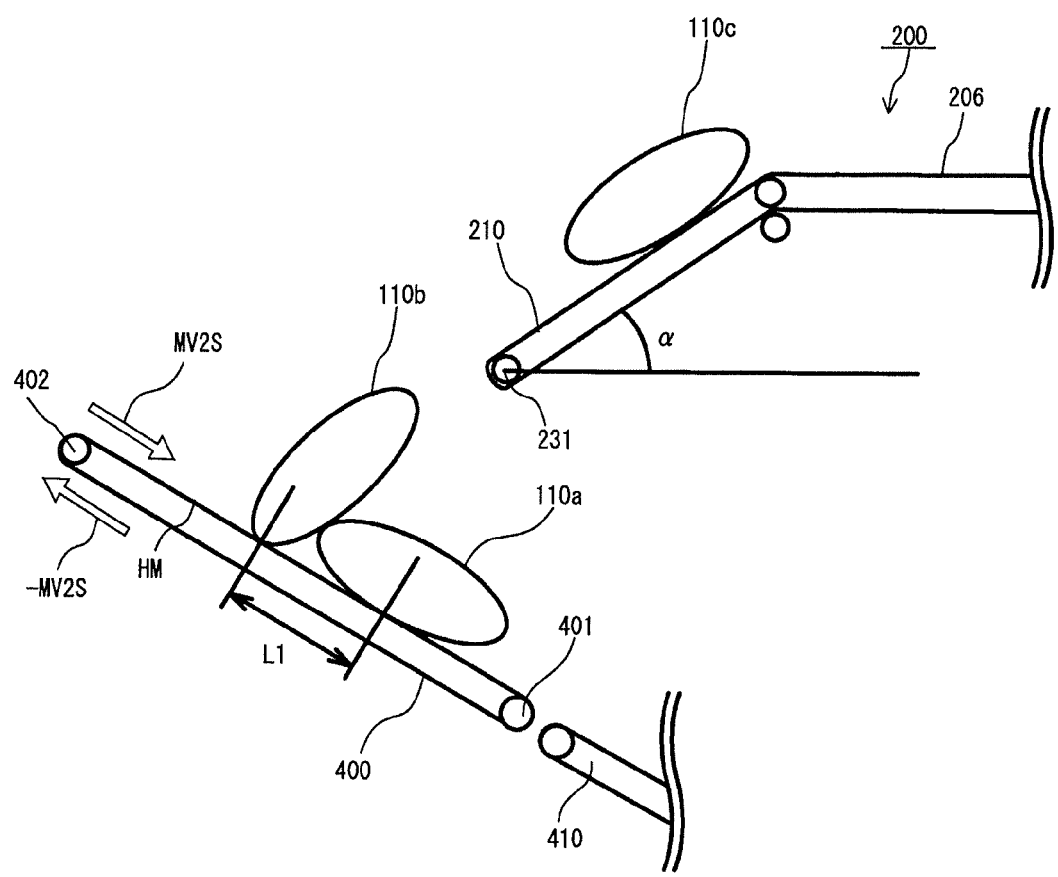
FIG. 13 is a schematic diagram illustrating the examples in which the tilt angle of the second conveyance unit is changed and the second conveyance unit is intermittently driven.

As shown in FIG. 12 and FIG. 13, the second conveyance unit 400 is rotated to move in the direction indicated by an arrow MV2S (the second conveyance unit 400 is rotated to move on the reverse lower side in the direction indicated by an arrow –MV2S). The second conveyance unit 400 is intermittently driven so as to move over the distance L1, so that the packaged object 110*a* is moved over the distance L1. When the packaged object 110*a* has been moved over the distance L1, the second conveyance unit 400 is driven so as to stop moving.

The distance L1 is determined such that the second packaged object 110*b* is positioned on the conveyance surface HM in the standing position when the second packaged object 110*b* is delivered from the tilt unit 210 of the first conveyance unit 200 to the second conveyance unit 400 on the conveyance surface HM thereof.

Specifically, the distance L1 is calculated by summing up a value corresponding to half the length of the packaged object 110*a*, a value corresponding to half the thickness of the packaged object 110*b*, and a margin (about +5 mm). Consequently, the side portion of the second packaged object 110*b* contacts the end edge of the first packaged object 110*a*. Therefore, the second packaged object 110*b* can enter the standing position.

Figure 14:
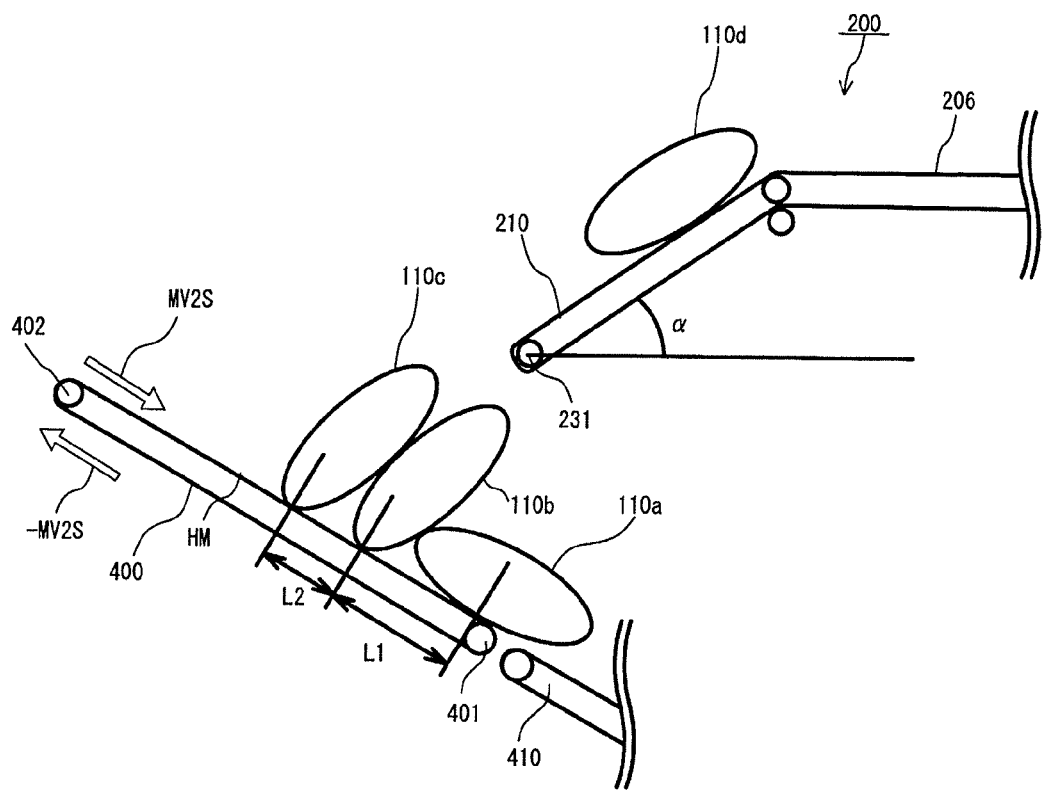
FIG. 14 is a schematic diagram illustrating the examples in which the tilt angle of the second conveyance unit is changed and the second conveyance unit is intermittently driven.

Subsequently, as shown in FIG. 14, the second conveyance unit 400 is rotated to move in the direction indicated by the arrow MV2S (the second conveyance unit 400 is rotated to move on the reverse lower side in the direction indicated by the arrow –MV2S). The second conveyance unit 400 is intermittently driven so as to move over a distance L2, so that each of the packaged object 110*a* and the packaged object 110*b* is moved over the distance L2. When the second conveyance unit 400 is driven so as to move each of the packaged object 110*a* and the packaged object 110*b* over the distance L2, the second conveyance unit 400 is driven so as to stop moving.

The distance L2 is determined such that the third packaged object 110*c* is positioned on the conveyance surface HM in the standing position when the third packaged object 110*c* is delivered from the tilt unit 210 of the first conveyance unit 200 to the second conveyance unit 400 on the conveyance surface HM thereof. Specifically, the distance L2 is calculated by summing up a value corresponding to half the thickness of the packaged object 110b, a value corresponding to half the thickness of the packaged object 110c, and a margin (about +5 mm). Consequently, the side portion of the third packaged object 110c in the standing position contacts the side portion of the second packaged object 110b. Therefore, the third packaged object 110c can enter the standing position.

Figure 15:
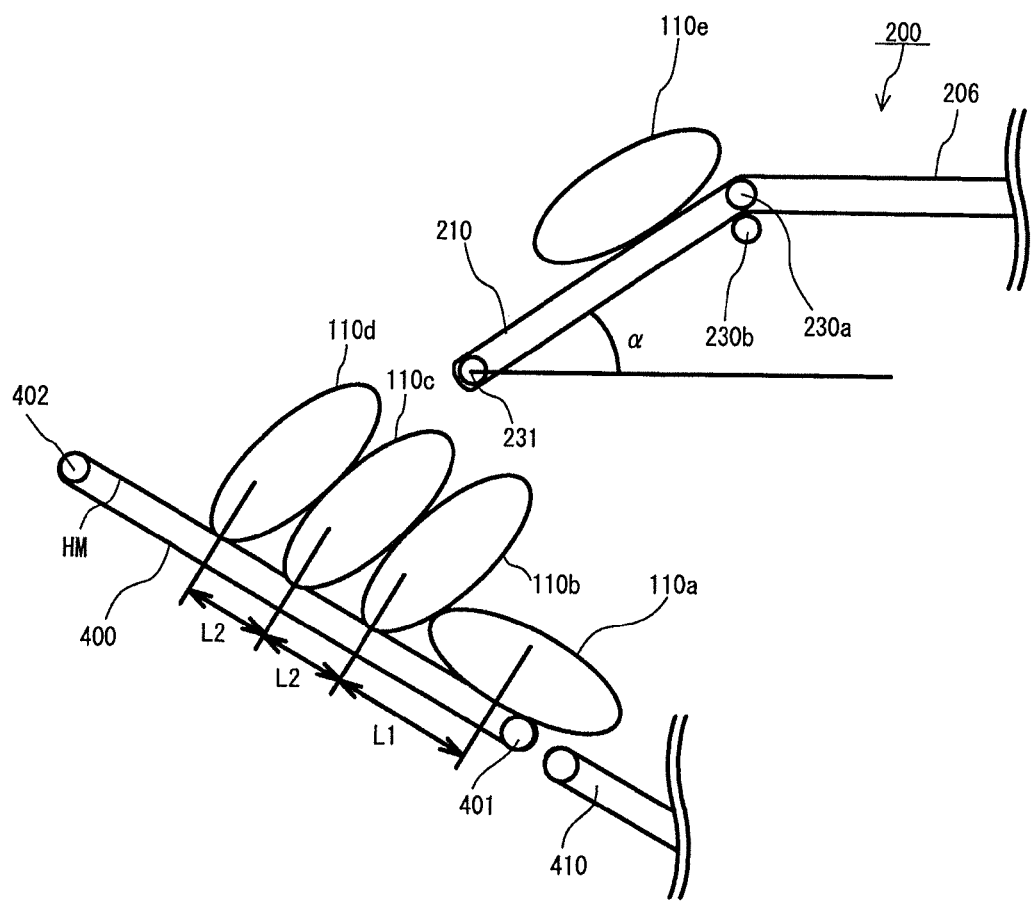
FIG. 15 is a schematic diagram illustrating the examples in which the tilt angle of the second conveyance unit is changed and the second conveyance unit is intermittently driven.

Subsequently, as shown in FIG. 15, the second conveyance unit 400 is intermittently driven so as to move over the distance L2, so that each of the packaged object 110a, the packaged object 110b, and the packaged objects 110c is moved over the distance L2. When the packaged object 110a, the packaged object 110b, and the packaged objects 110c are moved over the distance L2, the second conveyance unit 400 is driven so as to stop moving.

The distance L2 shown in FIG. 15 is equal to the distance L2 shown in FIG. 14. Consequently, the side portion of the fourth packaged object 110d contacts the side portion of the third packaged object 110c.

As described above, the second conveyance unit 400 is intermittently driven such that the first packaged object 110a is moved over the distance L1 when the first packaged object 110a is delivered to the conveyance surface HM, and each of the first packaged object 110a, the second packaged object 110b, and the subsequent packaged objects 110c, 110d, and 110e is moved over the distance L2 when each of the second and the subsequent packaged objects are delivered to the conveyance surface HM, thereby enabling the second packaged object 110b and the subsequent packaged objects to be in the standing positions.

In the present embodiment, the second conveyance unit 400 is intermittently driven. However, the present invention is not limited thereto. The second conveyance unit 400 may be driven such that a speed of the second conveyance unit 400 is continuously changed depending on the distance L1 and the distance L2 in accordance with a time at which the packaged object is delivered from the first conveyance unit 200, without stopping driving the second conveyance unit 400.

Further, the second conveyance unit 400 may be driven so as to move at a constant speed, and the first conveyance unit 200 may be driven so as to move at a variable speed. In this case, a time period between a time at which the first packaged object 110a is delivered from the first conveyance unit 200 to the second conveyance unit 400 and a time at which the second packaged object 110b is delivered from the first conveyance unit 200 to the second conveyance unit 400 may be set so as to be different from a time period between a time at which the second packaged object 110b is delivered from the first conveyance unit 200 to the second conveyance unit 400 and a time at which the third packaged object 110c is delivered from the first conveyance unit 200 to the second conveyance unit 400.

Further, in the present embodiment, a tilt angle of the second conveyance unit 400 is set such that the first packaged object 110a is received on the almost horizontal plane. However, the present invention is not limited thereto. A tilt angle of the second conveyance unit 400 may be another angle if the tilt angle at which the first packaged object 110a is received is different from the tilt angle at which each of the second packaged object 110b and the subsequent packaged objects 110c, 110d, and 110e is received.

Further, the tilt angle α2 at which each of the second packaged object 110b and the subsequent packaged objects 110c, 110d, and 110e is received is equal to the tilt angle of the third conveyance unit 410. However, the present invention is not limited thereto. The tilt angle α2 may be another angle if the tilt angle at which the first packaged object 110a is received is different from the tilt angle at which each of the second packaged object 110b and the subsequent packaged objects 110c, 110d, and 110e is received.

As described above, in the package apparatus 100 according to the present invention, the control unit 301 performs a control such that the tilt angle α2 of the second conveyance unit 400 is different for the first packaged object 110a among the group of packaged objects 110 and for the second packaged object 110b and the subsequent packaged objects 110c, 110d, and 110e among the group of packaged objects 110. Therefore, when the group of packaged objects 110 is formed, the position of the first packaged object 110a can be stabilized, and the second packaged object 110b can be caused to contact the first packaged object 110a, thereby forming and conveying the group of packaged objects 110 in a stable position. That is, if the second conveyance unit 400 is tilted, when the packaged object 110a falls, the position of the packaged object 110a is not stabilized. In particular, in a case where the packaged object 110a has a circular portion, the packaged object 110a may roll when falls, so that the position may become unbalanced. On the other hand, when the second conveyance unit 400 is in the almost horizontal position, the position of the packaged object 110a can be maintained stable, thereby preventing the packaged object 110a from rolling.

Further, the control unit 301 performs the control such that, when the packaged objects 110b, 110c, 110d, and 110e, other than the first packaged object 110a, among the group of packaged objects 110 fall from the first conveyance unit 200 onto the second conveyance unit 400, the second conveyance unit 400 is tilted at the tilt angle α2. Therefore, on the second conveyance unit 400, the second packaged object 110b can lean against the first packaged object 110a, the third packaged object 110c can lean against the second packaged object 110b, the fourth packaged object 110d can lean against the third packaged object 110c, and the fifth packaged object 110e can lean against the fourth packaged object 110d. Consequently, the group of packaged objects 110 can be stably conveyed.

Further, the tilt angle at which the third conveyance unit 410 is tilted is equal to the tilt angle α2 at which the second conveyance unit 400 is tilted, thereby conveying the group of packaged objects 110 in stable position. Further, the surface of each of the belts of the belt conveyors of the second conveyance unit 400 and the third conveyance unit 410 is formed of a material having an increased frictional force as compared to a material of the surface of the belt of the belt conveyor of the extendable conveyance unit 420. Therefore, it is possible to prevent each packaged object among the group of packaged objects 110 from slipping on the second conveyance unit 400 and the third conveyance unit 410, thereby conveying the group of packaged objects 110 in the stable position.

Moreover, in the package apparatus 100 according to the present invention, the control unit 301 controls at least one of the first conveyance unit 200 and the second conveyance unit 400 such that the second packaged object 110b and the subsequent packaged objects among the group of packaged objects 110 are in the standing positions in which the conveying direction axes of the second packaged object 110b and the subsequent packaged objects are tilted at an angle ranging from −45 degrees to +45 degrees relative to the direction perpendicular to the conveyance surface HM of the second conveyance unit 400. Consequently, the second packaged object 110b and the subsequent packaged objects among the group of packaged objects 110 are conveyed in the standing positions, thereby stably conveying the group of packaged objects 110. In particular, even when the packaged objects 110a, 110b, 110c, 110d, and 110e each have an increased thickness, the packaged objects among the group of packaged objects 110 can be aligned and conveyed in the stabilized positions.

Second Embodiment

Figure 16:
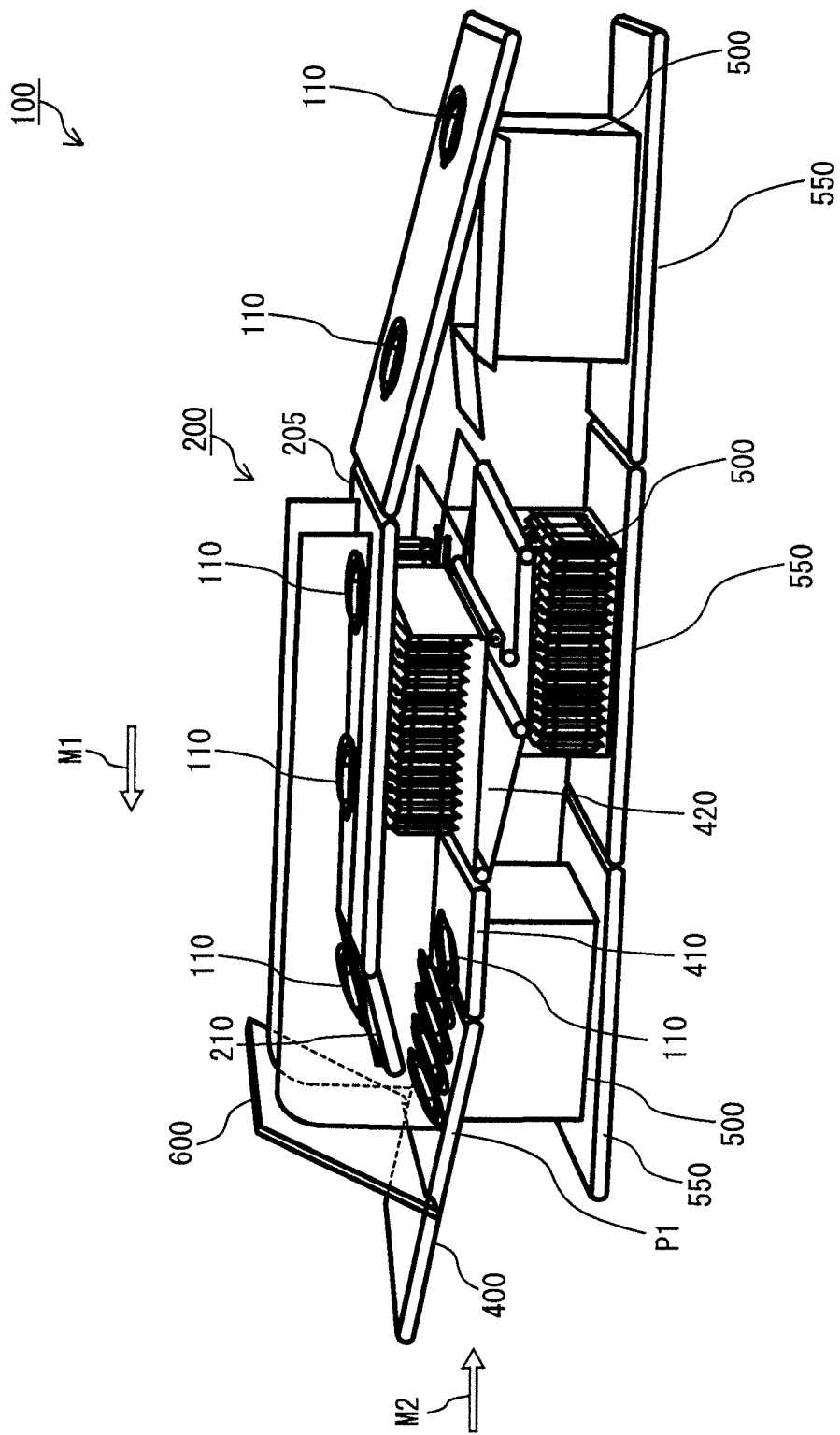
FIG. 16 is a schematic diagram illustrating an exemplary external appearance of a package apparatus for packing packaged objects in boxes, according to a second embodiment.

Hereinafter, a package apparatus 100 according to a second embodiment will be described. For the package apparatus 100 according to the second embodiment, components and operations different from those of the package apparatus 100 according to the first embodiment will be mainly described. FIG. 16 is a schematic diagram illustrating an exemplary external appearance of the package apparatus 100 according to the second embodiment.

The package apparatus 100 shown in FIG. 16 includes a first horizontal unit 205 as the first horizontal unit 205 and the second horizontal unit 206, and further includes a rotation prevention guide unit 600.

A first conveyance unit 200 shown in FIG. 16 moves a plurality of packaged objects in the direction indicated by an arrow M1. The first conveyance unit 200 includes the first horizontal unit 205 and a tilt unit 210, and the tilt unit 210 is provided immediately following the first horizontal unit 205.

Below the first conveyance unit 200, a second conveyance unit 400, a third conveyance unit 410, and an extendable conveyance unit 420 are provided. The second conveyance unit 400 is provided so as to be tilted at an angle α2 relative to the horizontal plane (see FIG. 18).

In this case, since the second conveyance unit 400 is provided so as to be tilted at the angle α2, in a case where a predetermined number of plural packaged objects are collected as a group of packaged objects 110 and conveyed downstream, a first packaged object 110a among the group of packaged objects 110 falls onto a collection portion AR1 of the second conveyance unit 400 to lie on its side, and a second packaged object 110b and the subsequent packaged objects lean against the first packaged object 110a having fallen on the second conveyance unit 400, and enter the standing positions.

Figure 17:
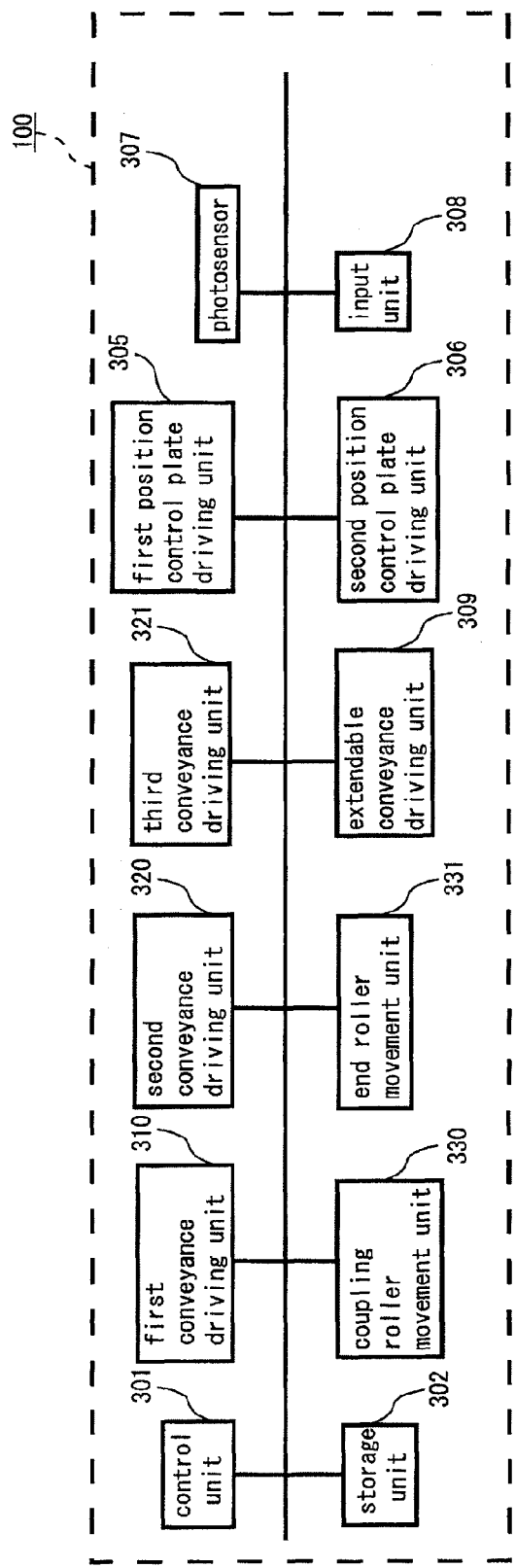
FIG. 17 is a schematic structure diagram illustrating main components of the package apparatus for packaged objects.

Next, FIG. 17 is a schematic structure diagram illustrating main components of the package apparatus 100.

As shown in FIG. 17, the package apparatus 100 includes a photosensor 307 instead of the first photosensor 307 and the second photosensor 317, and further includes a coupling roller movement unit 330 and an end roller movement unit 331.

Further, the coupling roller movement unit 330 is operable to change the length of the first horizontal unit 205 by positions of respective coupling rollers 230a and 230b provided between the first horizontal unit 205 and the tilt unit 210 being changed. The end roller movement unit 331 is operable to change the tilt angle of the tilt unit 210 by a position of the end roller 231 of the tilt unit 210 of the first conveyance unit 200 being changed.

Figure 18:
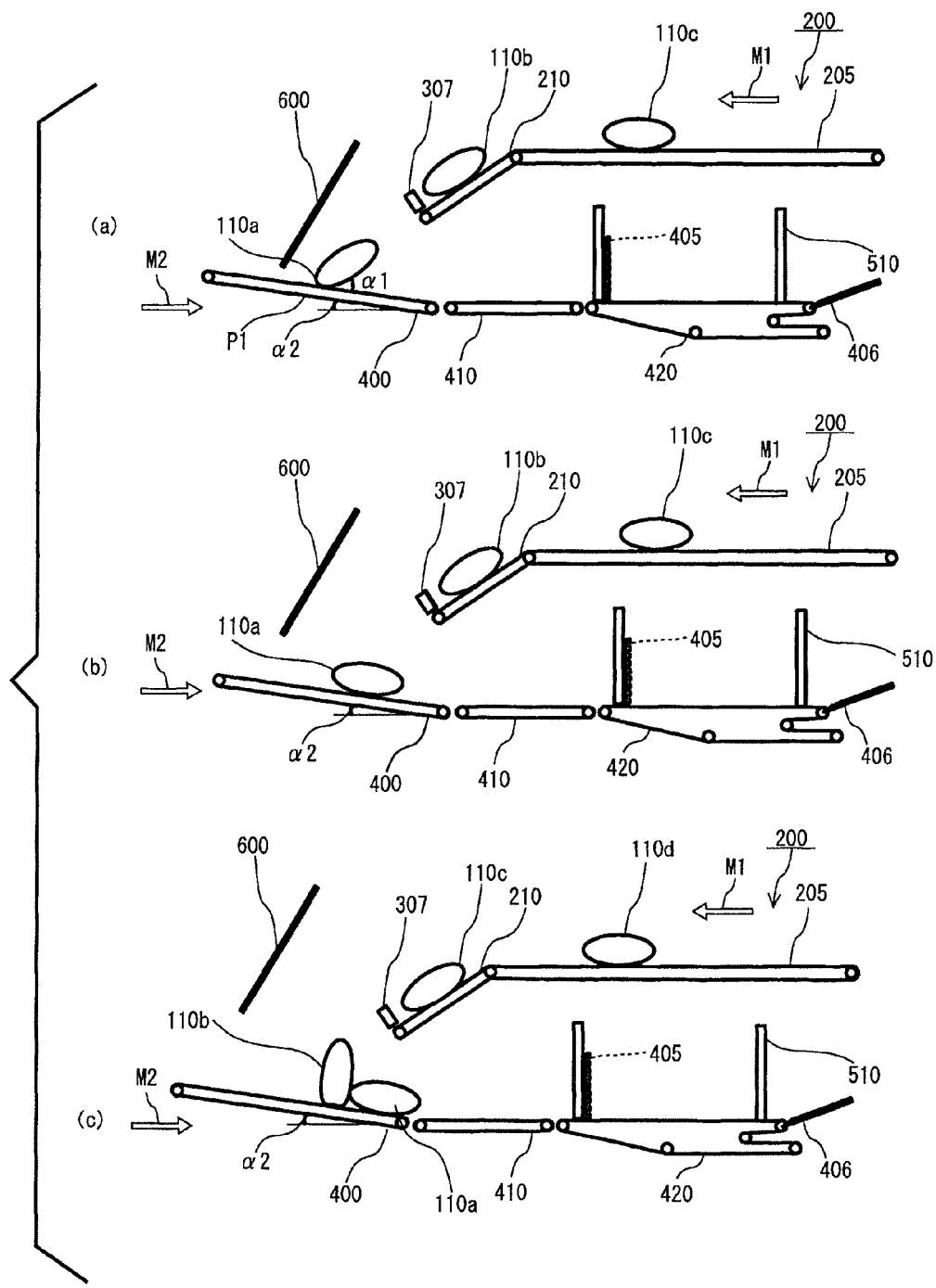
FIG. 18 is a schematic side view showing outlines of operations performed by a first conveyance unit, a second conveyance unit, a third conveyance unit, and an extendable conveyance unit of the package apparatus for packaged objects.

Next, FIG. 18 is a schematic side view showing outlines of operations which are performed by the first conveyance unit 200, the second conveyance unit 400, the third conveyance unit 410, and the extendable conveyance unit 420 of the package apparatus 100 according to the second embodiment. FIG. 18 shows only the process steps, according to the second embodiment, which are different from the process steps in the first embodiment.

Firstly, as shown in FIG. 18(a), the packaged object 110a is moved from the first conveyance unit 200 to a reception portion P1 of the second conveyance unit 400. The packaged object 110a is received at the reception portion P1 so as to be tilted at an angle α1. In this case, the second conveyance unit 400 is provided so as to be tilted at the angle α2.

As shown in FIG. 18(b), as in the package apparatus 100 according to the first embodiment, the packaged object 110a falls by its own weight, and is conveyed by a distance L1 in the direction indicated by an arrow M2 by the second conveyance unit 400.

Next, the package apparatus 100 according to the second embodiment will be described. Hereinafter, for the package apparatus 100 according to the second embodiment, operations which are different from those of the package apparatus 100 according to the first embodiment will be mainly described.

In the package apparatus 100 according to the second embodiment, the second conveyance unit 400 is not intermittently driven but is continuously driven at a constant speed whereas the operation of the tilt unit 210 of the first conveyance unit 200 is controlled so as to control positions of the packaged objects 110b, 110c, 110d, and 110e.

Next, an operation performed by the first conveyance unit 200 will be described with reference to FIG. 19 to FIG. 23. FIG. 19 to FIG. 23 are schematic diagrams illustrating an exemplary operation performed by the first conveyance unit 200.

Figure 19:
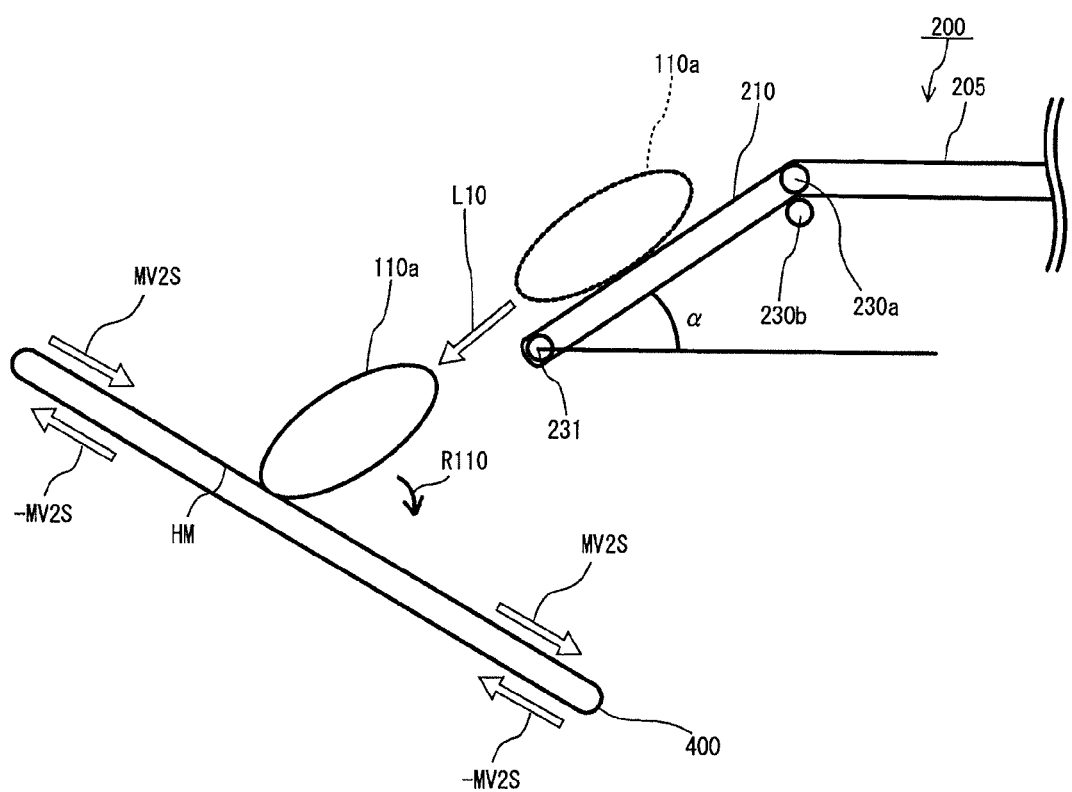
FIG. 19 is a schematic diagram illustrating an exemplary operation performed by the first conveyance unit.

As shown in FIG. 19, the tilt unit 210 of the first conveyance unit 200 is provided so as to be tilted at an angle α relative to the horizontal plane. The packaged object 110a falls from the tilt unit 210 of the first conveyance unit 200 toward the conveyance surface HM of the second conveyance unit 400 in the direction indicated by an arrow L10. The packaged object 110a contacts the conveyance surface HM of the second conveyance unit 400, and rotates by its own weight in the direction indicated by an arrow R110. Consequently, as shown in FIG. 19, the packaged object 110a falls on the conveyance surface HM of the second conveyance unit 400.

Figure 20:
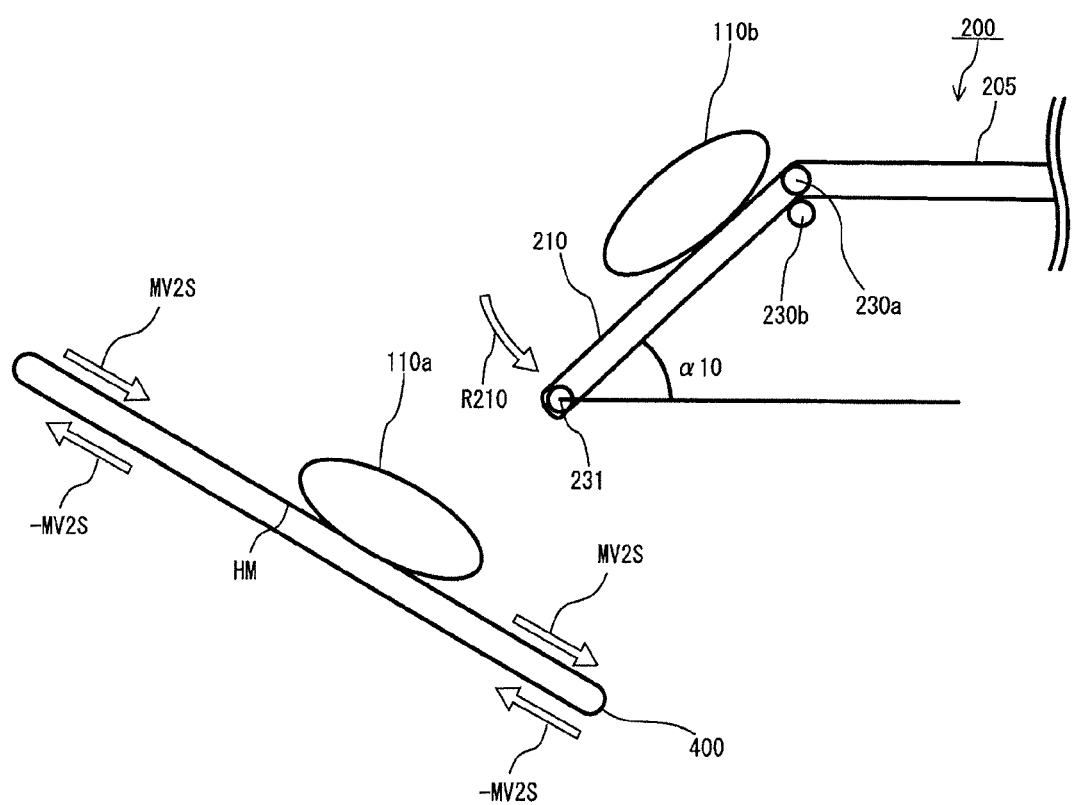
FIG. 20 is a schematic diagram illustrating the exemplary operation performed by the first conveyance unit.

Subsequently, as shown in FIG. 20, the tilt unit 210 of the first conveyance unit 200 is moved in the direction indicated by an arrow R210 such that an angle of the tilt unit 210 relative to the horizontal plane is changed from the angle α to an angle α10 (angle α<angle α10). In this case, the end roller movement unit 331 is operable to move the end roller 231 of the tilt unit 210.

Figure 21:
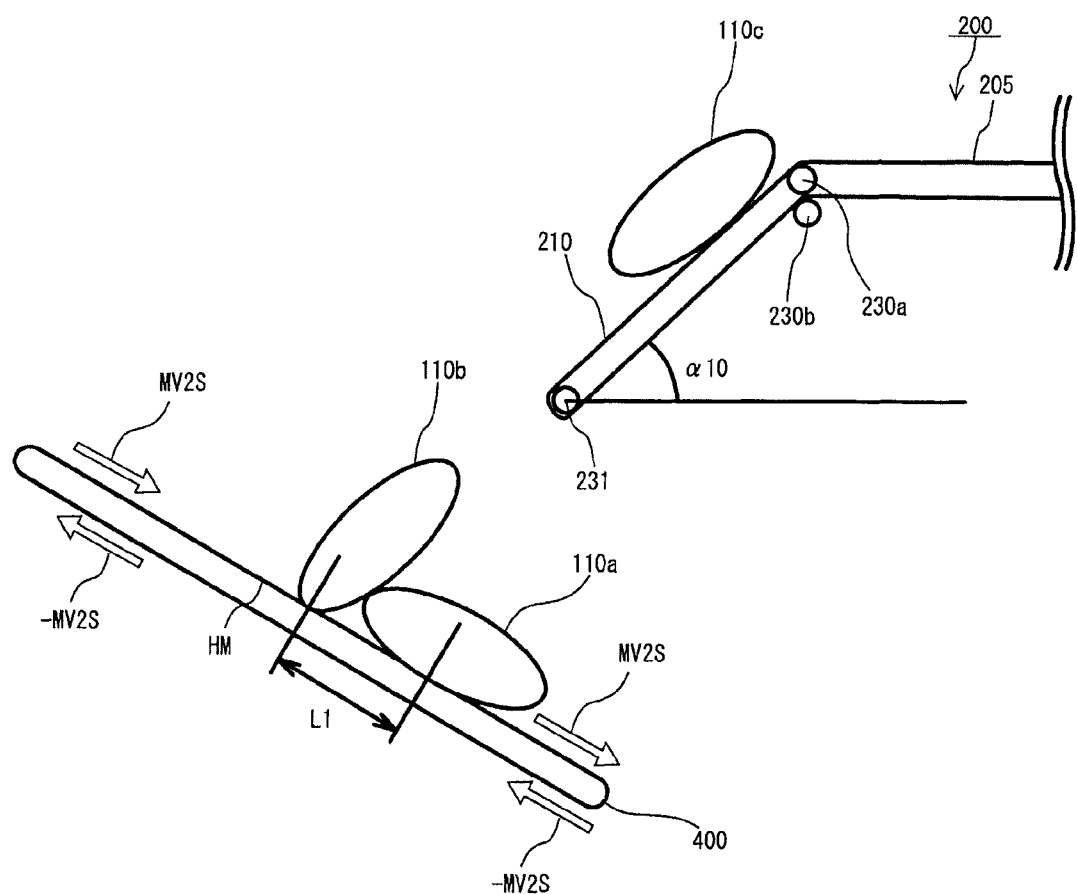
FIG. 21 is a schematic diagram illustrating the exemplary operation performed by the first conveyance unit.

Next, as shown in FIG. 21, the first packaged object 110a is moved by the second conveyance unit 400 which is driven at a constant speed. The second packaged object 110b is delivered from the tilt unit 210 tilted at the angle α10, to the second conveyance unit 400, on the conveyance surface HM thereof. In this case, a distance between the first packaged object 110a and the second packaged object 110b having been delivered is the distance L1.

Figure 22:
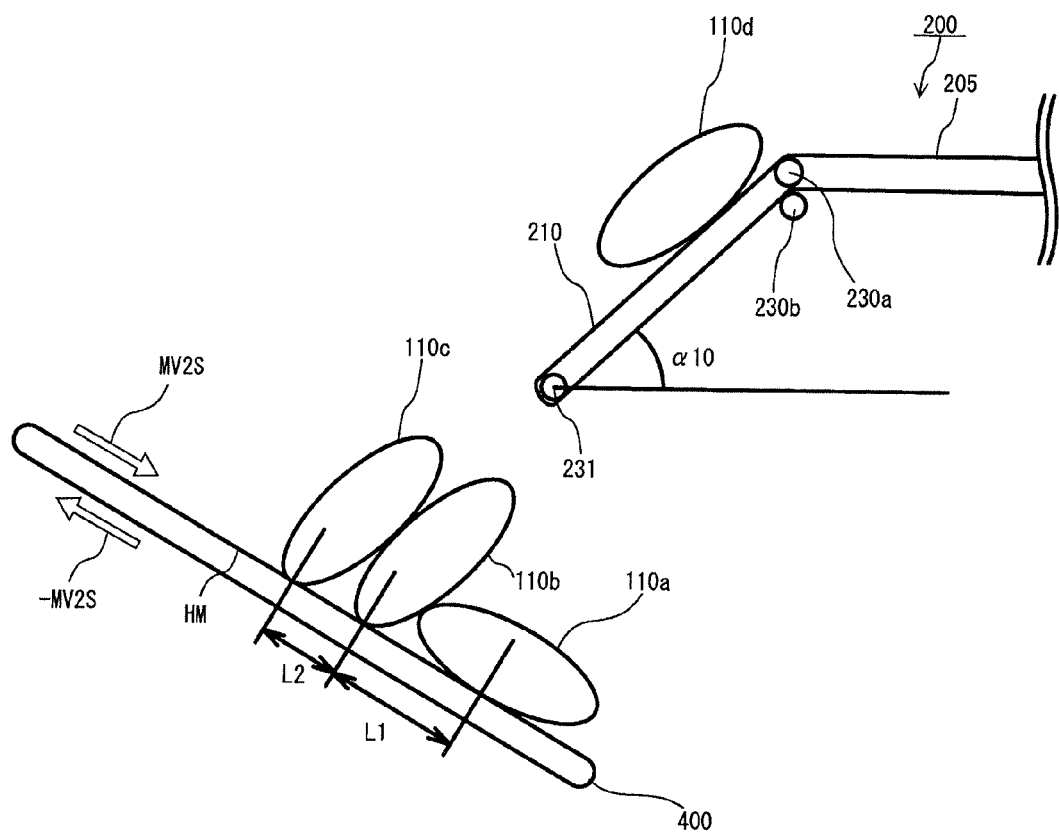
FIG. 22 is a schematic diagram illustrating the exemplary operation performed by the first conveyance unit.

Subsequently, as shown in FIG. 22, the first packaged object 110a and the second packaged object 110b are moved by the second conveyance unit 400 which is driven at the constant speed. The third packaged object 110c is delivered, and is then moved over a distance L2 so as to contact the side portion of the second packaged object 110b.

Figure 23:
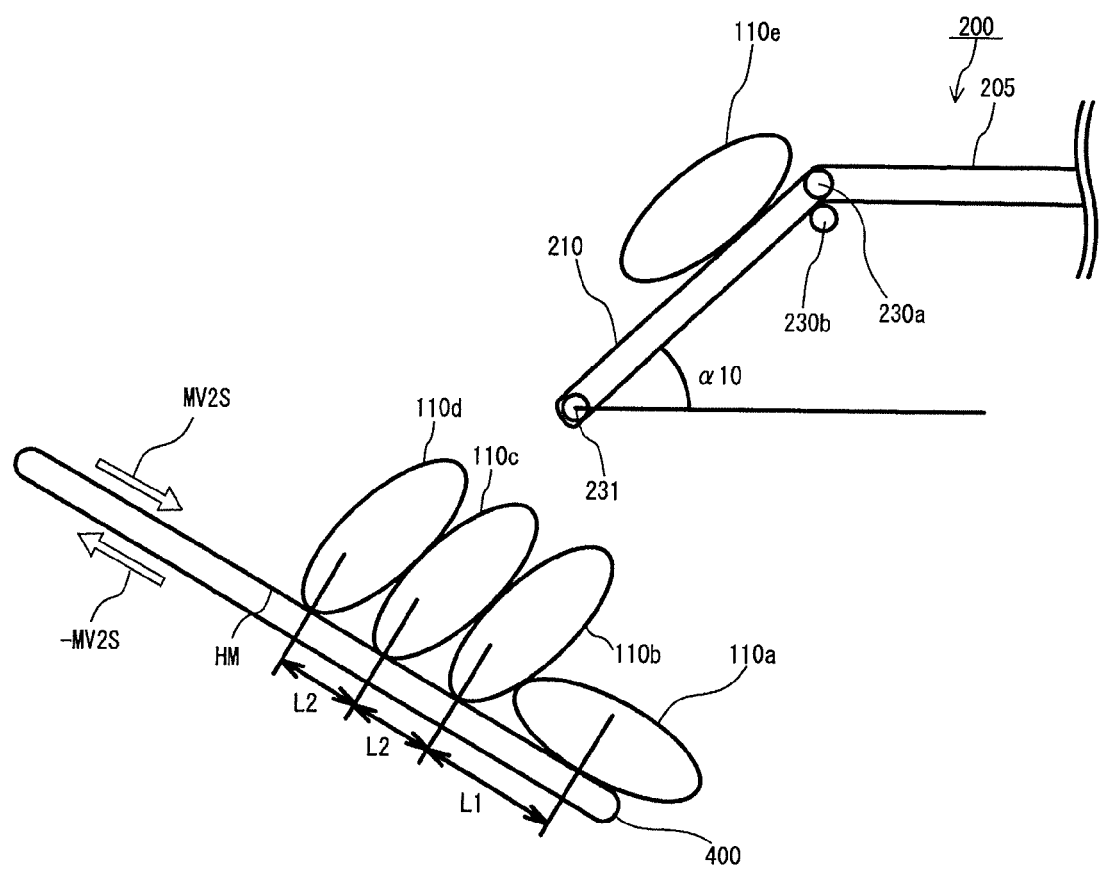
FIG. 23 is a schematic diagram illustrating the exemplary operation performed by the first conveyance unit.

Further, as shown in FIG. 23, the first packaged object 110a, the second packaged object 110b, and the third packaged object 110c are moved by the second conveyance unit 400 which is driven at the constant speed. The fourth packaged object 110d is delivered, and is then moved over the distance L2 so as to contact the side portion of the third packaged object 110c. Finally, the fifth packaged object 110e is similarly delivered, and is then moved over the distance L2 so as to contact the side portion of the fourth packaged object 110d.

In the present embodiment, the angle α of the tilt unit 210 is changed to the angle α10. However, the present invention is not limited thereto. The angle α of the tilt unit 210 may be changed to another angle depending on kinds of the packaged objects 110*a*, 110*b*, 110*c*, 110*d*, and 110*e*. The end roller 231 may be moved in the direction opposite to the direction indicated by the arrow R210.

Further, the angle α may be changed by means of the coupling roller movement unit 330, instead of the end roller movement unit 331, by each of the coupling rollers 230*a* and 230*b* provided between the tilt unit 210 and the first horizontal unit 205 being moved in the direction opposite to the direction indicated by the arrow M1. Furthermore, the angle α may be changed by means of both the end roller movement unit 331 and the coupling roller movement unit 330.

The packaged objects 110 are conveyed such that the longitudinal direction of the packaged objects 110 is orthogonal to the direction indicated by each of the arrow M1 and the arrow M2. However, the present invention is not limited thereto. The packaged objects 110 may be conveyed such that the longitudinal direction of the packaged objects 110 is along the direction indicated by each of the arrow M1 and the arrow M2.

In the first embodiment, the second conveyance unit 400 is intermittently driven, and in the second embodiment, the angle of the tilt unit 210 of the first conveyance unit 200 is variable. However, the present invention is not limited thereto. The second conveyance unit 400 may be intermittently driven together with the angle of the tilt unit 210 of the first conveyance unit 200 being variable.

As described above, the control unit 301 controls at least one of the first conveyance unit 200 and the second conveyance unit 400 such that the axis of the conveying direction in which the second packaged object 110*b* and the subsequent packaged objects among the group of packaged objects 110 are conveyed enables each of the second packaged object 110*b* and the subsequent packaged objects to be tilted, in the standing position, at an angle ranging from −45 degrees to +45 degrees relative to the direction perpendicular to the conveyance surface HM of the second conveyance unit 400. Consequently, the second packaged object 110*b* and the subsequent packaged objects among the group of packaged objects 110 are conveyed in the standing positions, thereby stably conveying the group of packaged objects 110. In particular, even when the packaged objects 110*a*, 110*b*, 110*c*, 11*d*, and 110*e* each have an increased thickness, each packaged object among the group of packaged objects 110 can be aligned and conveyed in the stabilized position.

Furthermore, at least one of an operation for controlling a speed of the first conveyance unit 200, an operation for intermittently driving the second conveyance unit 400, and an operation for controlling the angle of the tilt unit 210 of the first conveyance unit 200 is performed. Thus, the second packaged object 110*b* and the subsequent packaged objects are each controlled so as to be in the standing position on the conveyance surface HM of the second conveyance unit 400. Consequently, the group of packaged objects 110 can be stably conveyed.

Third Embodiment

Figure 24:
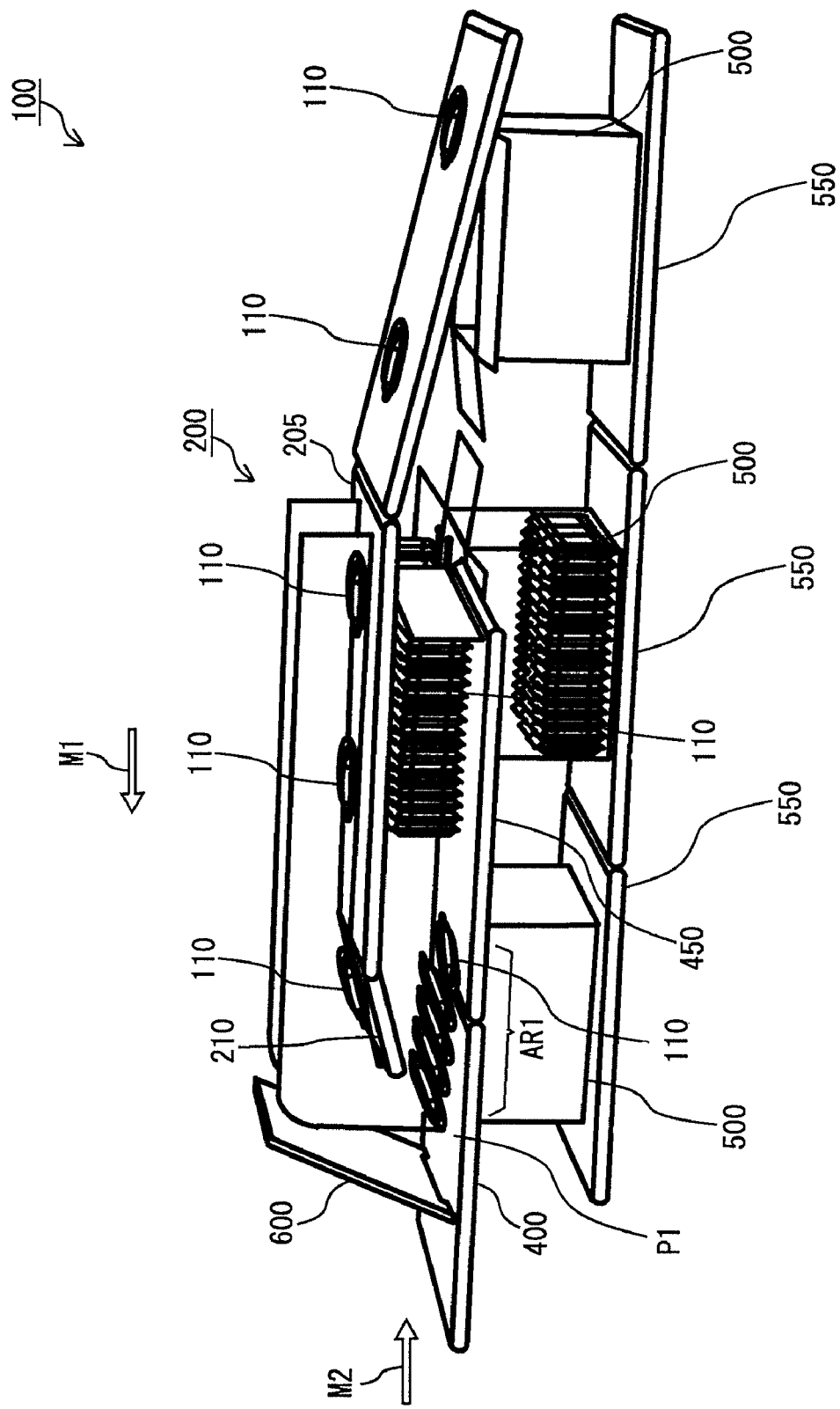
FIG. 24 is a schematic diagram illustrating an exemplary external appearance of a package apparatus for packing packaged objects in boxes, according to a third embodiment.
Figure 25:
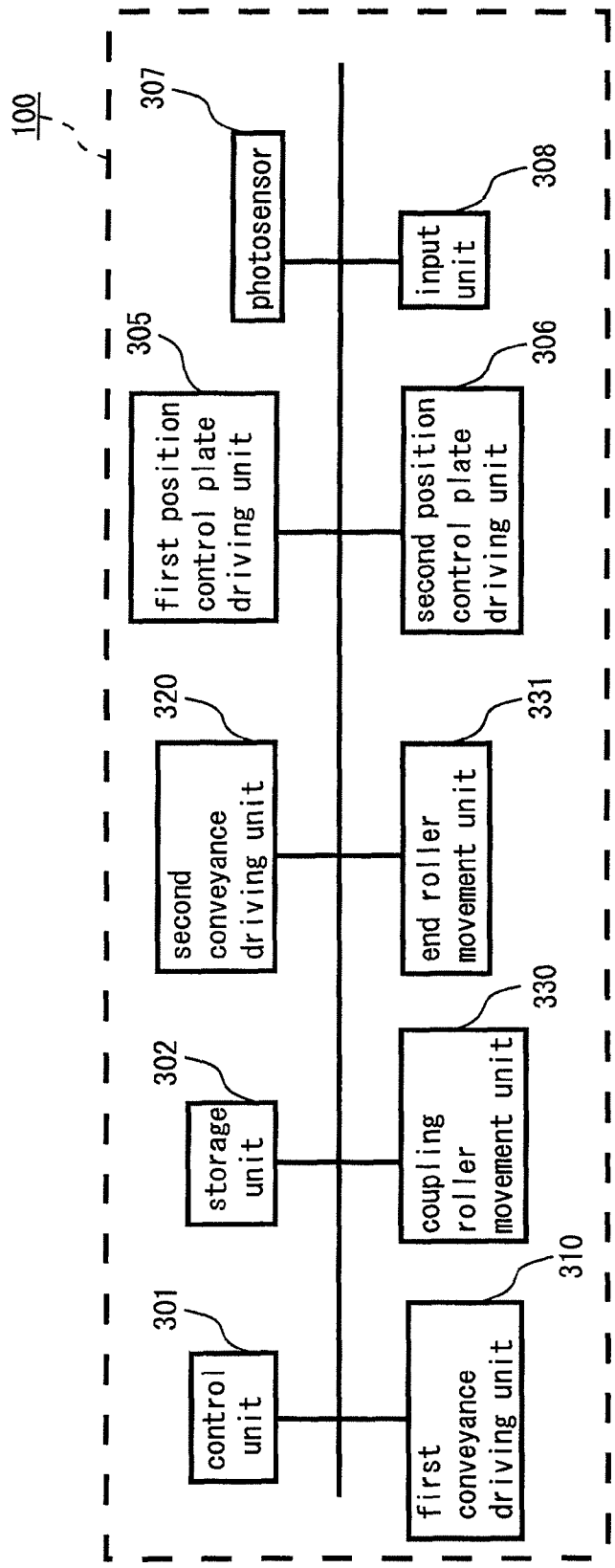
FIG. 25 is a schematic structure diagram illustrating main components of the package apparatus.

Hereinafter, a package apparatus 100 according to a third embodiment will be described. For the package apparatus 100 according to the third embodiment, components and operations which are different from those of the package apparatus 100 according to each of the first and the second embodiments will be mainly described. FIG. 24 is a schematic diagram illustrating an exemplary external appearance of the package apparatus 100 according to the third embodiment of the present invention. FIG. 25 is a schematic structure diagram illustrating main components of the package apparatus 100 according to the third embodiment.

As shown in FIG. 24, the package apparatus 100 may include second conveyance units 400 and 450 which are horizontally provided, without providing the extendable conveyance unit 420. As shown in FIG. 25, the package apparatus 100 may include: a control unit 301; a storage unit 302; a first position control plate driving unit 305; a second position control plate driving unit 306; a photosensor 307; an input unit 308; a first conveyance driving unit 310; a second conveyance driving unit 320; a coupling roller movement unit 330; and an end roller movement unit 331.

Next, FIG. 26 to FIG. 29 are each a schematic side view showing operations of a first conveyance unit 200, and the second conveyance units 400 and 450 of the package apparatus 100 according to the third embodiment.

Figure 26:
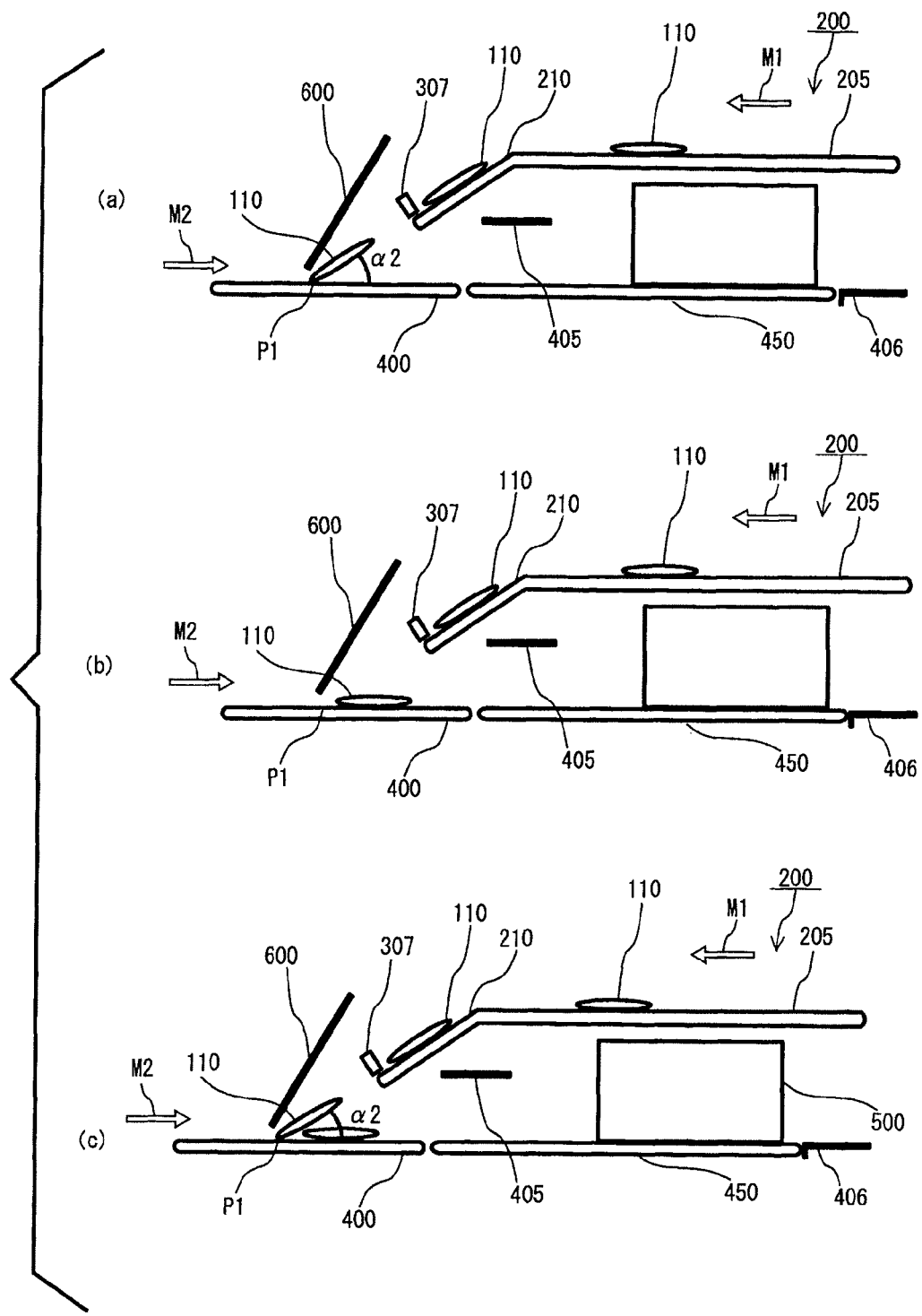
FIG. 26 is a schematic side view showing operations performed by a first conveyance unit and a second conveyance unit of the package apparatus.

Firstly, as shown in FIG. 26(*a*), one of the packaged objects 110 is moved from the first conveyance unit 200 to a reception portion P1 of the second conveyance unit 400. The one of the packaged objects 110 is received at the reception portion P1 so as to be tilted at an angle α2. Next, as shown in FIG. 26(*b*), the one of the packaged objects 110 falls by its own weight, and the second conveyance unit 400 is operable to convey the one of the packaged objects 110 by a distance shorter than the entire length of the one of the packaged objects 110 in the direction indicated by an arrow M2.

Figure 27:
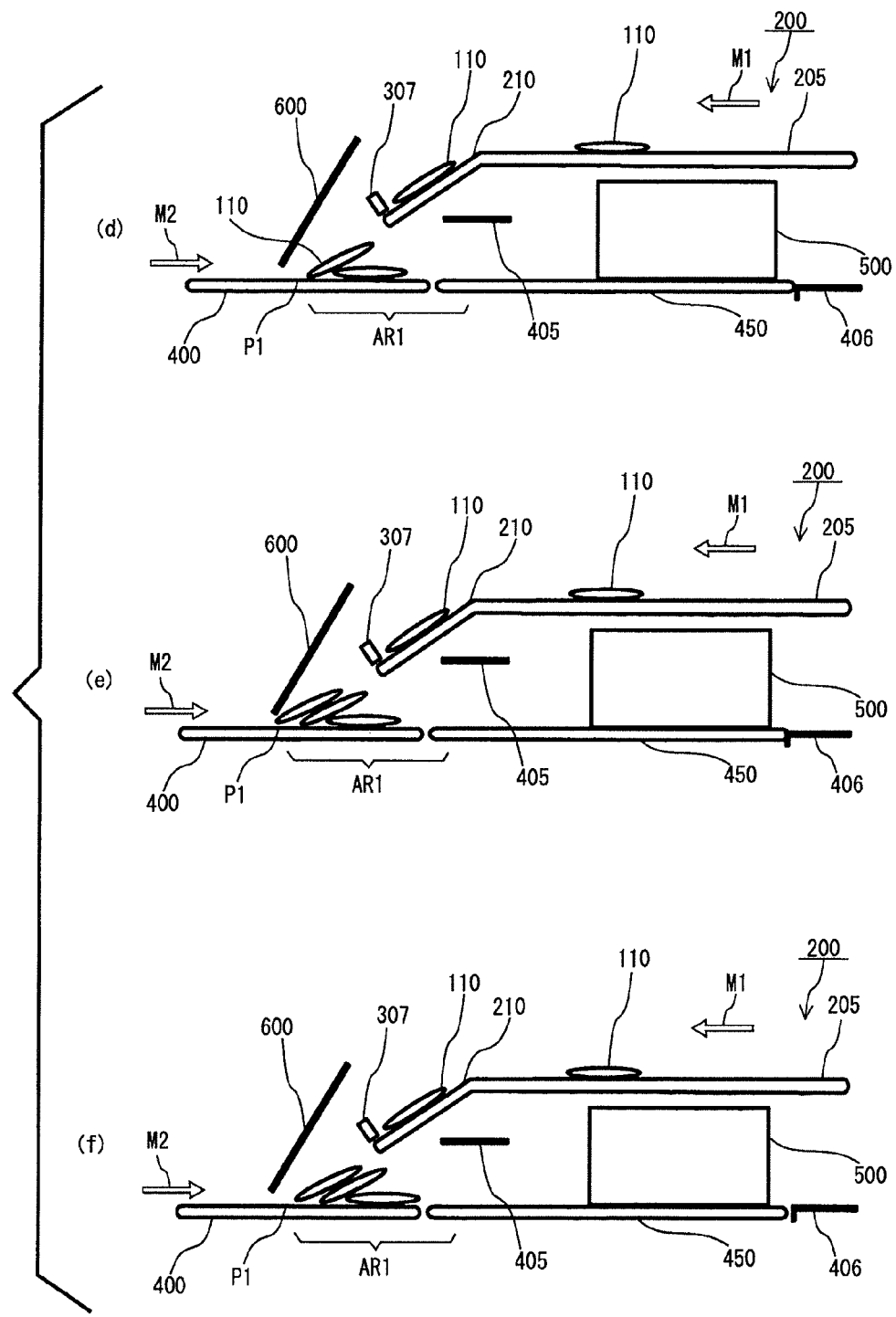
FIG. 27 is a schematic side view showing operations performed by the first conveyance unit and the second conveyance unit of the package apparatus.

Next, as shown in FIG. 26(*c*), the immediately following packaged object among the packaged objects 110 is moved from the first conveyance unit 200 to the reception portion P1 of the second conveyance unit 400. The immediately following packaged object among the packaged objects 110 is received at the reception portion P1 so as to be tilted at the angle α2. As shown in FIG. 27(*d*), the immediately following packaged object among the packaged objects 110 overlays immediately preceding packaged object among the packaged objects 110 at a collection portion AR1 of the second conveyance unit 400 such that the immediately following packaged object is put on the immediately preceding packaged object.

Subsequently, as shown in FIG. 27(*e*), the immediately following packaged object among the packaged objects 110 is moved to the reception portion P1 of the second conveyance unit 400, and similarly overlays the immediately preceding packaged object among the packaged objects 110 at the collection portion AR1 such that the immediately following packaged object is put on the immediately preceding packaged object. Subsequently, as shown in FIG. 27(*f*), the immediately following packaged object among the packaged objects 110 is in turn moved to the reception portion P1 of the second conveyance unit 400, and similarly overlays the immediately preceding packaged object among the packaged objects 110 at the collection portion AR1 such that the immediately following packaged object is put on the immediately preceding package object.

Figure 28:
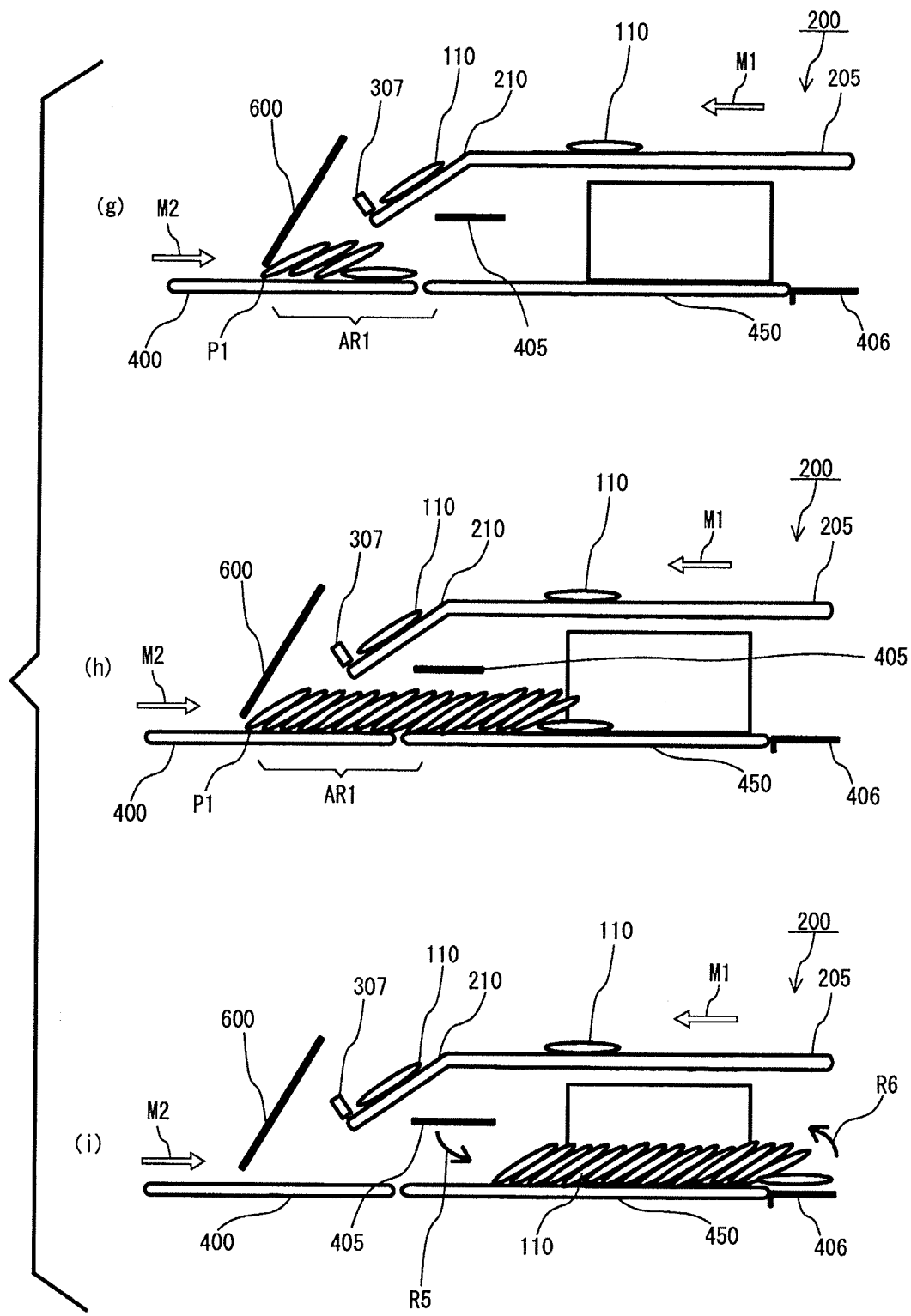
FIG. 28 is a schematic side view showing operations performed by the first conveyance unit and the second conveyance unit of the package apparatus.
Figure 29:
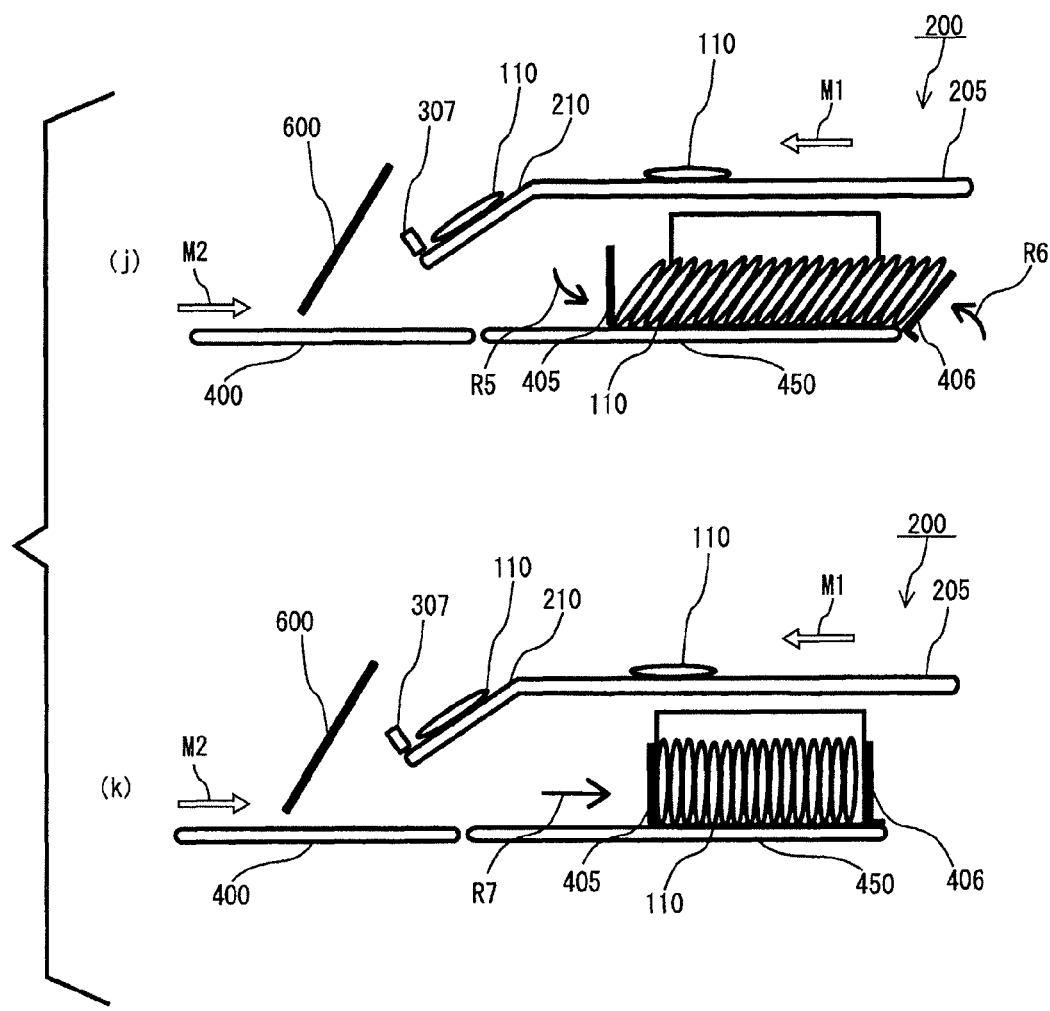
FIG. 29 is a schematic side view showing operations performed by the first conveyance unit and the second conveyance unit of the package apparatus.

Subsequently, as shown in FIG. 28(*g*), the packaged objects 110 are continuously moved to the reception portion P1 and overlay adjacent packaged objects at the collection portion AR1. This operation is repeated, and the control unit 301 controls a speed of the second conveyance unit 400 until a predetermined number of the packaged objects 110 overlay adjacent packaged objects at the collection portion AR1 of the second conveyance unit 400.

Subsequently, as shown in FIG. 28(*h*), when the predetermined number of the packaged objects 110 have been moved to the collection portion AR1 of the second conveyance unit 400, speeds of the second conveyance units 400 and 450 are increased, and the predetermined number of the packaged objects 110 are conveyed in the direction indicated by the arrow M2.

Subsequently, as shown in FIG. 28(i), in the second conveyance unit 450, the first position control plate 405 is rotated in the direction indicated by an arrow R5, and the second position control plate 406 in turn starts to be rotated in the direction indicated by an arrow R6. Subsequently, as shown in FIG. 29(j), the first position control plate 405 is rotated 90 degrees in the direction indicated by the arrow R5. At this time, the second position control plate 406 is being rotated in the direction indicated by the arrow R6 but has not been fully rotated 90 degrees. That is, the first position control plate 405 is fully rotated so as to be vertical earlier than the second position control plate 406.

Finally, as shown in FIG. 29(k), the first position control plate 405 is moved in the direction indicated by an arrow R7. When the first position control plate 405 is moved to a position which is above the end edge of the box 500, the second position control plate 406 is fully rotated 90 degrees in the direction indicated by the arrow R6, thereby completing the rotation operation. Consequently, the predetermined number of the packaged objects 110 are aligned in the standing positions so as to have the same orientation, and the predetermined number of the packaged objects 110 are slid in the direction of the far direction of the drawings, and are put into the box 500 positioned therebelow.

Figure 30:
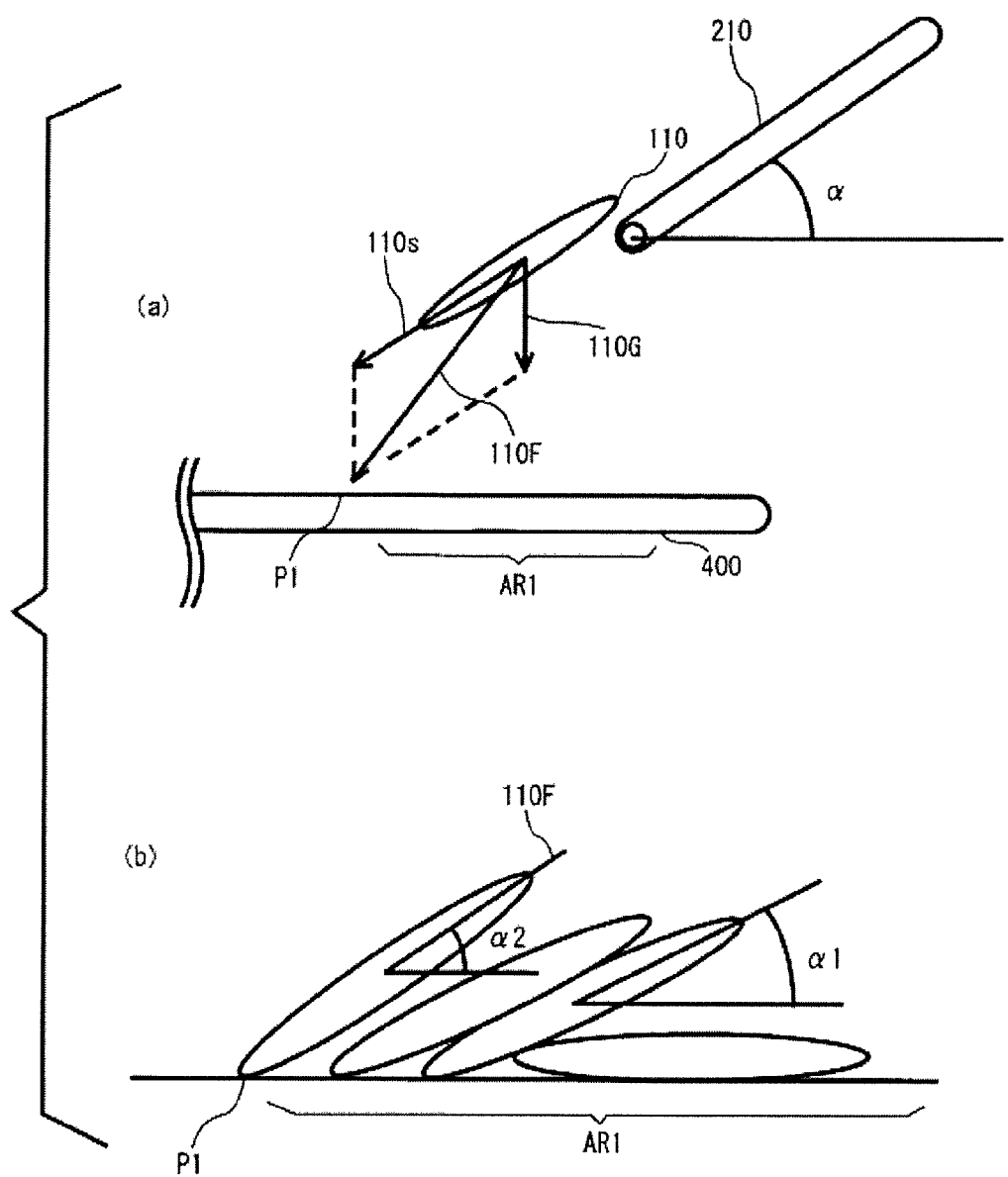
FIG. 30 is a schematic diagram illustrating one of the packaged objects being moved from a tilt unit of the first conveyance unit to the second conveyance unit.

Next, FIG. 30 is a schematic diagram illustrating one of the packaged objects 110 being moved from the tilt unit 210 of the first conveyance unit 200 to the second conveyance unit 400. FIG. 30(a) shows that one of the packaged objects 110 is being moved from the tilt unit 210 to the second conveyance unit 400. FIG. 30(b) shows a state in which the packaged objects 110 overlay adjacent packaged objects at the reception portion P1 and the collection portion AR1.

As shown in FIG. 30(a), each one of the packaged objects 110 is moved from the tilt unit 210 of the first conveyance unit 200 to the reception portion P1 of the second conveyance unit 400.

In this case, a vector 110s of an angle α at which the tilt unit 210 is tilted, and a vector 110G representing the gravitational force of each one of the packaged objects 110 are applied to the one of the packaged objects 110. Consequently, a force of a combined vector 110F obtained by combining the vector 110s with the vector 110G is applied to each one of the packaged objects 110, and each one of the packaged objects 110 is substantially moved in the direction represented by the combined vector 110F.

Further, as shown in FIG. 30(b), when an angle at which one of the packaged objects 110 overlaying the immediately preceding one of the packaged objects 110 on the collection portion AR1 is tilted is represented as α1, the angle α at which the tilt unit 210 is tilted is set such that the angle α2 of the combined vector 110F is slightly greater than the angle α1.

Thus, the angle at which the tilt unit 210 is tilted is adjusted such that each of the packaged objects 110 falls so as to be tilted at the angle α2. Thus, the packaged objects 110 being each tilted at the angle α2 are moved in the direction indicated by the combined vector 110F, and the packaged objects 110 having been moved are each rotated at an angle corresponding to a slight angular difference (α2−α1), and overlay adjacent packaged objects.

Figure 31:
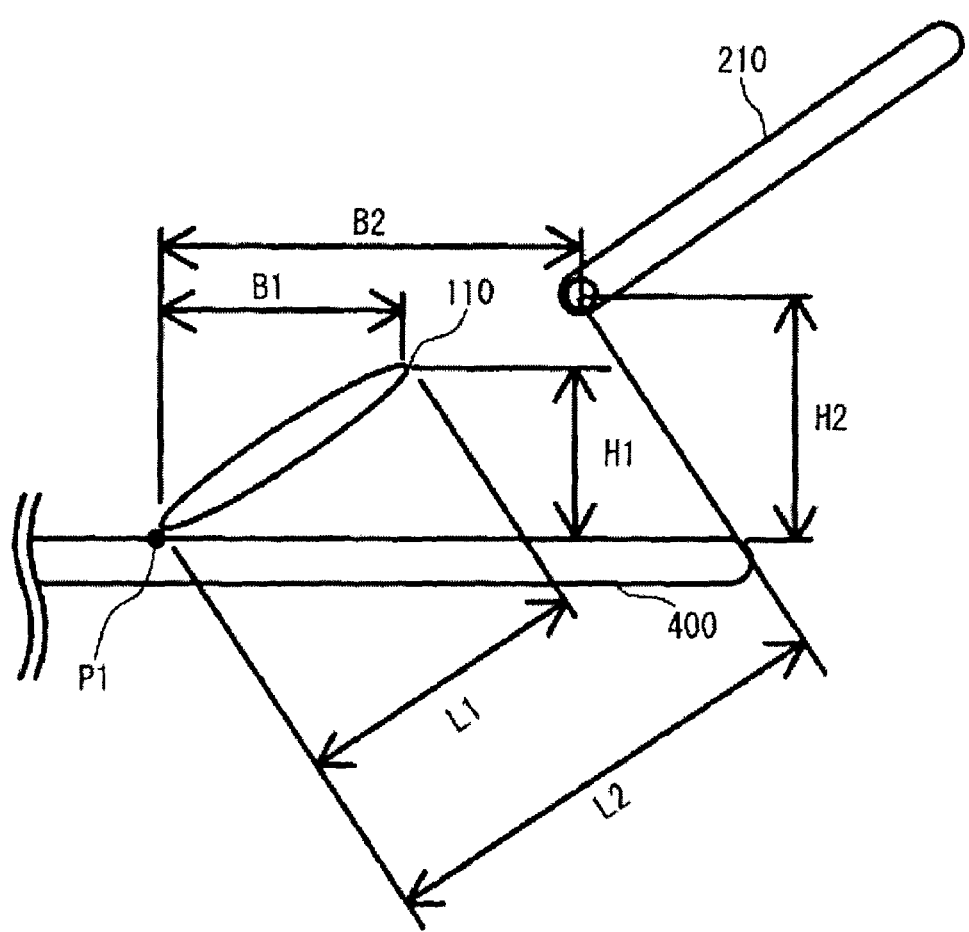
FIG. 31 is a schematic cross-sectional view showing a distance between the end edge of the tilt unit and a reception portion P1 of the second conveyance unit.

Next, FIG. 31 is a schematic cross-sectional view showing a distance between the end edge of the tilt unit 210 and the reception portion P1 of the second conveyance unit 400.

As shown in FIG. 31, when the entire length of each of the packaged objects 110 corresponds to a distance L1, a distance between the end edge of the tilt unit 210 and the reception portion P1 is set to a distance L2. The distance L2 is greater than the distance L1. The distance L2 is preferably less than or equal to twice the distance L1, and is more preferably 1.5 times as great as the distance L1.

In this case, the distance L2 between the reception portion P1 and the downstream-side end edge of the tilt unit 210 is set so as to be greater than or equal to the distance L1 and not greater than twice the distance L1. Therefore, a region in which each of the packaged objects 110 can be rotated can be minimized, and the packaged objects 110 can be aligned so as to have the same orientation, so that the packaged objects 110 can be caused to overlay adjacent package objects and can be conveyed at a high speed.

Further, in this case, a horizontal length B1 of each of the packaged objects 110 is calculated as the distance L1·cos α2. A horizontal distance between the end edge of the tilt unit 210 and the reception portion of the second conveyance unit 400 is set as a distance B2. The distance B2 is greater than the distance B1. The distance B2 is preferably less than or equal to twice the distance B1, and is more preferably 1.5 times as great as the distance B1.

Similarly, a vertical length H1 of each of the packaged objects 110 is calculated as the distance L1·sin α2. A vertical distance between the end edge of the tilt unit 210 and the reception portion of the second conveyance unit 400 is set as a distance H2. The distance H2 is greater than the distance H1. The distance H2 is preferably less than or equal to twice the distance H1, and is more preferably 1.5 times as great as the distance H1.

Figure 32:
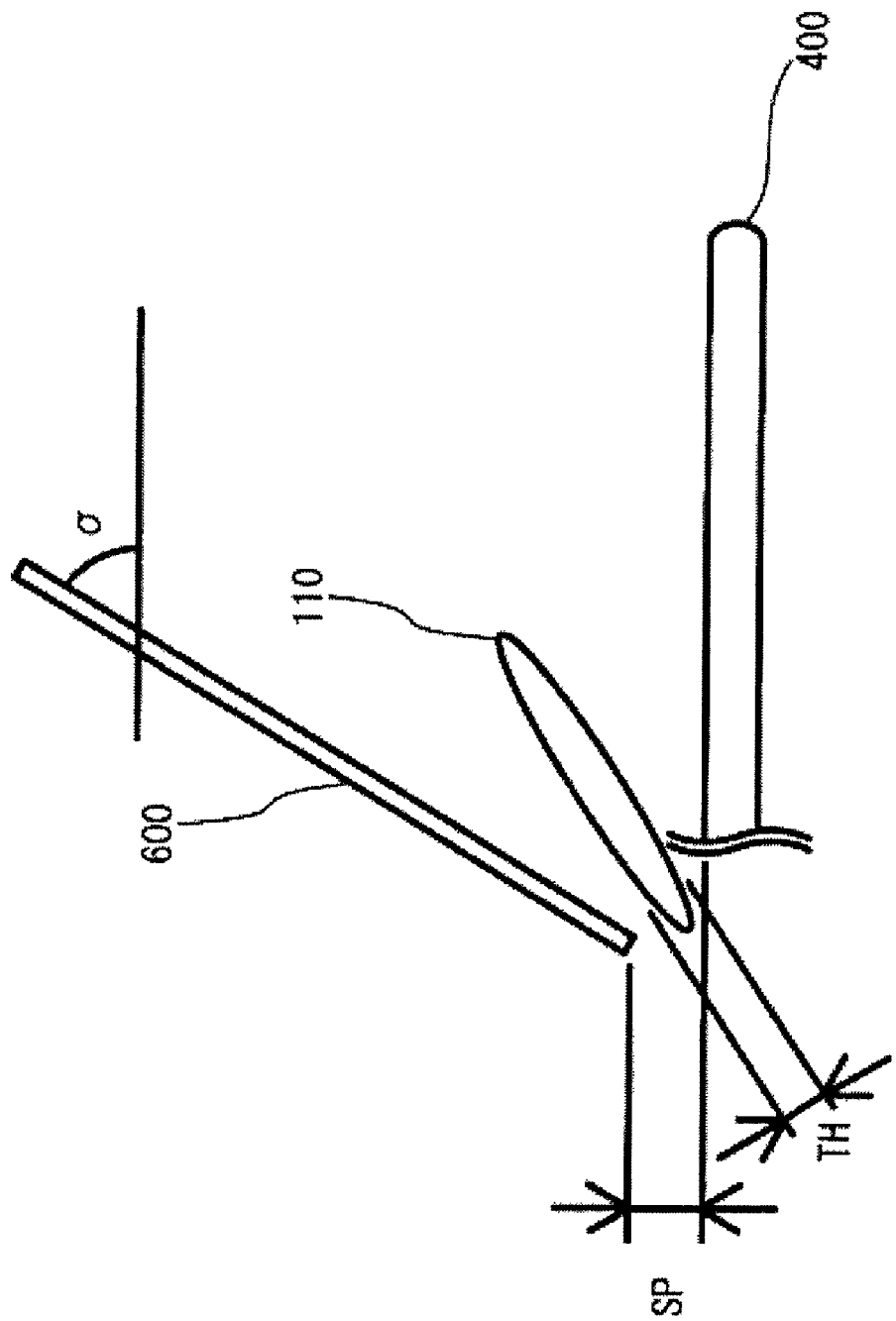
FIG. 32 is a schematic diagram illustrating a rotation prevention guide unit.

Next, FIG. 32 is a schematic diagram illustrating a rotation prevention guide unit 600.

As shown in FIG. 32, the thickness of the end portion of each of the packaged objects 110 is represented as a thickness TH. The packaged objects 110 are each packaged by using a thin flexible material. For example, the end portion is sealed so as to seal the thin flexible material.

Further, a space is provided between the rotation prevention guide unit 600 and the reception portion P1 of the second conveyance unit 400, and the height of the space is represented as a height SP. The height SP is greater than the thickness TH. The height SP is preferably less than twice the thickness TH, and is more preferably 1.5 times as great as the thickness TH.

In this case, the space of the height SP allows the end portion of each of the packaged objects 110 to be introduced into a predetermined position of the reception portion P1, thereby aligning the packaged objects 110 so as to have the same orientation.

Further, as shown in FIG. 32, the rotation prevention guide unit 600 is tilted at an angle α. The angle α is greater than the angle α1. Preferably, the angle α is greater than the angle α1 by 30 degrees or more, and the angle α is less than a right angle.

Thus, even when the packaged objects 110 are likely to be rotated, the rotation prevention guide unit 600 functions to prevent the rotation of the packaged objects 110. As a result, the packaged objects 110 can be assuredly aligned so as to have the same orientation, and the packaged objects 110 having been aligned can be packed in a box. In the present embodiment, the rotation prevention guide unit 600 is formed of a straight plate component. However, the present invention is not limited thereto. The rotation prevention guide unit 600 may be formed of any other component such as a curved plate component.

Figure 33:
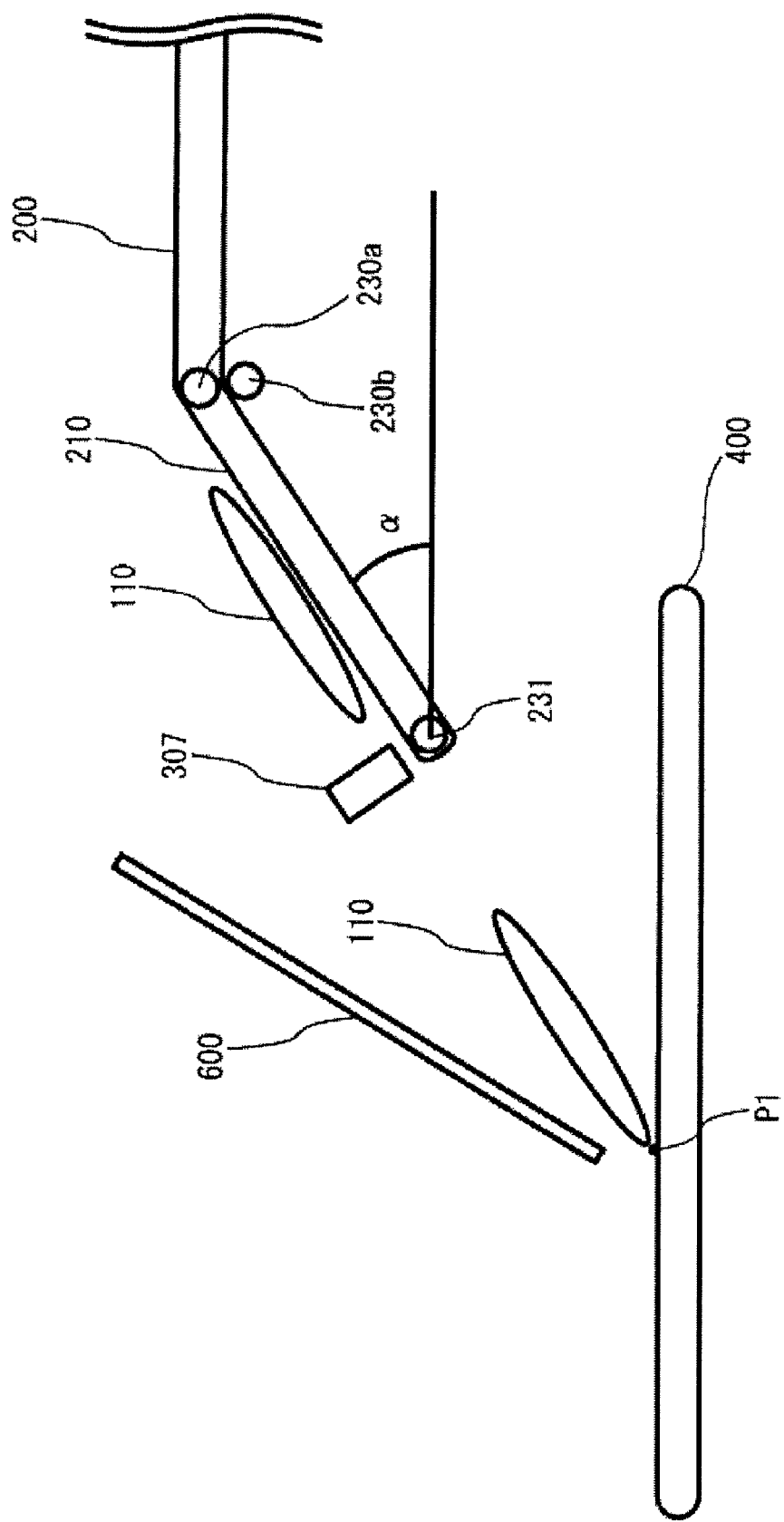
FIG. 33 is a schematic cross-sectional view showing adjustment mechanisms for a pair of coupling rollers and an end roller.
Figure 34:
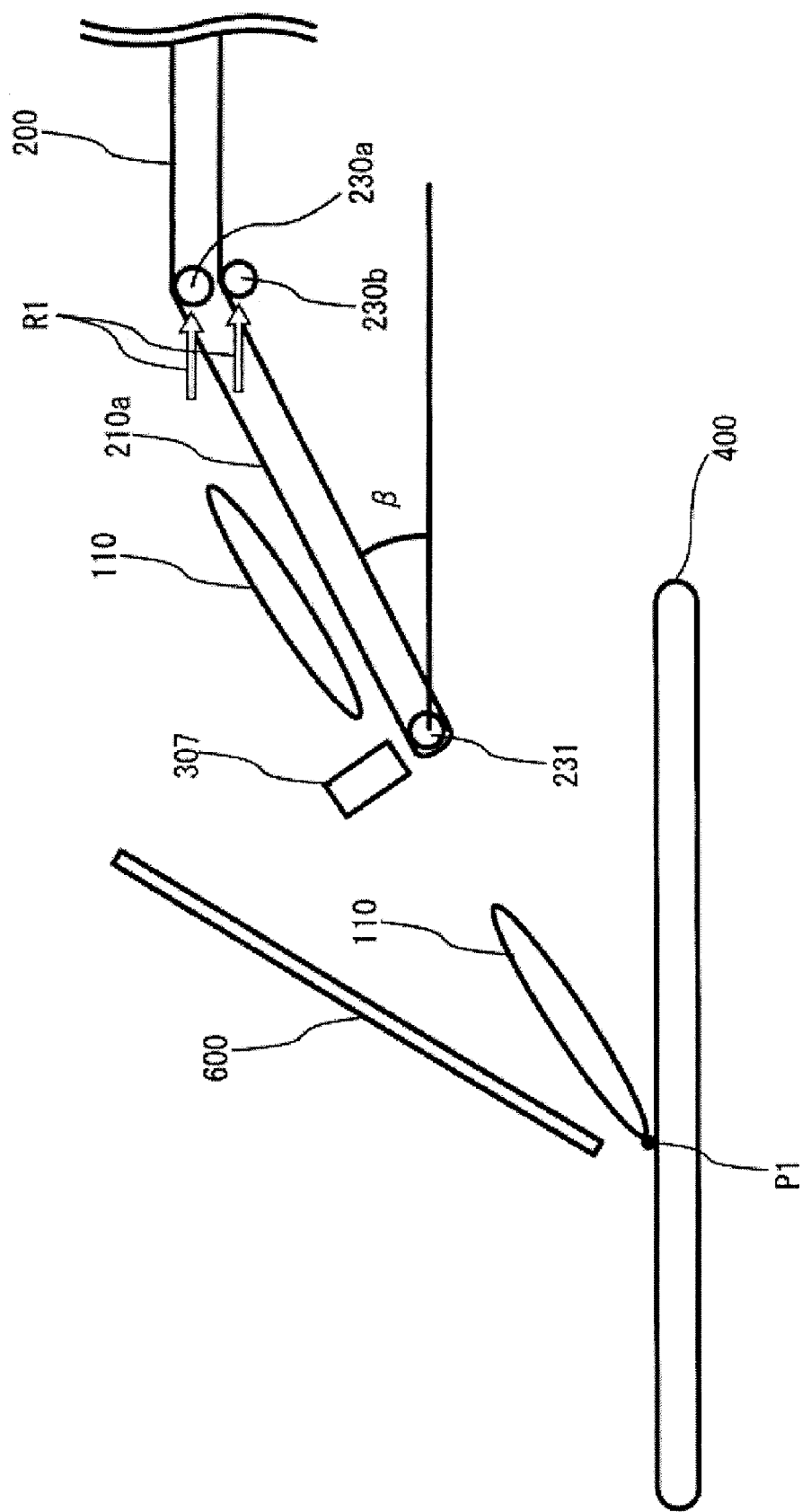
FIG. 34 is a schematic cross-sectional view showing the adjustment mechanisms for the pair of coupling rollers and the end roller.
Figure 35:
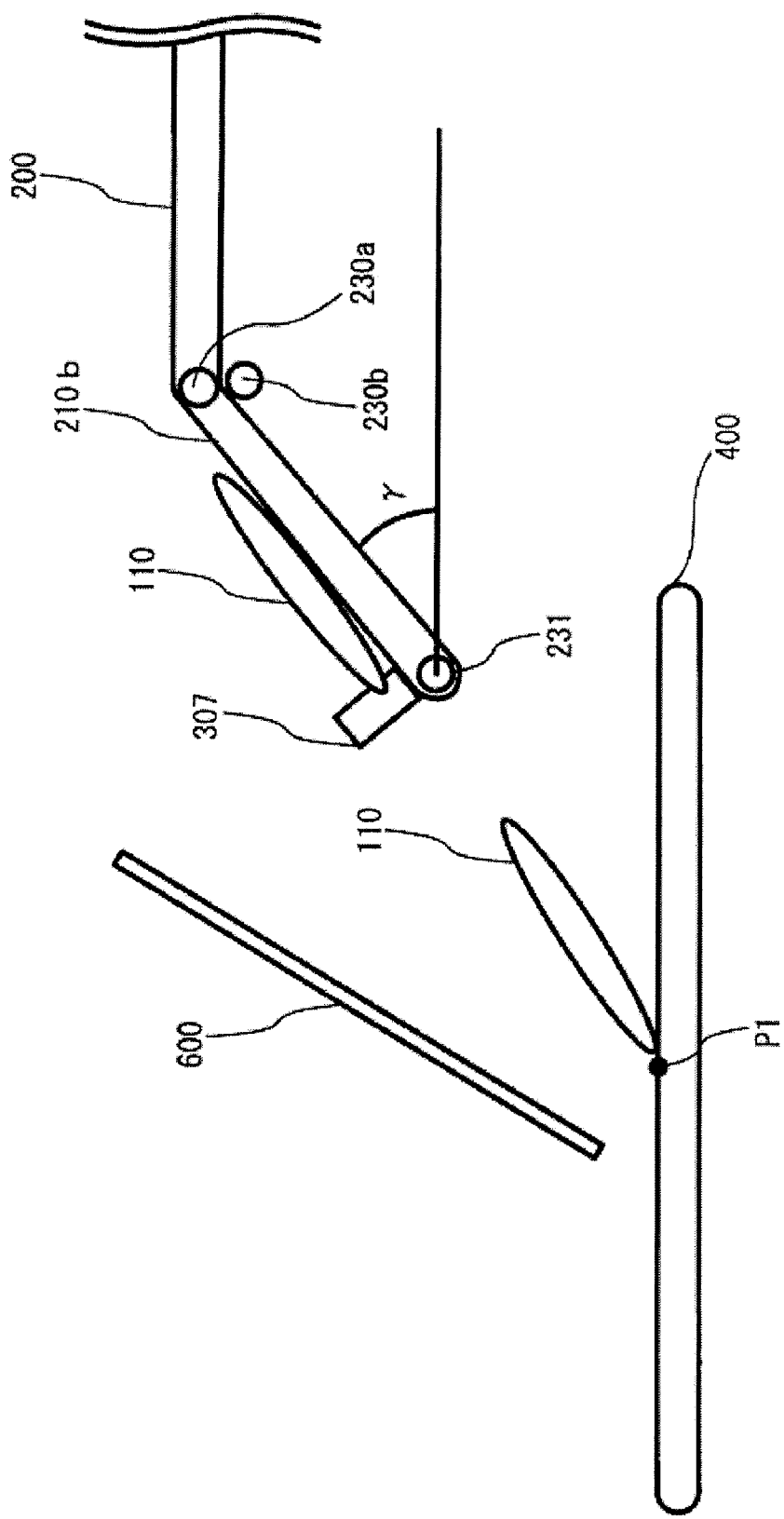
FIG. 35 is a schematic cross-sectional view showing the adjustment mechanisms for the pair of coupling rollers and the end roller.

Next, FIG. 33, FIG. 34 and FIG. 35 are schematic cross-sectional views showing a mechanism for adjusting the tilt unit 210 by using a pair of coupling rollers 230a and 230b, and an end roller 231.

As shown in FIG. 33, the pair of coupling rollers 230a and 230b is provided in the first conveyance unit 200 so as to distinguish between the first horizontal unit 205 and the tilt unit 210, which are integrated with each other, in the first conveyance unit 200. The coupling roller 230a is provided inside the first conveyance unit 200 whereas the coupling roller 230b is provided so as to support the first conveyance unit 200. Further, the end roller 231 is provided inside the downstream-side end edge of the tilt unit 210.

For example, when, as shown in FIG. 34, the pair of coupling rollers 230a and 230b is moved in the direction indicated by an arrow R1, and the end roller 231 is not moved, the tilt unit 210a has its entire length increased as compared to the tilt unit 210 shown in FIG. 33, and the tilt angle is changed such that the angle at which the tilt unit 210a is tilted is set to an angle β which is less than the angle α.

Further, when, as shown in FIG. 35, the end roller 231 is moved without moving the pair of coupling rollers 230a and 230b, the entire length of the tilt unit 210b remains the same as that of the tilt unit 210 shown in FIG. 33, and the tilt angle is changed such that the angle at which the tilt unit 210b is tilted is set to an angle γ which is greater than the angle α.

In a case where the pair of coupling rollers is configured such that the coupling roller 230a has a size greater than each of the coupling roller 230b and the end roller 231, when the end roller 231 is moved within a range in which the belt does not move away from the circumferences of the coupling roller 230a, the angle α can be changed without changing the length of the tilting side of the tilt unit 210.

Figure 36:
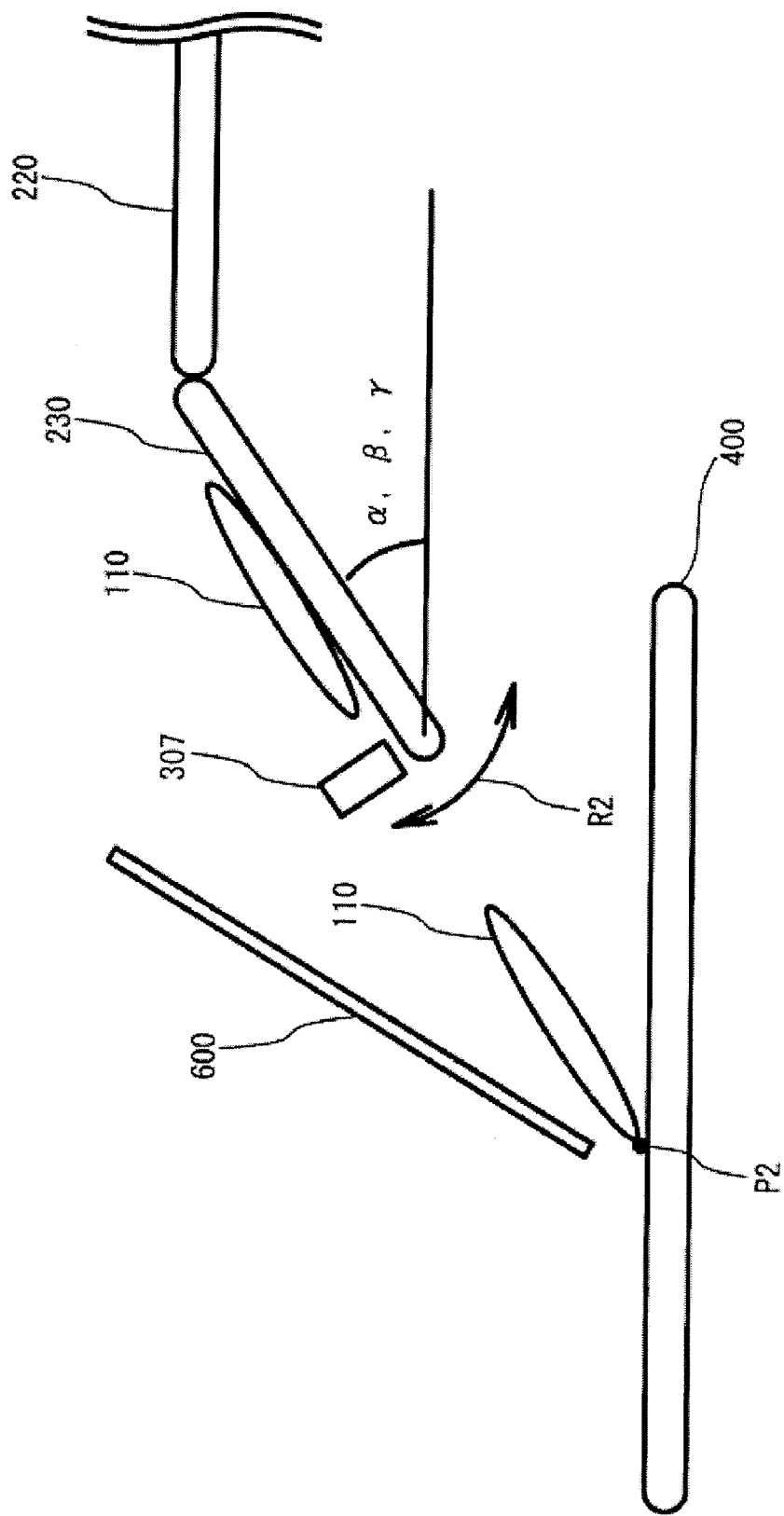
FIG. 36 is a schematic cross-sectional view showing an adjustment in which the tilt unit of the package apparatus is adjusted.

Moreover, as shown in FIG. 36, a horizontal unit 220 may be provided instead of the first conveyance unit 200, and a tilting unit 230 may be separately provided. In this case, the angle at which the tilting unit 230 is tilted can be independently adjusted to any angle. Therefore, the angle at which the tilting unit 230 is tilted can be set to any angle depending on kinds of the packaged objects 110. For example, the angle at which the tilting unit 230 is tilted can be set to any one of the angle α, the angle β, or the angle γ, depending on kinds of the packaged objects 110.

Moreover, the horizontal driving unit and the tilting driving unit can be separately controlled. Therefore, the packaged objects 110 can be conveyed from the first conveyance unit 200 to the second conveyance units 400 and 450 at regular intervals. For example, a speed of the horizontal driving unit is increased or reduced depending on the interval between the packaged objects 110, thereby causing the tilting driving unit to move the packaged objects 110 at regular intervals.

Fourth Embodiment

Figure 37:
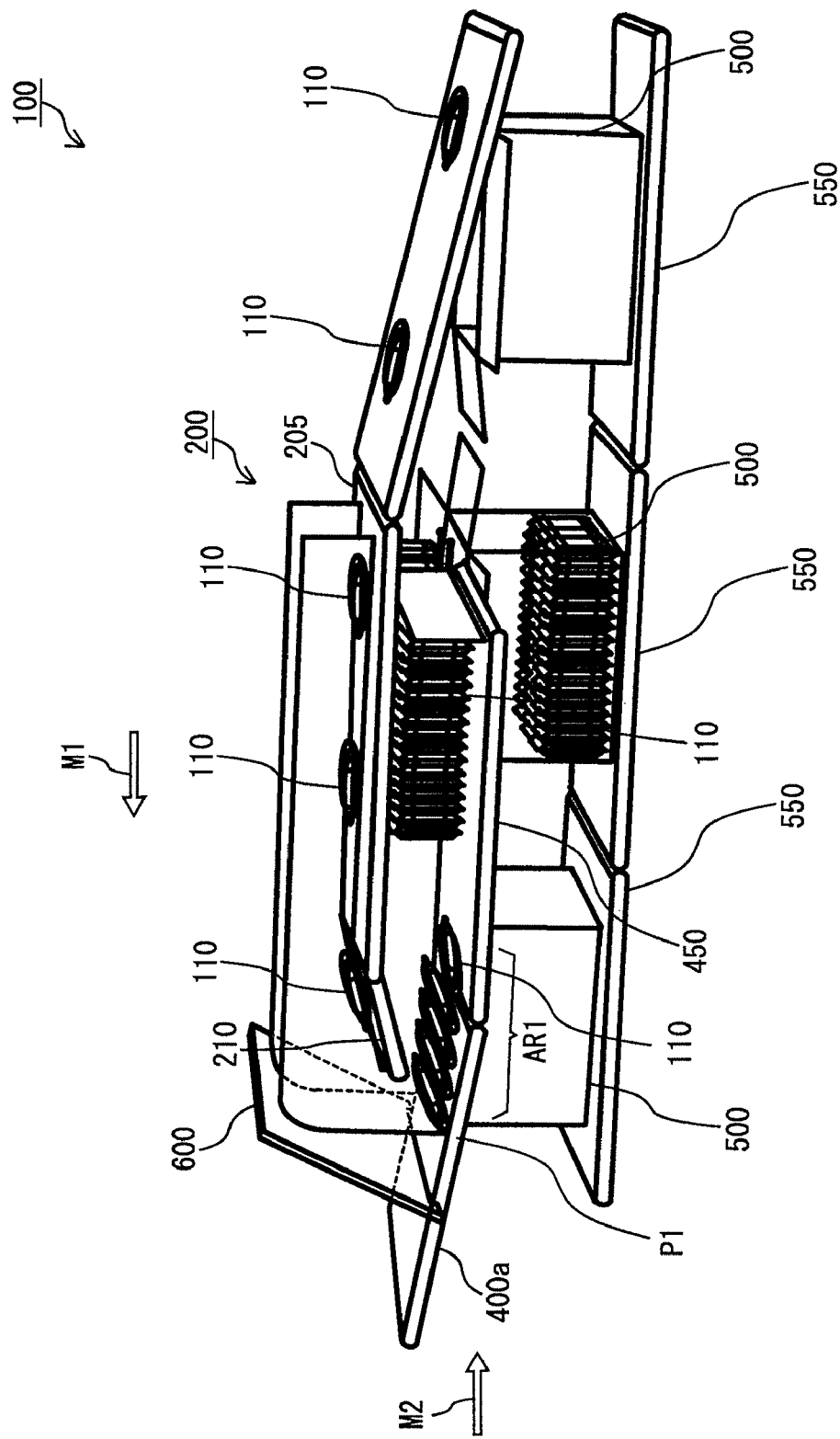
FIG. 37 is a schematic diagram illustrating an exemplary outline of a package apparatus for packing packaged objects in boxes, according to a fourth embodiment of the present invention.

FIG. 37 is a schematic diagram illustrating an exemplary outline of a package apparatus 100 according to a fourth embodiment of the present invention.

The package apparatus 100 shown in FIG. 37 mainly includes: a first conveyance unit 200; second conveyance units 400a and 450; a box conveyance unit 550; and a rotation prevention guide unit 600. The first conveyance unit 200 and the second conveyance units 400a and 450 are each formed as a conveyance structure having an endless belt conveyor.

The first conveyance unit 200 moves a plurality of packaged objects 110 in the direction indicated by an arrow M1. The first conveyance unit 200 includes a first horizontal unit 205 and a tilt unit 210, and the tilt unit 210 is provided immediately following the first horizontal unit 205.

Below the first conveyance unit 200, the second conveyance units 400a and 450 are provided. In the fourth embodiment, the second conveyance unit 400a is provided so as to be tiled at an angle α4 relative to the horizontal plane.

Figure 38:
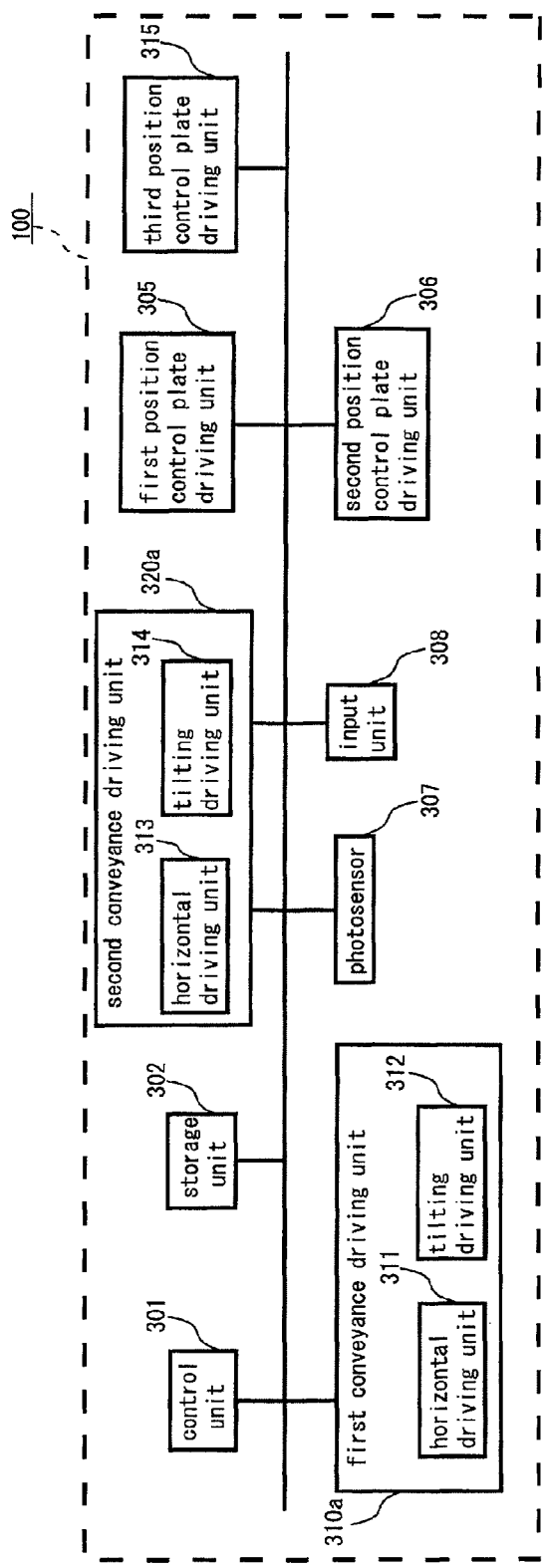
FIG. 38 is a schematic structure diagram illustrating main components of the package apparatus.

Next, FIG. 38 is a schematic structure diagram illustrating main components of the package apparatus 100.

As shown in FIG. 38, the package apparatus 100 includes: a control unit 301; a storage unit 302; a first position control plate driving unit 305; a second position control plate driving unit 306; a third position control plate driving unit 315; a photosensor 307; an input unit 308; a first conveyance driving unit 310a; and a second conveyance driving unit 320a. Further, the first conveyance driving unit 310a includes a horizontal driving unit 311 and a tilting driving unit 312, and the second conveyance driving unit 330a includes a horizontal driving unit 313 and a tilting driving unit 314.

Next, FIG. 39 to FIG. 42 are schematic side views showing operations of the first conveyance unit 200 and the second conveyance units 400a and 450 of the package apparatus 100.

Figure 39:
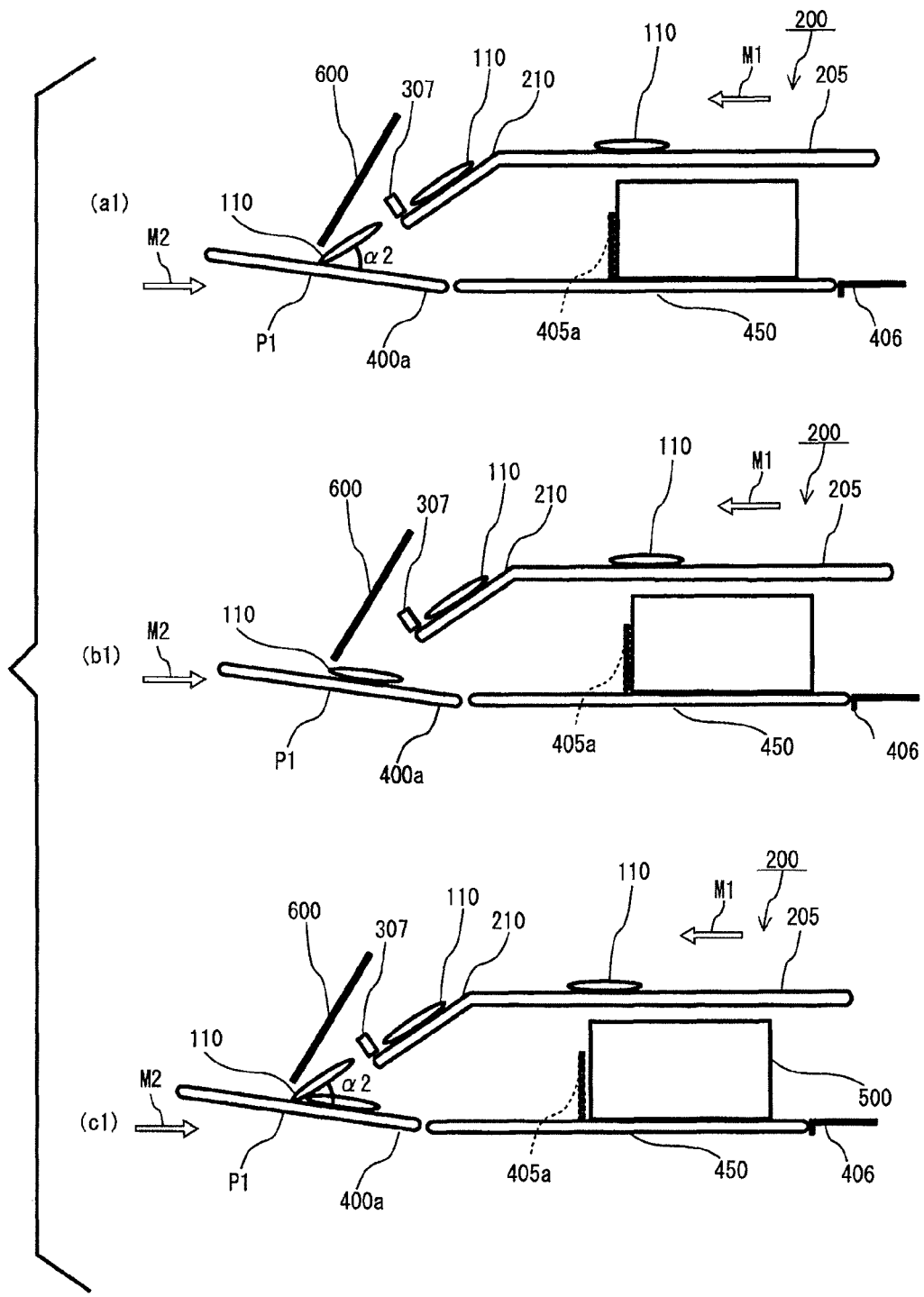
FIG. 39 is a schematic side view showing operations performed by a first conveyance unit and a second conveyance unit of the package apparatus.

Firstly, as shown in FIG. 39(a1), one of the packaged objects 110 is moved from the first conveyance unit 200 to a reception portion P1 of the second conveyance unit 400a. The one of the packaged objects 110 is received at the reception portion P1 so as to be tilted at an angle α2. Next, as shown in FIG. 39(b1), the one of the packaged objects 110 falls by its own weight, and is conveyed by the second conveyance unit 400a in the direction indicated by an arrow M2 by a distance shorter than the entire length of the one of the packaged objects 110.

Figure 40:
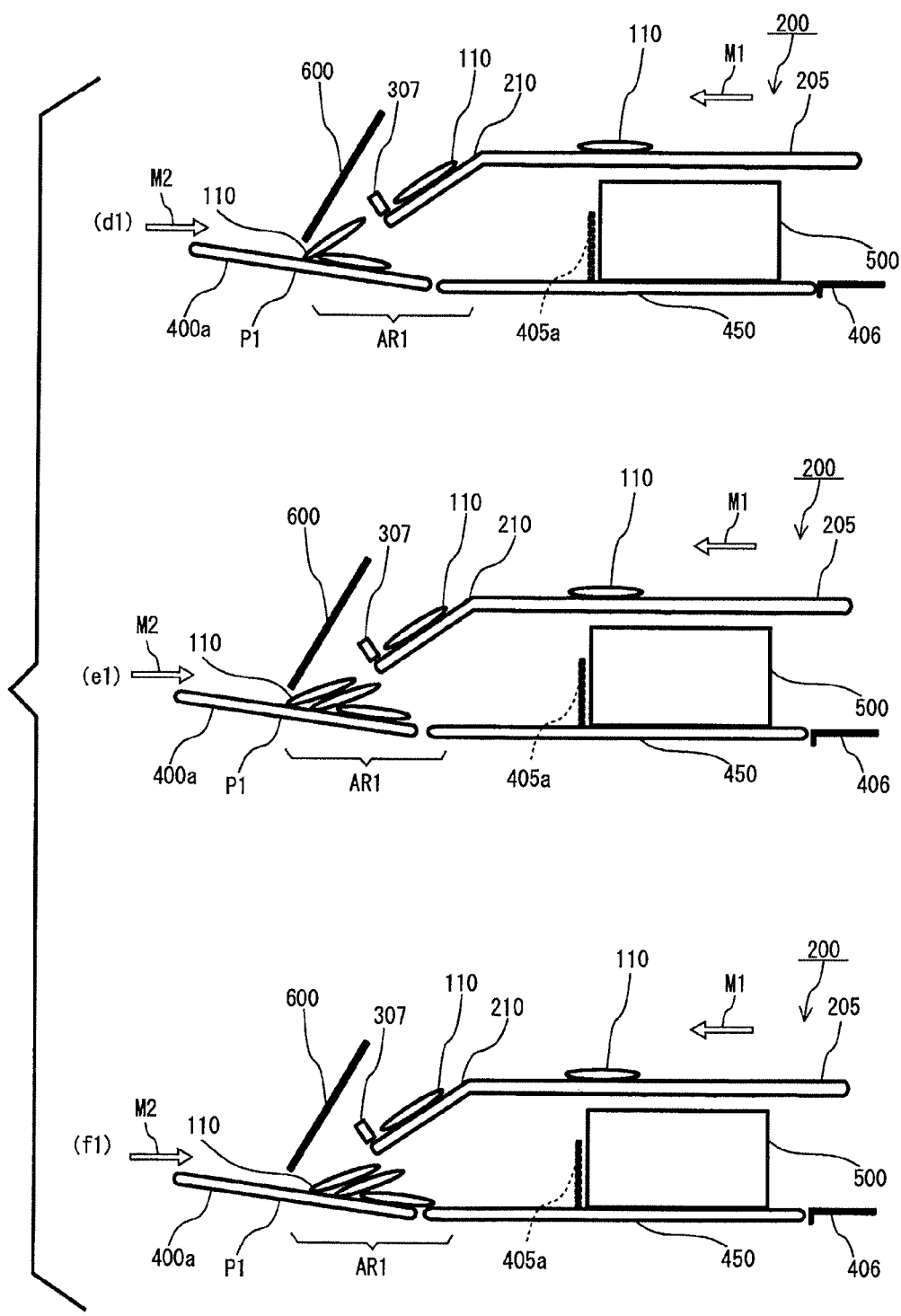
FIG. 40 is a schematic side view showing the operations performed by the first conveyance unit and the second conveyance unit of the package apparatus.

Subsequently, as shown in FIG. 39(c1), the immediately following packaged object among the packaged objects 110 is moved from the first conveyance unit 200 to the reception portion P1 of the second conveyance unit 400a. The immediately following packaged object among the packaged objects 110 is received at the reception portion P1 so as to be tilted at the angle α2. As shown in FIG. 40(d1), the immediately following packaged object among the packaged objects 110 overlays the immediately preceding packaged object among the packaged objects 110 at the collection portion AR1 of the second conveyance unit 400 such that the immediately following packaged object is put on the immediately preceding packaged object.

Subsequently, as shown in FIG. 40(e1), the immediately following packaged object among the packaged objects 110 is moved to the reception portion P1 of the second conveyance unit 400a, and similarly overlays the immediately preceding packaged object among the packaged objects 110 at the collection portion AR1 such that the immediately following packaged object is put on the immediately preceding packaged object. Subsequently, as shown in FIG. 40(f1), the immediately following packaged object among the packaged objects 110 is in turn moved to the reception portion P1 of the second conveyance unit 400a, and similarly overlays the immediately preceding packaged object among the packaged objects 110 at the collection portion AR1 such that the immediately following packaged object is put on the immediately preceding packaged object.

Figure 41:
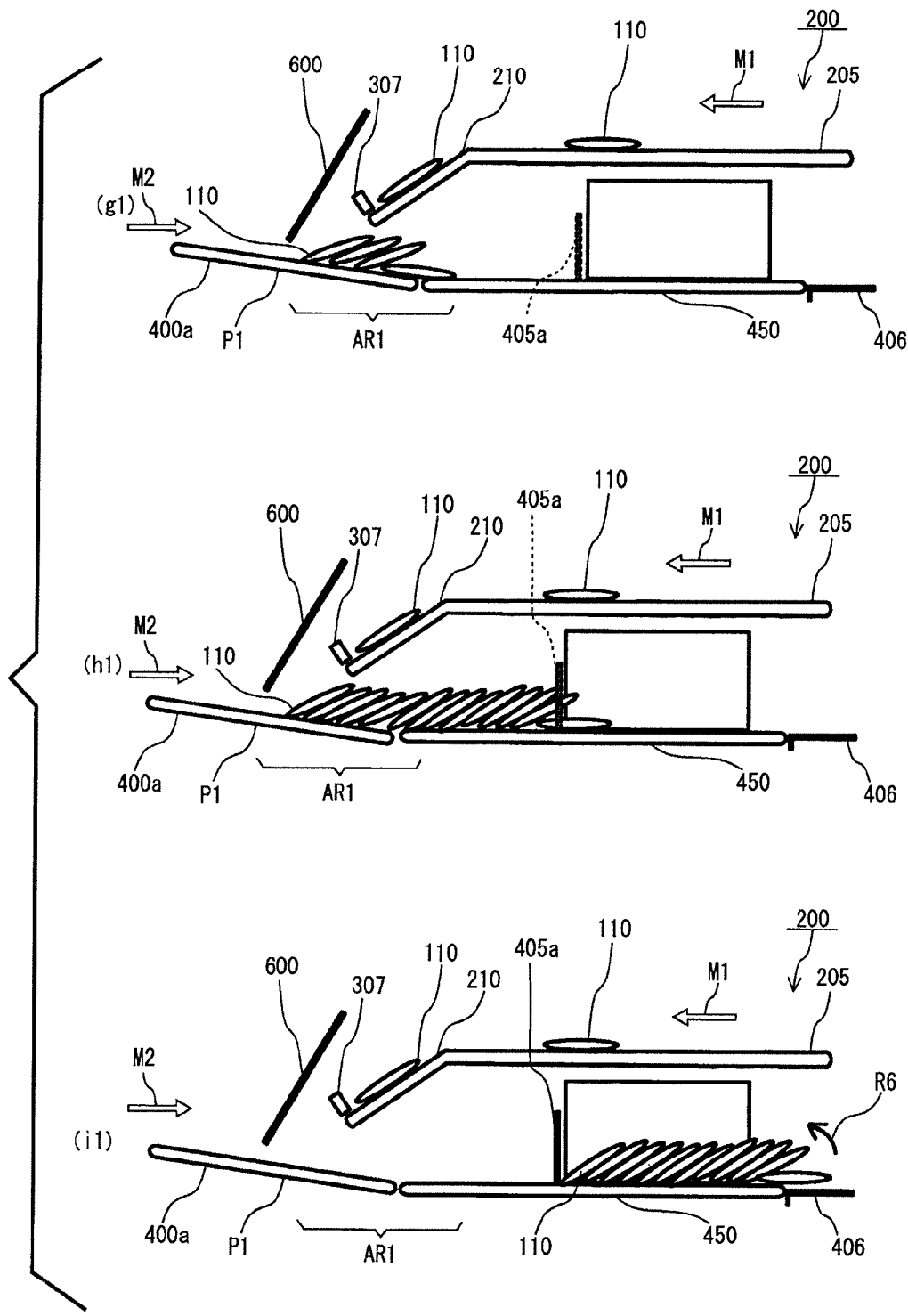
FIG. 41 is a schematic side view showing the operations performed by the first conveyance unit and the second conveyance unit of the package apparatus.

Subsequently, as shown in FIG. 41(g1), the packaged objects 110 are continuously moved to the reception portion P1, and overlay adjacent packaged objects at the collection portion AR1. This operation is repeated, and the control unit 301 controls the speed of the second conveyance unit 400a until a predetermined number of the packaged objects 110 overlay adjacent packaged objects at the collection portion AR1 of the second conveyance unit 400a.

Subsequently, as shown in FIG. 41(h1), when the predetermined number of the packaged objects 110 have been moved to the collection portion AR1 of the second conveyance unit 400a, the speed of each of the second conveyance units 400a and 450 is increased, and the predetermined number of the packaged objects 110 are conveyed in the direction indicated by the arrow M2. Since the second conveyance unit 400a is provided so as to be tilted at an angle α4, when the predetermined number of the packaged objects 110 are conveyed to the downstream, even if the conveyance speed is rapidly increased, the positions of the packaged objects 110 aligned on the downstream side are prevented from being reversed, and the positions remain unchanged, thereby stably conveying the predetermined number of the packaged objects.

Subsequently, as shown in FIG. 41(i1), when the rearmost packaged object among the predetermined number of the packaged objects 110 passes the position of a first position control plate 405a, and about half the length of the foremost packaged object, among the predetermined number of the packaged objects 110, having been conveyed, is on a second position control plate 406, the first position control plate 405a enters the second conveyance unit 450, and the second position control plate 406 in turn starts to be rotated in the direction indicated by an arrow R6.

Figure 42:
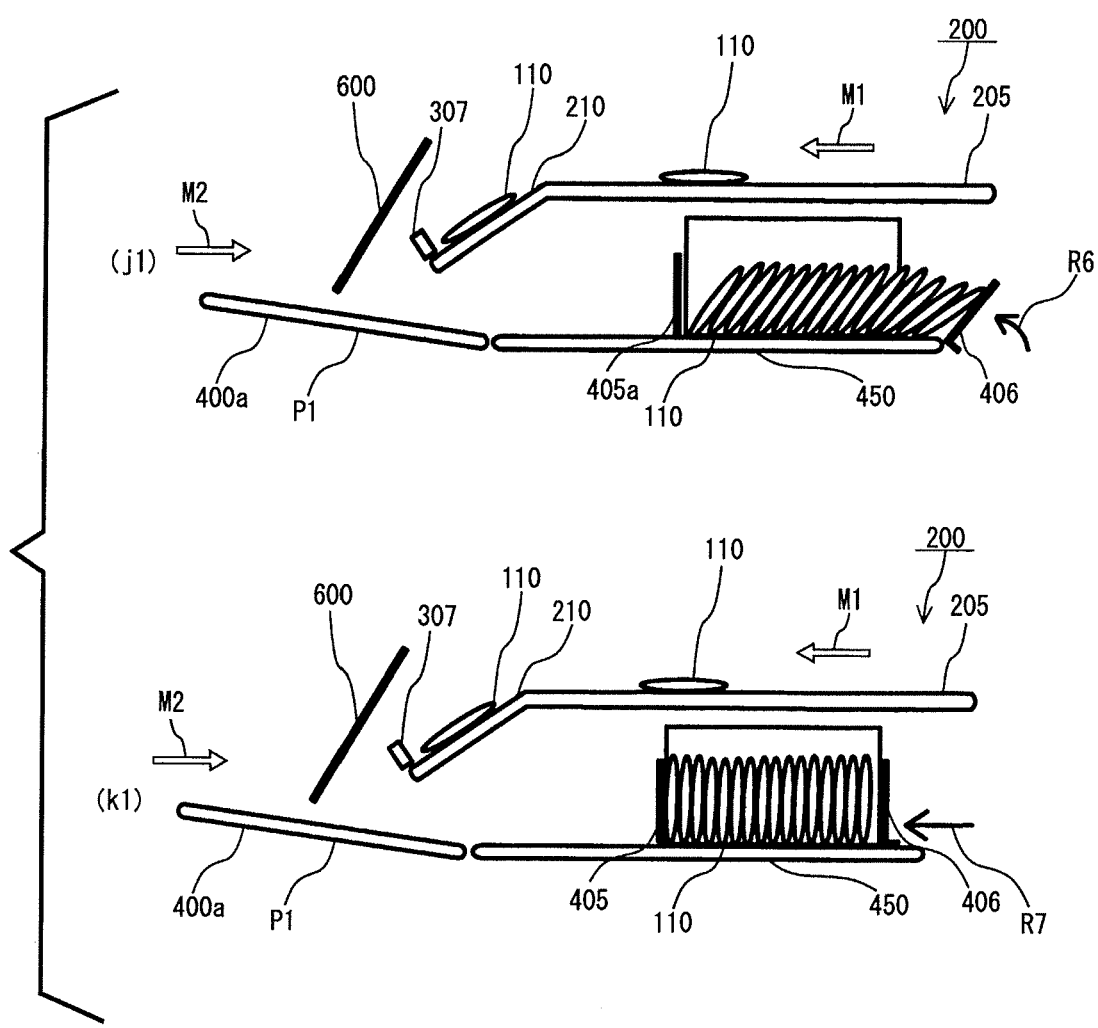
FIG. 42 is a schematic side view showing the operations performed by the first conveyance unit and the second conveyance unit of the package apparatus.

Subsequently, as shown in FIG. 42(j1), the second position control plate 406 is further rotated in the direction indicated by the arrow R6. Thus, the predetermined number of the packaged objects 110 approach the standing positions. Moreover, as shown in FIG. 42(k1), the second position control plate 406 has been rotated 90 degrees, and is thereafter horizontally moved in the direction indicated by an arrow R7. Thus, the predetermined number of the packaged objects 110 enter the standing positions.

Figure 43:
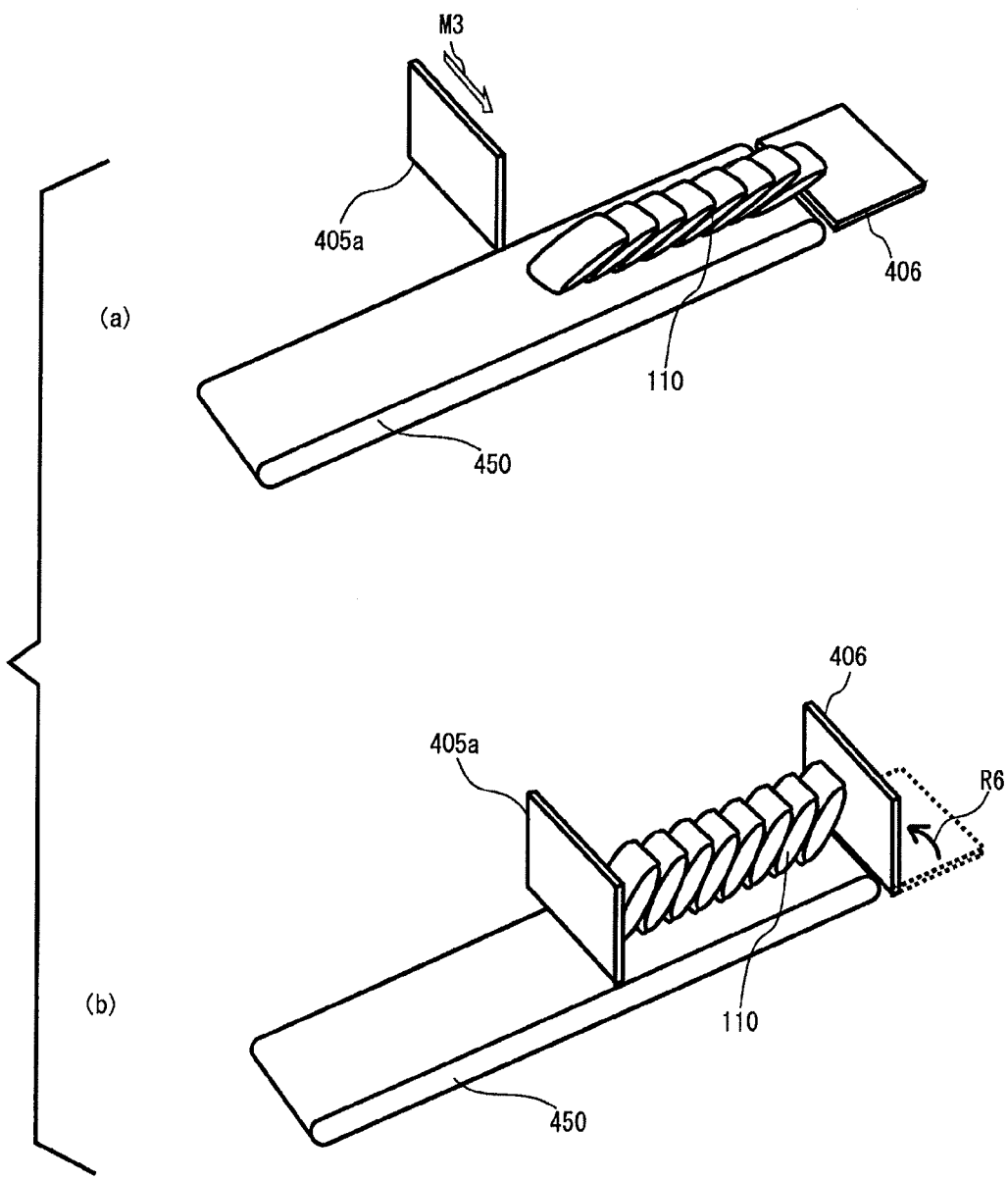
FIG. 43 is a schematic perspective view showing in detail exemplary operations performed by a first position control plate, a second position control plate, and a third position control plate of the second conveyance unit.
Figure 44:
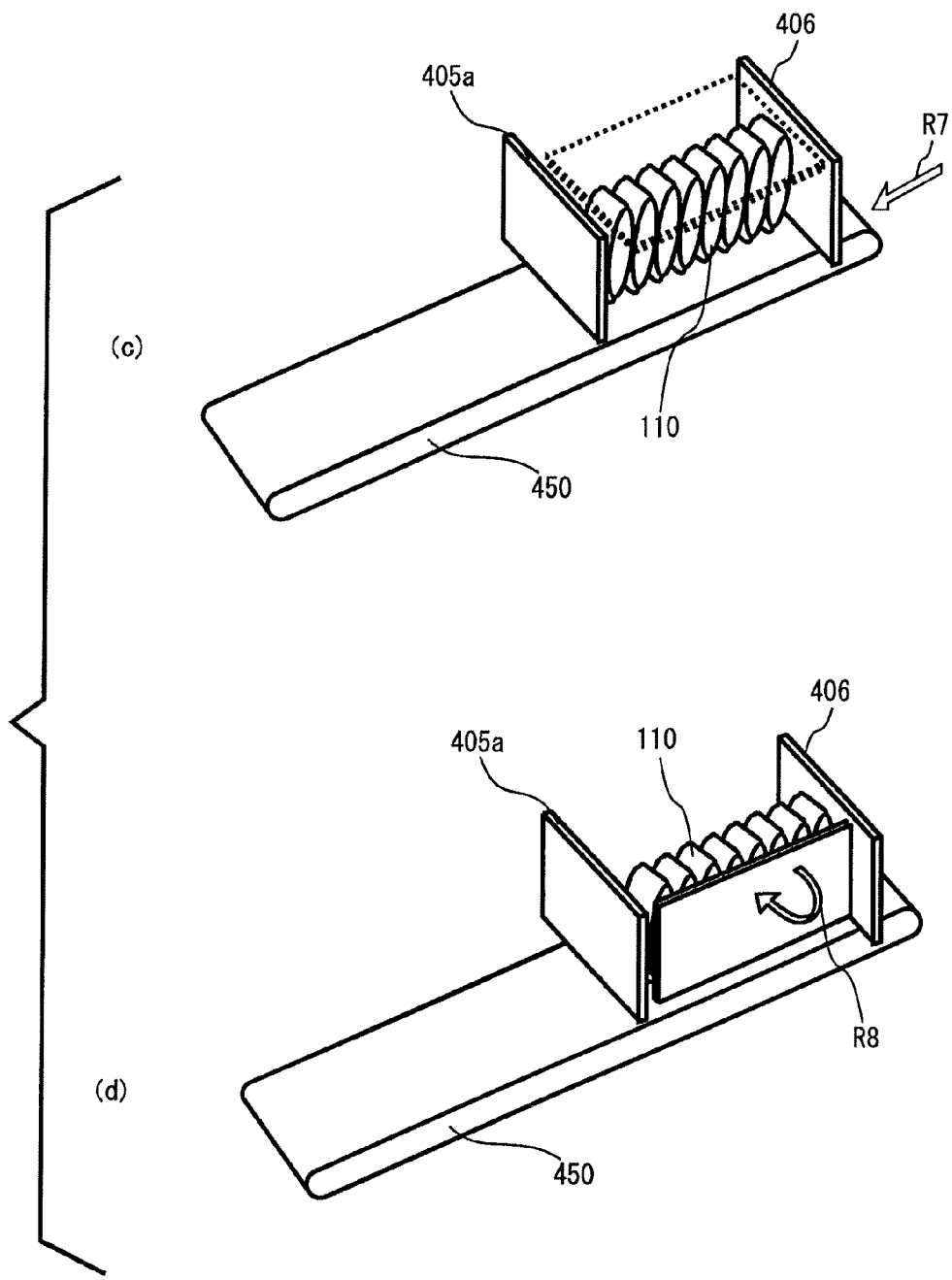
FIG. 44 is a schematic perspective view showing in detail the exemplary operations performed by the first position control plate, the second position control plate, and the third position control plate of the second conveyance unit.
Figure 45:
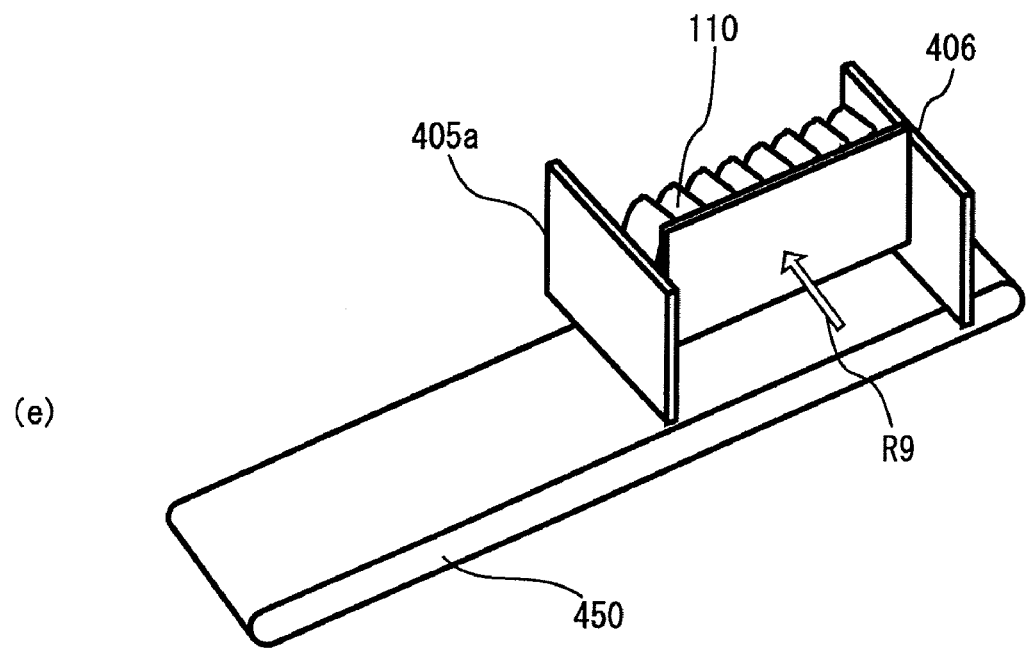
FIG. 45 is a schematic perspective view showing in detail the exemplary operations performed by the first position control plate, the second position control plate, and the third position control plate of the second conveyance unit.

Next, FIG. 43 to FIG. 45 are schematic perspective diagrams illustrating in detail exemplary operations of the first position control plate 405a, the second position control plate 406, and a third position control plate 407 of the second conveyance unit 450.

As shown in FIG. 43(a) and FIG. 43(b), when the predetermined number of the packaged objects 110 are conveyed to the downstream side of the second conveyance unit 450, and all of the packaged objects 110 have passed the vicinity of the first position control plate 405a, the first position control plate 405a is moved in the direction indicated by an arrow M3. Further, as shown in FIG. 43(a) and FIG. 43(b), when the predetermined number of the packaged objects 110 are conveyed, and half the length of the foremost packaged object among the predetermined number of the packaged objects 110 is on the second position control plate 406, the second conveyance unit 450 stops conveyance operation, and the second position control plate 406 is rotated in the direction indicated by the arrow R6.

Subsequently, as shown in FIG. 44(c), the second position control plate 406 which is erected is slid in the direction indicated by the arrow R7, and the predetermined number of the packaged objects 110 enters the standing positions. In this case, subsequently, as shown in FIG. 44(d), the third position control plate 407, which is provided thereabove, is rotated in the direction indicated by an arrow R8, and is moved so as to be positioned along the side portion of the predetermined number of the packaged objects 110 which are in the standing positions.

Finally, as shown in FIG. 45(e), the third position control plate 407 is slid in the direction indicated by an arrow R9, and the predetermined number of the packaged objects 110 which are in the standing positions are conveyed toward the box 500, and put into the box 500.

Another Example

Figure 46:
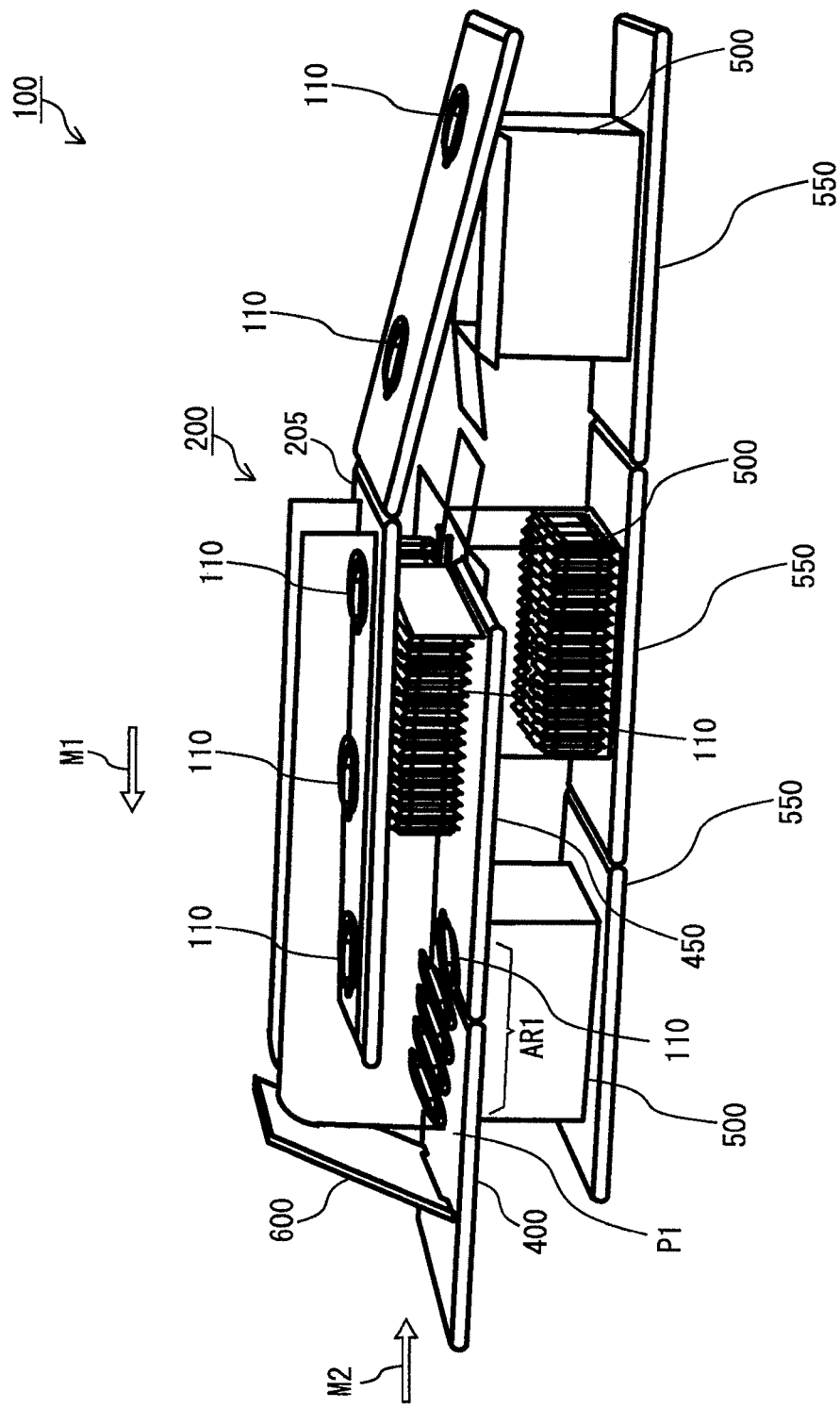
FIG. 46 is a schematic diagram illustrating another exemplary external appearance of a package apparatus for packing packaged objects in boxes.

FIG. 46 is a schematic diagram illustrating an external appearance of another example of a package apparatus 100.

The package apparatus 100 shown in FIG. 46 mainly includes: a first conveyance unit 200; second conveyance units 400 and 450; a box conveyance unit 550; and a rotation prevention guide unit 600. The first conveyance unit 200 and the second conveyance units 400 and 450 are each formed as a conveyance structure having an endless belt conveyor. The first conveyance unit 200 moves a plurality of packaged objects 110 in the direction indicated by an arrow M1. The main component of the first conveyance unit 200 is a first horizontal unit 205 only.

As shown in FIG. 46, the packaged objects 110 are moved on the first horizontal unit 205 of the first conveyance unit 200, and the plurality of packaged objects 110 overlay adjacent packaged objects in a region extending from a reception portion P1 to a collection portion AR1 in the second conveyance unit 400.

In the package apparatus 100 according to the another embodiment, the second conveyance units 400 and 450 are operable to convey the packaged objects 110 in the direction (the direction indicated by an arrow M2) opposite to the direction (the direction indicated by the arrow M1) in which the packaged objects are conveyed on the first conveyance unit 200. Therefore, a space necessary for packing the packaged objects 110 in boxes can be reduced as compared to a structure in which the conveying direction of the second conveyance units 400 and 450 is the same as that of the first conveyance unit 200. Further, the tilt unit 210 of the first conveyance unit 200 is tiled downward, so that the packaged objects 110 can be caused to fall in the stable positions. Therefore, the packaged objects 110 can overlay adjacent packaged objects, at the collection portion AR1 of the second conveyance units 400 and 450, so as to have the same orientation, and can be conveyed. Consequently, the packaged objects 110 can be aligned at a high speed so as to have the same orientation, and packed in boxes.

Further, the angle α at which the tilt unit 210 of the first conveyance unit 200 is tilted is set so as to be approximately equal to the angle α2 at which each of the packaged objects 110 is tilted when received. Therefore, when the packaged objects 110 having been conveyed on the tilt unit 210 are moved to the reception portion P1, the amount of rotation of each of the packaged objects 110 can be minimized. Further, when the angle α is set so as to be less than the angle α2, the combined vector obtained by combining the direction vector representing the tilt angle of each of the packaged objects 110 having been conveyed on the tilt unit 210, with the vector of the vertical direction based on the own weight of each one of the packaged objects 110, represents an angle which is approximately equal to the angle α2. Thus, when the packaged objects 110 having been conveyed on the tilt unit 210 are moved to the reception portion P1, minimization of the amount of rotation (the angle α1 – the angle α2) of each of the packaged objects 110 can be increased.

Consequently, the packaged objects 110 can be aligned at a high speed so as to have the same orientation, thereby preventing a great shock from being delivered to the packaged objects 110. Therefore, the packaged objects 110 can be prevented from being damaged or impaired, and articles included in the packaged objects 110 can be protected.

Further, an adjustment mechanism for the tilt unit 210 allows adjustment of at least one of the tilt angle and the length of the tilting side of the tilt unit 210. Therefore, at least one of the tilt angle and the length of the tilting side can be adjusted depending on kinds of the packaged objects 110. Consequently, it is unnecessary to change the first conveyance unit 200 depending on the kinds of the packaged objects 110.

Further, the control unit 301 controls the first conveyance driving unit 310 and the second conveyance driving unit 320 in accordance with the kinds of the packaged objects 110, thereby aligning the packaged objects 110 so as to have the same orientation.

Moreover, in the package apparatus 100 according to the another embodiment, the second conveyance units 400, 450, and 400a are operable to convey the packaged objects 110 in the direction (which is the direction indicated by the arrow M2) which is opposite to the direction (which is the direction indicated by the arrow M1) in which the packaged objects 110 are conveyed on the first conveyance unit 200, thereby enabling reduction of a space necessary for packing the packaged objects 110 in boxes. Further, the tilt unit 210 of the first conveyance unit 200 of the package apparatus 100 is provided so as to be tiled downward, so that the packaged objects 110 can fall in the stable positions, can overlay adjacent packaged objects so as to have the same orientation, and can be conveyed at a high speed, on the second conveyance units 400, 450, and 400a.

Further, the second conveyance unit 400a of the package apparatus 100a is provided so as to be tilted, so that the packaged objects 110 can be conveyed on the second conveyance unit 400a at an increased speed without misaligning the positions of all of a predetermined number of the packaged objects 110.

In the above-described embodiments, the second position control plate 406 is rotated 90 degrees to shift from the initial horizontal position to the erected position. However, the present invention is not limited thereto. The second position control plate 406 may be tilted relative to the horizontal plane in the initial position, and may be rotated by any angle which is less than or equal to 90 degrees so as to be in the erected position. Thus, even when the packaged objects 110 is conveyed at a high speed, the packaged objects 110 can be prevented from being moved beyond the second position control plate 406 and falling.

Components of the present embodiments satisfy the following correspondences. The first conveyance unit 200 corresponds to a first conveyance unit. The second conveyance unit 400, the third conveyance unit 410, and the extendable conveyance unit 420 correspond to a second conveyance unit. The control unit 301 corresponds to a first control unit and a second control unit. The packaged objects 110a, 110b, 110c, 110d, and 110e correspond to packaged objects. The package apparatus 100 corresponds to a package apparatus. The direction indicated by the arrow M1 corresponds to a conveying direction (first conveying direction) in which the first conveyance unit conveys the packaged objects. The direction indicated by the arrow M2 corresponds to a direction generally opposite to a conveying direction (second conveying direction). The collection portion AR1 corresponds to a collection portion. The group of packaged objects 110 corresponds to a group of the plurality of the packaged objects. The second conveyance unit 400 corresponds to a movable tilt unit. The third conveyance unit 410 corresponds to a stationary tilt unit. The extendable conveyance unit 420 corresponds to a horizontal unit. The packaged object 110a corresponds to a first packaged object. The tilt angle α2 or a position along the almost horizontal plane corresponds to a tilt angle at which the movable tilt unit is tilted. The first position control plate 405 corresponds to a first position control plate. The second position control plate 406 corresponds to a second position control plate. The third position control plate 407 corresponds to a third position control plate. The tilt units 210 and 230, and the second conveyance unit 400a correspond to a tilt unit. The reception portion P1 corresponds to an object reception portion. The angles α, β, and γ each correspond to a tilt angle of the tilt unit. The angle α2 corresponds to an overlay angle. The coupling roller movement unit 330 and the pair of coupling rollers 230a and 230b correspond to a pair of coupling rollers. The first conveyance driving units 310 and 310a correspond to a driving unit for driving the first conveyance unit. The horizontal driving unit 311 corresponds to a horizontal driving unit for driving the horizontal unit. The tilt unit driving unit 312 corresponds to a tilt driving unit for driving the tilt unit.

While a preferred embodiment of the present invention has been described above, the present invention is not limited thereto. It should be understood that other various embodiments may be devised without departing from the spirit and the scope of the present invention. Further, actions and effects obtained from the features of the preferred embodiment of the present invention are illustrative and not restrictive.

What is claimed is:

1. A package apparatus comprising:
   a first conveyance unit configured and arranged to convey a plurality of packaged objects in a non-random orientation in a first conveying direction and sequentially drop each of the packaged objects off a downstream-side end thereof by way of a tilt unit, each of the packaged objects having a longitudinal axis when viewed from the side;
   a second conveyance unit provided below the first conveyance unit and being positioned to receive each of the packaged objects dropped off the first conveyance unit; and
   a control unit operably connected to the second conveyance unit controlling movement of the packaged objects on the second conveyance unit in a second conveying direction generally opposite from the first conveying direction, such that after a first packaged object is dropped from the first conveyance unit on to the second conveyance unit, each subsequently dropped one of the packaged objects received from the first conveyance unit is positioned by controlled movement of the second conveyance unit to lean in a prescribed orientation against a previously dropped adjacent one of the packaged objects such that the longitudinal axis of each of a plurality of the subsequently dropped ones of the packaged objects are aligned in a common prescribed orientation relative to one another forming a group of the packaged objects that is conveyed in the second conveying direction on the second conveyance unit.

2. The package apparatus according to claim 1, wherein the downstream-side end of the first conveyance unit includes the tilt unit which is tilted downward toward the second conveyance unit directing the subsequently dropped one of the packaged objects to land on the second conveyance unit in the prescribed orientation.

3. The package apparatus according to claim 2, wherein the prescribed orientation includes the subsequently dropped ones of the package objects leaning at a leaning angle less than 45 degrees with respect to an upwardly extending line that is perpendicular to the second conveyance direction, the second conveyance unit includes a collection portion that collects the packaged objects, and an object reception portion provided at an upstream-side end portion of the collection portion, and the tilt unit of the first conveyance unit is tilted at a tilt angle that is approximately equal to or less than the leaning angle.

4. The package apparatus according to claim 1, wherein the first conveyance unit includes
- a horizontal unit and the tilt unit which are formed of a common belt, and
- a pair of coupling rollers that couple the horizontal unit to the tilt unit, the coupling rollers are configured and arranged to adjust at least one of a tilt angle of the tilt unit and a length of a tilting side of the tilt unit.

5. The package apparatus according to claim 1, wherein the control unit is operably connected to a driving unit configured and arranged to drive the first conveyance unit, and is configured to control a speed of the driving unit depending on a kind of the packaged objects.

6. The package apparatus according to claim 1, wherein the control unit is operably connected to a driving unit configured and arranged to drive the first conveyance unit, the driving unit including a horizontal driving unit and a tilt driving unit, and
the control unit further being configured to independently control the horizontal driving unit and the tilt driving unit of the driving unit, and wherein
the first conveyance unit includes a horizontal unit and the tilt unit which are formed of independent belts, respectively, and
the horizontal driving unit of the driving unit is configured and arranged to drive the horizontal unit of the first conveyance unit, and the tilt driving unit of the driving unit being configured and arranged to drive the tilt unit of the first conveyance unit.

7. The package apparatus according to claim 1, wherein the second conveyance unit includes
- the tilt unit and a horizontal unit with the tilt unit and the horizontal unit being formed of a common belt, and
- a pair of coupling rollers that couple the tilt unit to the horizontal unit with the coupling rollers being configured and arranged to adjust at least one of a tilt angle of the tilt unit and a length of a tilting side of the tilt unit.

8. The package apparatus according to claim 1, wherein the control unit is operably connected to a driving unit configured and arranged to drive the second conveyance unit, and the control unit is also configured to control a speed of the driving unit depending on a kind of the packaged objects.

9. The package apparatus according to claim 8, wherein the second conveyance unit includes the tilt unit and a horizontal unit which are formed of independent belts, respectively,
the driving unit for driving the second conveyance unit includes a tilt driving unit configured and arranged to drive the tilt unit, and a horizontal driving unit configured and arranged to drive the horizontal unit, and
the control unit further configured and arranged to independently control the tilt driving unit and the horizontal driving unit.

10. The package apparatus according to claim 8, wherein the second conveyance unit includes a horizontal unit and the tilt unit, the tilt unit including a stationary tilt unit and a movable tilt unit, and
the control unit further is configured and arranged to control the driving unit such that a tilt angle, at which the movable tilt unit is tilted when a first packaged object among the group of the packaged objects drops from the first conveyance unit to the second conveyance unit, is different from a tilt angle, at which the movable tilt unit is tilted when packaged objects, other than the first packaged object, among the group of the packaged objects drop from the first conveyance unit to the second conveyance unit.

11. The package apparatus according to claim 10, wherein the control unit further is configured to control a tilt angle, at which the movable tilt unit is tilted such that the movable tilt unit is in an almost horizontal position when a first packaged object among the group of the packaged objects drops from the first conveyance unit to the second conveyance unit.

12. The package apparatus according to claim 10, wherein the control unit is configured to control the movable tilt unit such that the movable tilt unit is tilted downward from an upstream side to a downstream side when packaged objects, other than the first packaged object among the group of the plurality of the packaged objects, drop from the first conveyance unit to the second conveyance unit.

* * * * *